(12) United States Patent
Fujita et al.

(10) Patent No.: US 6,512,598 B2
(45) Date of Patent: Jan. 28, 2003

(54) IMAGE FORMING APPARATUS CAPABLE OF PREVENTING LINEAR NONUNIFORMITY AND IMPROVING IMAGE QUALITY

(75) Inventors: Toru Fujita, Nagano (JP); Hiroshi Nakazato, Nagano (JP); Hisako Mizutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/962,137

(22) Filed: Sep. 26, 2001

(65) Prior Publication Data

US 2002/0039190 A1 Apr. 4, 2002

Related U.S. Application Data

(62) Division of application No. 08/985,252, filed on Dec. 4, 1997, now Pat. No. 6,317,220.

(30) Foreign Application Priority Data

| Dec. 6, 1996 | (JP) | 8-326261 |
| Jan. 23, 1997 | (JP) | 9-010723 |
| Jan. 24, 1997 | (JP) | 9-011731 |

(51) Int. Cl.[7] .................. H04N 1/405; H04N 1/409
(52) U.S. Cl. ................. 358/3.09; 358/3.02; 358/3.27; 358/3.13; 358/3.23; 347/252
(58) Field of Search .................. 358/1.9, 3.02, 358/3.09, 3.1, 3.11, 3.12, 3.27, 534; 347/131, 251–254

(56) References Cited

U.S. PATENT DOCUMENTS

| 5,446,550 A | * 8/1995 | Maekawa et al. ........ 358/3.09 |
| 5,774,229 A | 6/1998 | Delabastita ............... 358/3.07 |
| 6,249,355 B1 | 6/2001 | Trask ........................ 358/1.9 |

FOREIGN PATENT DOCUMENTS

| EP | 610 928 | * 2/1994 | G06F/15/62 |
| JP | 4-95177 | * 3/1992 | G06F/15/66 |
| JP | 4-318578 | 11/1992 | G03G/15/16 |
| JP | 5-138946 | 6/1993 | B41J/2/52 |
| JP | 5-176163 | 7/1993 | H04N/1/40 |
| JP | 5-284343 | 10/1993 | H04N/1/40 |
| JP | 5-289530 | 11/1993 | G03G/15/14 |

* cited by examiner

*Primary Examiner*—Scott Rogers
(74) *Attorney, Agent, or Firm*—Sughrue Mion, PLLC

(57) ABSTRACT

An image forming apparatus having first and second basic cells each containing a predetermined number of cells in a main scanning direction and a sub-scanning direction and disposed adjacent to each other in the sub-scanning direction, a gradation processing portion arranged to perform a gradation expressing process for each basic cell in accordance with a density of a supplied image and a dot forming portion capable of forming dots on a recording medium to correspond to each pixel subjected to the gradation expressing process by the gradation processing portion. The gradation processing portion performs the gradation expressing process in such a manner that enlargement of dots in the first and second basic cells adjacent to each other in the sub-scanning direction is inhibited in the sub-scanning direction until the dots are enlarged and connected to each other in the main scanning direction. Thus, the distance in the sub-scanning direction between dots in the first and second basic cells in a low density region is kept to a predetermined width.

11 Claims, 39 Drawing Sheets

ABNORMAL ENLARGEMENT OF AREA OF DOT id = 4    OD = 0.15 id = 90    OD = 0.4 id = 140    OD = 0.6 id = 180    OD = 0.8 id = 214    OD = 1.0 id = 277    OD = 1.1 id = 238    OD = 1.2 id = 248    OD = 1.3 id = 255    OD = 1.4

FIG. 15 (a)

| 199 | 148 | 192 |
|-----|-----|-----|
| 24  | 3   | 16  |
| 255 | 245 | 255 |

MATRIX m1 CORRESPONDING
TO PULSE WIDTH 1/8

FIG. 15 (b)

| 204 | 153 | 202 |
|-----|-----|-----|
| 40  | 3   | 32  |
| 255 | 249 | 255 |

MATRIX m2 CORRESPONDING
TO PULSE WIDTH 2/8

FIG. 15 (c)

| 212 | 161 | 208 |
|-----|-----|-----|
| 56  | 3   | 48  |
| 255 | 252 | 255 |

MATRIX m3 CORRESPONDING
TO PULSE WIDTH 3/8

FIG. 15 (d)

| 220 | 169 | 216 |
|-----|-----|-----|
| 77  | 3   | 65  |
| 255 | 253 | 255 |

MATRIX m4 CORRESPONDING
TO PULSE WIDTH 4/8

FIG. 15 (e)

| 229 | 174 | 224 |
|-----|-----|-----|
| 98  | 3   | 89  |
| 255 | 253 | 255 |

MATRIX m5 CORRESPONDING
TO PULSE WIDTH 5/8

FIG. 15 (f)

| 235 | 180 | 232 |
|-----|-----|-----|
| 109 | 3   | 105 |
| 255 | 253 | 255 |

MATRIX m6 CORRESPONDING
TO PULSE WIDTH 6/8

FIG. 15 (g)

| 241 | 185 | 239 |
|-----|-----|-----|
| 137 | 3   | 133 |
| 255 | 254 | 255 |

MATRIX m7 CORRESPONDING
TO PULSE WIDTH 7/8

FIG. 15 (h)

| 243 | 188 | 243 |
|-----|-----|-----|
| 144 | 8   | 141 |
| 255 | 255 | 255 |

MATRIX m8 CORRESPONDING
TO PULSE WIDTH 8/8

FIG. 16 (a)

| 199 | 148 | 192 |
|---|---|---|
| 24 | 3 | 16 |
| 255 | 245 | 255 |

MATRIX m1' CORRESPONDING
TO PULSE WIDTH 1/8

FIG. 16 (b)

| 204 | 153 | 202 |
|---|---|---|
| 40 | 3 | 32 |
| 255 | 249 | 255 |

MATRIX m2' CORRESPONDING
TO PULSE WIDTH 2/8

FIG. 16 (c)

| 212 | 161 | 208 |
|---|---|---|
| 56 | 3 | 48 |
| 255 | 252 | 255 |

MATRIX m3' CORRESPONDING
TO PULSE WIDTH 3/8

FIG. 16 (d)

| 220 | 169 | 216 |
|---|---|---|
| 77 | 3 | 65 |
| 255 | 253 | 255 |

MATRIX m4' CORRESPONDING
TO PULSE WIDTH 4/8

FIG. 16 (e)

| 229 | 174 | 224 |
|---|---|---|
| 98 | 3 | 89 |
| 255 | 253 | 255 |

MATRIX m5' CORRESPONDING
TO PULSE WIDTH 5/8

FIG. 16 (f)

| 235 | 180 | 232 |
|---|---|---|
| 109 | 3 | 105 |
| 255 | 253 | 255 |

MATRIX m6' CORRESPONDING
TO PULSE WIDTH 6/8

FIG. 16 (g)

| 241 | 185 | 239 |
|---|---|---|
| 137 | 3 | 133 |
| 255 | 254 | 255 |

MATRIX m7' CORRESPONDING
TO PULSE WIDTH 7/8

FIG. 16 (h)

| 255 | 188 | 255 |
|---|---|---|
| 255 | 8 | 255 |
| 255 | 255 | 255 |

MATRIX m8' CORRESPONDING
TO PULSE WIDTH 8/8

FIG. 17 (a)
FIG. 17 (b)
FIG. 17 (c)
FIG. 17 (d)
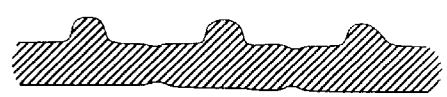

FIG. 18 (a) id = 2 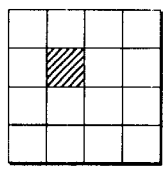
FIG. 18 (i) id = 218 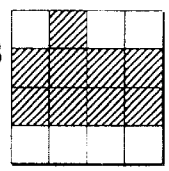
FIG. 18 (b) id = 4 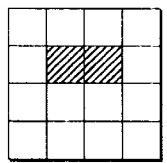
FIG. 18 (j) id = 223 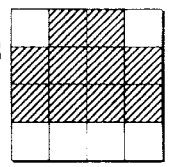
FIG. 18 (c) id = 80 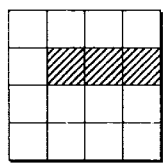
FIG. 18 (k) id = 230 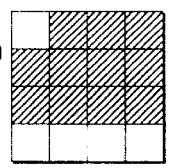
FIG. 18 (d) id = 100 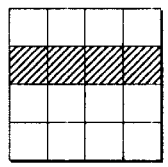
FIG. 18 (l) id = 237 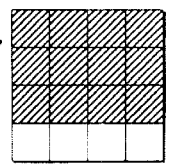
FIG. 18 (e) id = 130 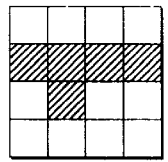
FIG. 18 (m) id = 242 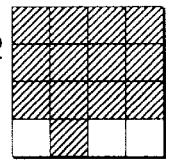
FIG. 18 (f) id = 160 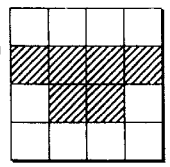
FIG. 18 (n) id = 248 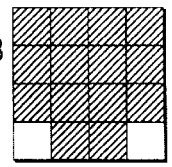
FIG. 18 (g) id = 175 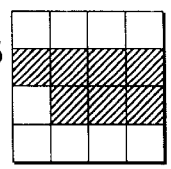
FIG. 18 (o) id = 253 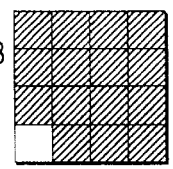
FIG. 18 (h) id = 210 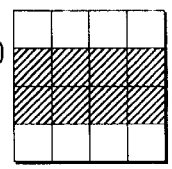
FIG. 18 (p) id = 255 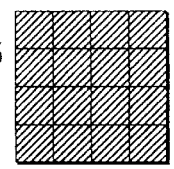

FIG. 22
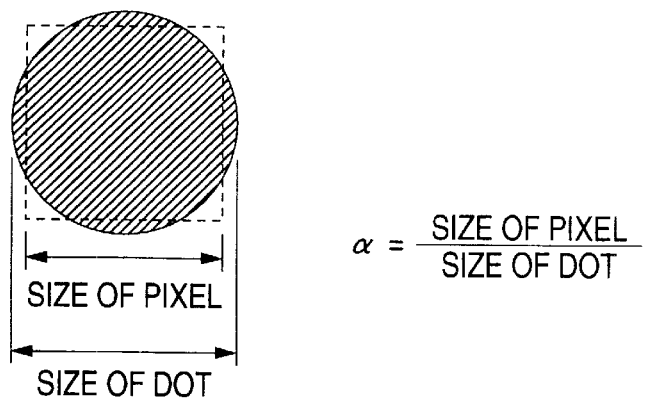
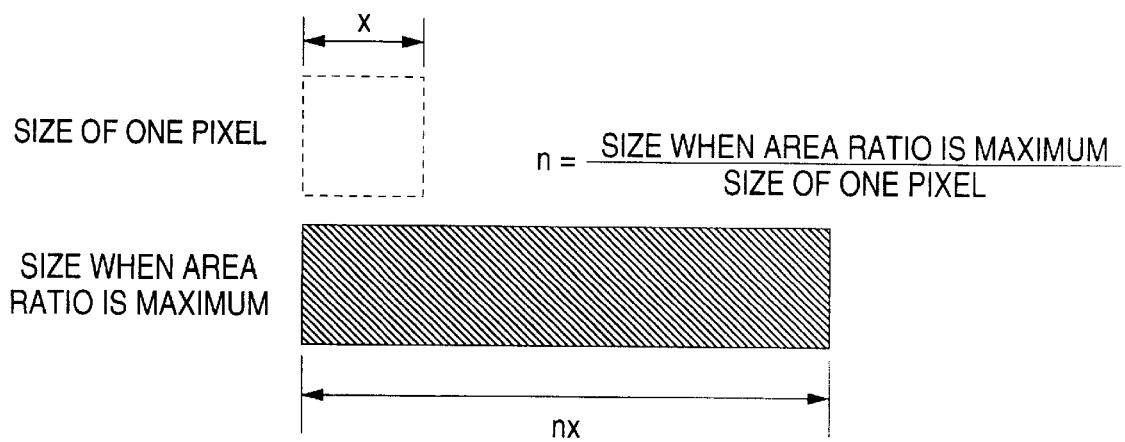
FIG. 23
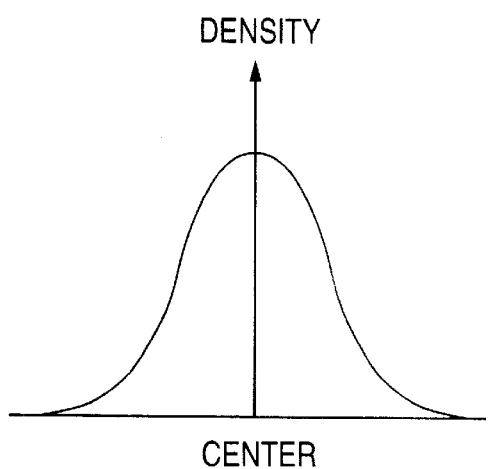

| n | FIRST PREDETERMINED VALUE $\left(1 - \frac{1}{2n\alpha}\right)$ | SIZE OF DOT WHEN FIRST PREDETERMINED VALUE IS USED | RESOLUTION |
|---|---|---|---|
| 1 | 0.30 | | 600 |
| 2 | 0.64 | | 300 |
| 3 | 0.76 | | 200 |
| 4 | 0.82 | | 150 |
| 5 | 0.86 | | 120 |
| 6 | 0.88 | | 100 |
| 7 | 0.90 | | 86 |
| 8 | 0.91 | | 75 |
| 9 | 0.92 | | 67 |
| 10 | 0.93 | | 60 |

FIG. 39A

| 1 | 2 | 3 | 4 |
|---|---|---|---|
| 255 132 94<br>255 255 255<br>255 232 139 | 255 255 95<br>255 255 255<br>255 255 140 | 255 134 96<br>255 255 255<br>255 233 255 | 255 255 97<br>255 255 255<br>255 255 255 |

| 5 | 6 | 7 | 8 |
|---|---|---|---|
| 255 135 98<br>255 255 255<br>255 234 255 | 255 255 99<br>255 255 255<br>255 255 255 | 255 136 255<br>255 255 255<br>255 235 255 | 255 255 255<br>255 255 255<br>255 255 255 |

| 9 | 10 | 11 | 12 |
|---|---|---|---|
| 255 137 255<br>255 255 255<br>255 236 255 | 255 142 255<br>255 255 255<br>255 255 255 | 255 144 255<br>255 255 255<br>255 237 255 | 255 146 255<br>255 255 255<br>255 255 255 |

| 13 | 14 | 15 | 16 |
|---|---|---|---|
| 255 148 255<br>255 255 255<br>255 238 255 | 255 150 255<br>255 255 255<br>255 255 255 | 255 152 255<br>255 255 255<br>255 239 255 | 255 154 255<br>255 255 255<br>255 255 255 |

| 17 | 18 | 19 | 20 |
|---|---|---|---|
| 255 155 255<br>255 255 255<br>255 240 255 | 255 156 255<br>255 255 255<br>255 255 255 | 255 255 255<br>255 255 255<br>255 241 255 | 255 157 255<br>255 255 255<br>255 255 255 |

| 21 | 22 | 23 | 24 |
|---|---|---|---|
| 255 255 255<br>255 255 255<br>255 242 255 | 255 158 255<br>255 255 255<br>255 255 255 | 255 159 255<br>255 255 255<br>255 243 255 | 255 161 255<br>255 255 255<br>255 255 255 |

| 25 | 26 | 27 | 28 |
|---|---|---|---|
| 255 163 255<br>255 255 255<br>255 244 255 | 255 165 255<br>255 255 255<br>255 255 255 | 255 167 255<br>255 255 255<br>255 255 255 | 255 168 255<br>255 1 255<br>255 255 255 |

FIG. 39B

| 29 | 30 | 31 | 32 |
|---|---|---|---|

| 255 | 170 | 255 |
|---|---|---|
| 255 | 2 | 255 |
| 255 | 245 | 255 |

| 255 | 172 | 255 |
|---|---|---|
| 255 | 3 | 255 |
| 255 | 255 | 255 |

| 255 | 174 | 255 |
|---|---|---|
| 255 | 4 | 255 |
| 255 | 255 | 255 |

| 255 | 176 | 255 |
|---|---|---|
| 255 | 5 | 255 |
| 255 | 255 | 255 |

| 33 | 34 | 35 | 36 |
|---|---|---|---|

| 255 | 178 | 255 |
|---|---|---|
| 255 | 6 | 255 |
| 255 | 255 | 255 |

| 255 | 180 | 255 |
|---|---|---|
| 255 | 7 | 255 |
| 255 | 255 | 255 |

| 255 | 182 | 255 |
|---|---|---|
| 255 | 8 | 255 |
| 255 | 246 | 255 |

| 255 | 184 | 255 |
|---|---|---|
| 255 | 9 | 255 |
| 255 | 255 | 255 |

| 37 | 38 | 39 | 40 |
|---|---|---|---|

| 255 | 186 | 255 |
|---|---|---|
| 255 | 10 | 255 |
| 255 | 255 | 255 |

| 255 | 188 | 255 |
|---|---|---|
| 255 | 11 | 255 |
| 255 | 255 | 255 |

| 255 | 190 | 255 |
|---|---|---|
| 255 | 12 | 255 |
| 255 | 255 | 255 |

| 255 | 192 | 255 |
|---|---|---|
| 255 | 14 | 255 |
| 255 | 247 | 255 |

| 41 | 42 | 43 | 44 |
|---|---|---|---|

| 255 | 193 | 255 |
|---|---|---|
| 255 | 16 | 255 |
| 255 | 255 | 255 |

| 255 | 194 | 255 |
|---|---|---|
| 255 | 18 | 255 |
| 255 | 255 | 255 |

| 255 | 195 | 255 |
|---|---|---|
| 255 | 20 | 255 |
| 255 | 255 | 255 |

| 255 | 196 | 255 |
|---|---|---|
| 255 | 22 | 255 |
| 255 | 255 | 255 |

| 45 | 46 | 47 | 48 |
|---|---|---|---|

| 255 | 197 | 255 |
|---|---|---|
| 255 | 24 | 255 |
| 255 | 255 | 255 |

| 255 | 198 | 255 |
|---|---|---|
| 255 | 26 | 255 |
| 255 | 255 | 255 |

| 255 | 199 | 255 |
|---|---|---|
| 255 | 28 | 255 |
| 255 | 255 | 255 |

| 255 | 200 | 255 |
|---|---|---|
| 255 | 30 | 255 |
| 255 | 255 | 255 |

| 49 | 50 | 51 | 52 |
|---|---|---|---|

| 255 | 201 | 255 |
|---|---|---|
| 255 | 32 | 255 |
| 255 | 255 | 255 |

| 255 | 202 | 255 |
|---|---|---|
| 255 | 34 | 255 |
| 255 | 248 | 255 |

| 255 | 203 | 255 |
|---|---|---|
| 255 | 36 | 255 |
| 255 | 255 | 255 |

| 255 | 204 | 255 |
|---|---|---|
| 255 | 38 | 255 |
| 255 | 255 | 255 |

| 53 | 54 | 55 | 56 |
|---|---|---|---|

| 255 | 205 | 255 |
|---|---|---|
| 255 | 40 | 255 |
| 255 | 255 | 255 |

| 255 | 206 | 255 |
|---|---|---|
| 255 | 42 | 255 |
| 255 | 255 | 255 |

| 255 | 207 | 255 |
|---|---|---|
| 255 | 44 | 255 |
| 255 | 255 | 255 |

| 255 | 208 | 255 |
|---|---|---|
| 255 | 47 | 255 |
| 255 | 255 | 255 |

FIG. 39C

| 57 | 58 | 59 | 60 |
|---|---|---|---|
| 255 209 255<br>255 48 255<br>255 255 255 | 255 210 255<br>255 49 255<br>255 255 255 | 255 211 255<br>255 50 255<br>255 255 255 | 255 212 255<br>255 51 255<br>255 255 255 |

| 61 | 62 | 63 | 64 |
|---|---|---|---|
| 255 213 255<br>255 52 255<br>255 249 255 | 255 214 99<br>255 53 255<br>255 255 255 | 255 215 255<br>255 54 255<br>255 255 255 | 255 216 255<br>255 55 255<br>255 255 255 |

| 65 | 66 | 67 | 68 |
|---|---|---|---|
| 255 217 255<br>255 57 255<br>255 255 255 | 255 218 255<br>255 255 255<br>255 255 255 | 255 219 255<br>255 59 255<br>255 255 255 | 255 220 255<br>255 61 255<br>255 255 255 |

| 69 | 70 | 71 | 72 |
|---|---|---|---|
| 255 221 255<br>255 63 255<br>255 255 255 | 255 222 255<br>255 65 255<br>255 255 255 | 255 223 255<br>255 67 255<br>255 250 255 | 255 224 255<br>255 70 255<br>255 255 255 |

| 73 | 74 | 75 | 76 |
|---|---|---|---|
| 255 255 255<br>255 73 255<br>255 255 255 | 255 225 255<br>255 76 255<br>255 255 255 | 255 255 255<br>255 79 255<br>255 255 255 | 255 226 255<br>255 81 255<br>255 255 255 |

| 77 | 78 | 79 | 80 |
|---|---|---|---|
| 255 255 255<br>255 84 255<br>255 255 255 | 255 255 255<br>255 86 255<br>255 255 255 | 255 227 255<br>255 89 255<br>255 255 255 | 255 255 255<br>255 91 255<br>255 251 255 |

| 81 | 82 | 83 | 84 |
|---|---|---|---|
| 255 255 255<br>255 100 255<br>255 255 255 | 255 228 255<br>255 102 255<br>255 255 255 | 255 255 255<br>255 104 255<br>255 255 255 | 255 255 255<br>255 106 255<br>255 255 255 |

FIG. 39D

| 85 | | | 86 | | | 87 | | | 88 | | |
|---|---|---|---|---|---|---|---|---|---|---|---|
| 255 | 229 | 255 | 255 | 255 | 255 | 255 | 255 | 255 | 255 | 255 | 255 |
| 255 | 108 | 255 | 255 | 110 | 255 | 255 | 112 | 255 | 255 | 114 | 255 |
| 255 | 255 | 255 | 255 | 255 | 255 | 255 | 255 | 255 | 255 | 252 | 255 |

| 89 | | | 90 | | | 91 | | | 92 | | |
|---|---|---|---|---|---|---|---|---|---|---|---|
| 255 | 255 | 255 | 255 | 230 | 255 | 255 | 255 | 255 | 255 | 255 | 255 |
| 255 | 122 | 255 | 255 | 123 | 255 | 255 | 124 | 255 | 255 | 125 | 255 |
| 255 | 255 | 255 | 255 | 255 | 255 | 255 | 255 | 255 | 255 | 255 | 255 |

| 93 | | | 94 | | | 95 | | | 96 | | |
|---|---|---|---|---|---|---|---|---|---|---|---|
| 255 | 255 | 255 | 255 | 255 | 255 | 255 | 255 | 255 | 255 | 231 | 255 |
| 255 | 126 | 255 | 255 | 127 | 255 | 255 | 128 | 255 | 255 | 129 | 255 |
| 255 | 255 | 255 | 255 | 255 | 255 | 255 | 255 | 255 | 255 | 253 | 255 |

| 97 [0] | | | 98 [1] | | | 99 [2] | | | 100 [3] | | |
|---|---|---|---|---|---|---|---|---|---|---|---|
| 255 | 255 | 100 | 255 | 255 | 116 | 255 | 255 | 117 | 255 | 255 | 118 |
| 255 | 255 | 255 | 255 | 255 | 255 | 255 | 255 | 255 | 255 | 255 | 255 |
| 255 | 255 | 141 | 255 | 255 | 255 | 255 | 255 | 255 | 255 | 255 | 255 |

| 101 [4] | | | 102 [5] | | | 103 [6] | | | 104 [7] | | |
|---|---|---|---|---|---|---|---|---|---|---|---|
| 255 | 255 | 119 | 255 | 225 | 120 | 255 | 255 | 121 | 255 | 255 | 255 |
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |

| 105 [8] | | | 106 [9] | | | 107 [10] | | | 108 [11] | | |
|---|---|---|---|---|---|---|---|---|---|---|---|
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |

| 109 [12] | | | 110 [13] | | | 111 [14] | | | 112 [15] | | |
|---|---|---|---|---|---|---|---|---|---|---|---|
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |
| 255 | 255 | 255 | 255 | 255 | 255 | 255 | 255 | 255 | 255 | 255 | 255 |

FIG. 39E

| 113 [16] | 114 [17] | 115 [18] | 116 [19] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 117 [20] | 118 [21] | 119 [22] | 120 [23] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 121 [24] | 122 [25] | 123 [26] | 124 [27] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 125 [28] | 126 [29] | 127 [30] | 128 [31] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 129 [32] | 130 [33] | 131 [34] | 132 [35] |
|---|---|---|---|
| 231 231 231<br>129 129 129<br>253 253 253 | 255 225 255<br>255 255 255<br>255 255 255 | 255 255 255<br>255 255 255<br>255 255 255 | 255 255 255<br>255 255 255<br>255 255 255 |

| 133 [36] | 134 [37] | 135 [38] | 136 [39] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 137 [40] | 138 [41] | 139 [42] | 140 [43] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 255 | 255 | 255 |
|---|---|---|
| 255 | 255 | 255 |
| 255 | 255 | 255 |

142 [45]

| 255 | 255 | 255 |
|---|---|---|
| 255 | 255 | 255 |
| 255 | 255 | 255 |

143 [46]

| 255 | 255 | 255 |
|---|---|---|
| 255 | 255 | 255 |
| 255 | 255 | 255 |

144 [47]

| 255 | 255 | 255 |
|---|---|---|
| 255 | 255 | 255 |
| 255 | 255 | 255 |

145 [48]

| 255 | 255 | 255 |
|---|---|---|
| 255 | 255 | 255 |
| 255 | 255 | 255 |

146 [49]

| 255 | 255 | 255 |
|---|---|---|
| 255 | 255 | 255 |
| 255 | 255 | 255 |

147 [50]

| 255 | 255 | 255 |
|---|---|---|
| 255 | 255 | 255 |
| 255 | 255 | 255 |

148 [51]

| 255 | 255 | 255 |
|---|---|---|
| 255 | 255 | 255 |
| 255 | 255 | 255 |

149 [52]

| 255 | 255 | 255 |
|---|---|---|
| 255 | 255 | 255 |
| 255 | 255 | 255 |

150 [53]

| 255 | 255 | 255 |
|---|---|---|
| 255 | 255 | 255 |
| 255 | 255 | 255 |

151 [54]

| 255 | 255 | 255 |
|---|---|---|
| 255 | 255 | 255 |
| 255 | 255 | 255 |

152 [55]

| 255 | 255 | 255 |
|---|---|---|
| 255 | 255 | 255 |
| 255 | 255 | 255 |

153 [56]

| 255 | 255 | 255 |
|---|---|---|
| 255 | 255 | 255 |
| 255 | 255 | 255 |

154 [57]

| 255 | 255 | 255 |
|---|---|---|
| 255 | 255 | 255 |
| 255 | 255 | 255 |

155 [58]

| 255 | 255 | 255 |
|---|---|---|
| 255 | 255 | 255 |
| 255 | 255 | 255 |

156 [59]

| 255 | 255 | 255 |
|---|---|---|
| 255 | 255 | 255 |
| 255 | 255 | 255 |

157 [60]

| 255 | 255 | 255 |
|---|---|---|
| 255 | 255 | 255 |
| 255 | 255 | 255 |

158 [61]

| 255 | 255 | 255 |
|---|---|---|
| 255 | 255 | 255 |
| 255 | 255 | 255 |

159 [62]

| 255 | 255 | 255 |
|---|---|---|
| 255 | 255 | 255 |
| 255 | 255 | 255 |

160 [63]

| 255 | 255 | 255 |
|---|---|---|
| 255 | 255 | 255 |
| 255 | 255 | 255 |

161 [64]

| 255 | 255 | 255 |
|---|---|---|
| 255 | 255 | 255 |
| 255 | 255 | 255 |

162 [65]

| 255 | 255 | 255 |
|---|---|---|
| 255 | 255 | 255 |
| 255 | 255 | 255 |

163 [66]

| 255 | 255 | 255 |
|---|---|---|
| 255 | 255 | 255 |
| 255 | 255 | 255 |

164 [67]

| 255 | 255 | 255 |
|---|---|---|
| 255 | 255 | 255 |
| 255 | 255 | 255 |

165 [68]

| 255 | 255 | 255 |
|---|---|---|
| 255 | 255 | 255 |
| 255 | 255 | 255 |

166 [69]

| 255 | 255 | 255 |
|---|---|---|
| 255 | 255 | 255 |
| 255 | 255 | 255 |

167 [70]

| 255 | 255 | 255 |
|---|---|---|
| 255 | 255 | 255 |
| 255 | 255 | 255 |

168 [71]

| 255 | 255 | 255 |
|---|---|---|
| 255 | 255 | 255 |
| 255 | 255 | 255 |

FIG. 39G

| 169 [72] | 170 [73] | 171 [74] | 172 [75] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 173 [76] | 174 [77] | 175 [78] | 176 [79] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 177 [80] | 178 [81] | 179 [82] | 180 [83] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 181 [84] | 182 [85] | 183 [86] | 184 [87] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 185 [88] | 186 [89] | 187 [90] | 188 [91] |
|---|---|---|---|
| 255 255 255<br>255 255 255<br>255 255 255 | 255 225 255<br>255 255 255<br>255 255 255 | 255 255 255<br>255 255 255<br>255 255 255 | 255 255 255<br>255 255 255<br>255 255 255 |

| 189 [92] | 190 [93] | 191 [94] | 192 [95] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 193 [96] | 194 [0] | 195 [1] | 196 [2] |
|---|---|---|---|
| 255 255 255<br>255 255 255<br>255 255 255 | 255 255 122<br>255 255 255<br>255 255 255 | 255 255 255<br>255 255 255<br>255 255 255 | 255 255 255<br>255 255 255<br>255 255 255 |

FIG. 39H

| 197 [3] | 198 [4] | 199 [5] | 200 [6] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 201 [7] | 202 [8] | 203 [9] | 204 [10] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 205 [11] | 206 [12] | 207 [13] | 208 [14] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 209 [15] | 210 [16] | 211 [17] | 212 [18] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 213 [19] | 214 [20] | 215 [21] | 216 [22] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 217 [23] | 218 [24] | 219 [25] | 220 [26] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

| 221 [27] | 222 [28] | 223 [29] | 224 [30] |
|---|---|---|---|
| 255 255 255<br>255 255 255<br>255 255 255 | 255 255 255<br>255 255 255<br>255 255 255 | 255 255 255<br>255 255 255<br>255 255 255 | 255 255 255<br>255 255 255<br>255 255 255 |

FIG. 39I
| 225 [31] | | | 226 [32] | | |
|---|---|---|---|---|---|
| 255 | 255 | 255 | 231 | 231 | 231 |
| 255 | 255 | 255 | 129 | 129 | 129 |
| 255 | 255 | 255 | 253 | 253 | 253 |
FIG. 40
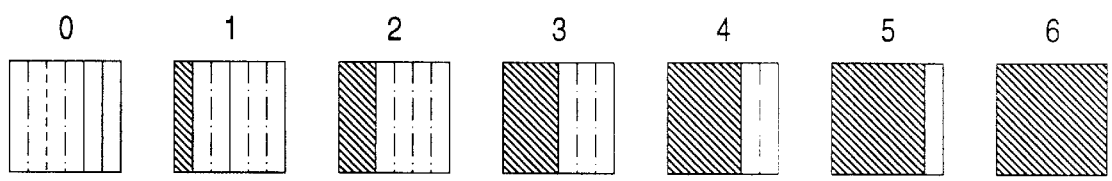
FIG. 41
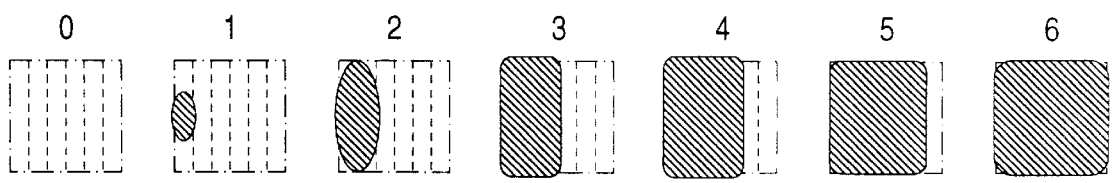

| 4 | 85 | 4 | 85 | 4 | 85 | 4 | 85 |
|---|---|---|---|---|---|---|---|
| 171 | 13 | 171 | 13 | 171 | 13 | 171 | 13 |
| 4 | 85 | 4 | 85 | 4 | 85 | 4 | 85 |
| 171 | 13 | 171 | 13 | 171 | 13 | 171 | 13 |
| 4 | 85 | 4 | 85 | 4 | 85 | 4 | 85 |
| 171 | 13 | 171 | 13 | 171 | 13 | 171 | 13 |
| 4 | 85 | 4 | 85 | 4 | 85 | 4 | 85 |
| 171 | 13 | 171 | 13 | 171 | 13 | 171 | 13 |

(4201)

2

| 9 | 90 | 9 | 108 | 9 | 99 | 9 | 117 |
|---|---|---|---|---|---|---|---|
| 175 | 18 | 193 | 18 | 184 | 18 | 202 | 18 |
| 9 | 112 | 9 | 126 | 9 | 121 | 9 | 126 |
| 198 | 18 | 211 | 18 | 207 | 18 | 211 | 18 |
| 9 | 103 | 9 | 108 | 9 | 94 | 9 | 117 |
| 189 | 18 | 193 | 18 | 180 | 18 | 202 | 18 |
| 9 | 112 | 9 | 126 | 9 | 121 | 9 | 126 |
| 198 | 18 | 211 | 18 | 207 | 18 | 211 | 18 |

3

| 13 | 130 | 13 | 148 | 13 | 139 | 13 | 157 |
|---|---|---|---|---|---|---|---|
| 216 | 22 | 234 | 22 | 225 | 22 | 243 | 22 |
| 13 | 153 | 13 | 166 | 13 | 162 | 13 | 166 |
| 238 | 22 | 252 | 22 | 247 | 22 | 252 | 22 |
| 13 | 144 | 13 | 148 | 13 | 135 | 13 | 157 |
| 229 | 22 | 234 | 22 | 220 | 22 | 243 | 22 |
| 13 | 153 | 13 | 166 | 13 | 162 | 13 | 166 |
| 238 | 22 | 252 | 22 | 247 | 22 | 252 | 22 |

4

| 27 | 166 | 45 | 166 | 36 | 166 | 54 | 166 |
|---|---|---|---|---|---|---|---|
| 252 | 76 | 252 | 76 | 252 | 76 | 252 | 76 |
| 49 | 166 | 63 | 166 | 58 | 166 | 63 | 166 |
| 252 | 76 | 252 | 76 | 252 | 76 | 252 | 76 |
| 40 | 166 | 45 | 166 | 31 | 166 | 54 | 166 |
| 252 | 76 | 252 | 76 | 252 | 76 | 252 | 76 |
| 49 | 166 | 63 | 166 | 58 | 166 | 63 | 166 |
| 252 | 76 | 252 | 76 | 252 | 76 | 252 | 76 |

5

| 67 | 166 | 67 | 166 | 67 | 166 | 67 | 166 |
|---|---|---|---|---|---|---|---|
| 252 | 81 | 252 | 81 | 252 | 81 | 252 | 81 |
| 67 | 166 | 67 | 166 | 67 | 166 | 67 | 166 |
| 252 | 81 | 252 | 81 | 252 | 81 | 252 | 81 |
| 67 | 166 | 67 | 166 | 67 | 166 | 67 | 166 |
| 252 | 81 | 252 | 81 | 252 | 81 | 252 | 81 |
| 67 | 166 | 67 | 166 | 67 | 166 | 67 | 166 |
| 252 | 81 | 252 | 81 | 252 | 81 | 252 | 81 |

6

| 72 | 166 | 72 | 166 | 72 | 166 | 72 | 166 |
|---|---|---|---|---|---|---|---|
| 252 | 85 | 252 | 85 | 252 | 85 | 252 | 85 |
| 72 | 166 | 72 | 166 | 72 | 166 | 72 | 166 |
| 252 | 85 | 252 | 85 | 252 | 85 | 252 | 85 |
| 72 | 166 | 72 | 166 | 72 | 166 | 72 | 166 |
| 252 | 85 | 252 | 85 | 252 | 85 | 252 | 85 |
| 72 | 166 | 72 | 166 | 72 | 166 | 72 | 166 |
| 252 | 85 | 252 | 85 | 252 | 85 | 252 | 85 |

FIG. 44

| 4 | 85 |
|---|---|
| 171 | 13 |

FIG. 45

| 9 | 90 |
|---|---|
| 175 | 18 |

| 9 | 94 |
|---|---|
| 180 | 18 |

| 9 | 99 |
|---|---|
| 184 | 18 |

| 9 | 103 |
|---|---|
| 189 | 18 |

| 9 | 108 |
|---|---|
| 193 | 18 |

| 9 | 112 |
|---|---|
| 198 | 18 |

| 9 | 117 |
|---|---|
| 202 | 18 |

| 9 | 121 |
|---|---|
| 207 | 18 |

| 9 | 126 |
|---|---|
| 211 | 18 |

FIG. 46

| 13 | 130 |
|---|---|
| 216 | 22 |

| 13 | 135 |
|---|---|
| 220 | 22 |

| 13 | 139 |
|---|---|
| 225 | 22 |

| 13 | 144 |
|---|---|
| 229 | 22 |

| 13 | 148 |
|---|---|
| 234 | 22 |

| 13 | 153 |
|---|---|
| 238 | 22 |

| 13 | 157 |
|---|---|
| 243 | 22 |

| 13 | 162 |
|---|---|
| 247 | 22 |

| 13 | 166 |
|---|---|
| 252 | 22 |

FIG. 47

| 27 | 166 |
|---|---|
| 252 | 76 |

| 31 | 166 |
|---|---|
| 252 | 76 |

| 36 | 166 |
|---|---|
| 252 | 76 |

| 40 | 166 |
|---|---|
| 252 | 76 |

| 45 | 166 |
|---|---|
| 252 | 76 |

| 49 | 166 |
|---|---|
| 252 | 76 |

| 54 | 166 |
|---|---|
| 252 | 76 |

| 58 | 166 |
|---|---|
| 252 | 76 |

| 63 | 166 |
|---|---|
| 252 | 76 |

FIG. 48

| 67 | 166 |
|---|---|
| 252 | 81 |

FIG. 49

| 72 | 166 |
|---|---|
| 252 | 85 |

| GRADATION | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| INPUT | 0 | 4 | 9 | 13 | 18 | 22 | 27 | 31 | 36 | 40 | 45 | 49 | 54 | 58 | 63 |
| POSITION | A | A | A | A | A | A | 1 | 2 | 3 | 4 | 5 | 6 | 7 | 8 | 9 |
| 1 | 0 | 1 | 2 | 3 | 3 | 3 | 4 | 4 | 4 | 4 | 4 | 4 | 4 | 4 | 4 |
| 2 | 0 | 0 | 0 | 1 | 2 | 3 | 3 | 3 | 3 | 3 | 3 | 3 | 3 | 3 | 3 |
| 3 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 |

| 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| 67 | 72 | 76 | 81 | 85 | 90 | 94 | 99 | 103 | 108 | 112 | 117 | 121 | 126 | 130 | 135 |
| A | A | A | A | A | 1 | 2 | 3 | 4 | 5 | 6 | 7 | 8 | 9 | 1 | 2 |
| 5 | 6 | 6 | 6 | 6 | 6 | 6 | 6 | 6 | 6 | 6 | 6 | 6 | 6 | 6 | 6 |
| 3 | 3 | 4 | 5 | 6 | 6 | 6 | 6 | 6 | 6 | 6 | 6 | 6 | 6 | 6 | 6 |
| 0 | 0 | 0 | 0 | 1 | 2 | 2 | 2 | 2 | 2 | 2 | 2 | 2 | 2 | 2 | 2 |
| 0 | 0 | 0 | 0 | 0 | 0 | 0 | 0 | 0 | 0 | 0 | 0 | 0 | 0 | 0 | 0 |

| 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|
| 139 | 144 | 148 | 153 | 157 | 162 | 166 | 171 | 175 | 180 | 184 | 186 | 193 | 198 | 202 | 207 |
| 3 | 4 | 5 | 6 | 7 | 8 | A | A | 1 | 2 | 3 | 4 | 5 | 6 | 7 | 8 |
| 6 | 6 | 6 | 6 | 6 | 6 | 6 | 6 | 6 | 6 | 6 | 6 | 6 | 6 | 6 | 6 |
| 6 | 6 | 6 | 6 | 6 | 6 | 6 | 6 | 6 | 6 | 6 | 6 | 6 | 6 | 6 | 6 |
| 3 | 3 | 3 | 3 | 3 | 3 | 6 | 6 | 6 | 6 | 6 | 6 | 6 | 6 | 6 | 6 |
| 0 | 0 | 0 | 0 | 0 | 0 | 0 | 1 | 2 | 2 | 2 | 2 | 2 | 2 | 2 | 2 |

| 47 | 48 | 49 | 50 | 51 | 52 | 53 | 54 | 55 | 56 |
|---|---|---|---|---|---|---|---|---|---|
| 211 | 216 | 220 | 225 | 229 | 234 | 238 | 243 | 247 | 252 |
| 9 | 1 | 2 | 3 | 4 | 5 | 6 | 7 | 8 | A |
| 6 | 6 | 6 | 6 | 6 | 6 | 6 | 6 | 6 | 6 |
| 6 | 6 | 6 | 6 | 6 | 6 | 6 | 6 | 6 | 6 |
| 6 | 6 | 6 | 6 | 6 | 6 | 6 | 6 | 6 | 6 |
| 2 | 3 | 3 | 3 | 3 | 3 | 3 | 3 | 3 | 6 |

IMAGE FORMING APPARATUS CAPABLE OF PREVENTING LINEAR NONUNIFORMITY AND IMPROVING IMAGE QUALITY

This is a divisional of application Ser. No. 08/985,252 (U.S. Pat. No. 6,317,220) filed Dec. 4, 1997, the disclosure of which is incorporated herein by reference.

BACKGROUND OF THE INVENTION

1. Field of the Invention

This invention relates to an image forming apparatus for processing supplied image data and forming an image and obtaining a final image on a recording medium. More particularly, the present invention relates to a half tone processing technique adaptable to an image forming apparatus of the foregoing type.

2. Background

Among the image forming apparatuses of the foregoing type, laser beam printers (LBP) adapted to an electrophotographic process have been used widely because of considerably high output speed and excellent quality of a formed image.

At present, monochrome laser beam printers are mainly used in the market, the monochrome laser beam printer being arranged to subject data of, for example, characters and line drawings to a binary coding process. Also a binary dither method is frequently used to process image data which must have sufficient gradation.

There recently arises a requirement for a color LBP. Furthermore, an image forming apparatus having more excellent gradation expressing performance has been required. To satisfy the foregoing requirements, a variety of image forming apparatuses have been suggested.

A first example of the conventional image forming apparatus disclosed in Unexamined Japanese Patent Publication No. Hei. 5-176163 will now be described. The first example has a structure such that blocks each of which is composed of a plurality of pixels on image data are provided; dots are enlarged in a sequential order to begin with the dot corresponding to the minimum recording pixel position given the highest priority in accordance with a predetermined spatial priority order in the block; and in a region in which dots having a specific priority are continuously enlarged, enlargement of dots having a priority lower than the specific priority is started.

The first conventional example, however, sometimes suffers from so-called jumping of density with which the areas of pixels, which are formed on a recording medium, are undesirably enlarged when the distances among pixels are too short because their potential gradients on the photosensitive member affect each other.

A second example of the conventional image forming apparatuses disclosed in Unexamined Japanese Patent Publication No. Hei. 5-284343 will now be described. The printing apparatus according to the second example has a screen angle and structured in such a way that matrices composed of threshold values are used to enlarge dots having the higher priority over dots in the sub-scanning direction. That is, the number of dots on the same scanning line is reduced so that prevention of nonuniformity is expected because a smaller number of dots are affected even if the scanning lines are scanned at positions deviated from required positions.

Although the structure of the second conventional example is effective for the apparatuses of a type having a screen angle, the structure cannot be applied to apparatuses of a type comprising a multiline screen having a screen angle of zero degrees which are commonly employed by color printers. Since the number of dots on which deviation of the scanning lines affects is simply reduced, linear nonuniformity in the apparatuses of a type having a screen angle cannot perfectly be prevented.

A third example of the conventional image forming apparatuses disclosed in Unexamined Japanese Patent Publication No. Hei. 5-138946 will now be described. The image forming apparatus according to the third conventional example is structured to prevent linear nonuniformity caused from change in the scanning speed of exposing light beams. To achieve this, the diameter of the exposing light beam spot in the sub-scanning direction is determined to be 0.6 time to 1.2 times the pitches of pixels in the sub-scanning direction. Moreover, the diameter of the exposing light beam spot in the main scanning direction is determined to be one time to two times the pitches of pixels. Thus, the printing patterns are continued in the main scanning direction.

Although the third conventional example is able to prevent linear nonuniformity caused from change in the speed of scanning using the exposing light beam in the main scanning direction, the effect of eliminating an influence of the deviation of the scanning lines as is obtainable from the second conventional example cannot be expected. On the contrary, the setting of the diameter of the exposing light beam spot and the pitches of pixels made in such a manner that the distributed quantities of light interfere with each other in the sub-scanning direction results in the overall width of the scanning lines being affected by deviation of the scanning lines. As a result, excessive nonuniformity has taken place.

The above-mentioned nonuniformity is a critical problem for the color LBP. In particular, prevention of the above-mentioned nonuniformity in the half tone density region including the skin color which is considered to be important to form a natural image is an important fact.

Nevertheless, an image forming apparatus which is capable of forming an image having an improved quality by effectively preventing linear nonuniformity and by obtaining a smooth half tone image has not been obtained.

SUMMARY OF THE INVENTION

Accordingly, an object of the present invention is to provide an image forming apparatus arranged to control the distance between dots in first and second basic cells each containing a predetermined number of pixels and disposed adjacent to each other so as to prevent generation of linear nonuniformity and improve the quality of a formed image.

Other and further objects, features and advantage of the invention will be appear more fully from the following description.

According to a first aspect of the present invention, there is provided an image forming apparatus comprising first and second basic cells each containing a predetermined number of pixels and disposed adjacent to each other, a gradation processing device arranged to perform a gradation expressing process for each basic cell in accordance with a density of a supplied image, a dot forming device capable of forming dots on a recording medium to correspond to each pixel subjected to the gradation expressing process by the gradation processing device and control device capable of controlling the distance between a dot in the first basic cell and a dot in the second basic cell.

According to a second aspect of the present invention, there is provided an image forming apparatus comprising first and second basic cells each containing a predetermined-number of pixels in the main scanning direction and the sub-scanning direction and disposed adjacently in the sub-scanning direction, a gradation processing device arranged to perform a gradation expressing process for each basic cell in accordance with a density of a supplied image by turning each pixel on/off, an exposing light beam scanning device arranged to scan the surface of a photosensitive member with an exposing light beam spot having a predetermined diameter to correspond to each pixel turned on by the gradation processing device and dot forming device arranged to form dots to correspond to the pixels by transferring, to a recording medium, a latent image formed on the photosensitive member by the scanning operation performed by the exposing light beam scanning device, wherein the distance from a dot group formed in the first basic cell to a dot group formed in the second basic cell is larger than the diameter of the spot.

According to a third aspect of the present invention, there is provided an image forming apparatus comprising a gradation processing device arranged to perform a gradation expressing process by determining an area ratio of pixels in accordance with a density of a supplied image and a dot forming device capable of forming dots on a recording medium to correspond to the pixels subjected to the gradation expressing process by the gradation processing device, wherein after the area ratio of the first pixel group has been raised to a first predetermined value because of enlargement of the pixels in a first direction, the gradation processing device makes the area ratio of a pixel group in a first pixel group to be constant and raises the area ratio of a second pixel group adjacent in a direction different from the first direction.

According to a fourth aspect of the present invention, there is provided an image forming apparatus comprising first and second basic cells each containing a predetermined number of pixels and disposed adjacent to each other, a gradation processing device arranged to perform a gradation expressing process for each basic cell in accordance with a density of a supplied image and a dot forming device capable of forming dots on a recording medium to correspond to each pixel subjected to the gradation expressing process by the gradation processing device, wherein an image dust zone having a predetermined width is provided between the dot in the first basic cell and the dot in the second basic cell.

BRIEF DESCRIPTION OF THE DRAWINGS

FIGS. 15(a) to 15(h) each shown a diagram showing an example of a dither matrix for use in the half tone processing portion shown in FIG. 14;

FIGS. 16(a) to 16(h) each shown a diagram showing a modification of the dither matrix;

FIGS. 17(a) to 17(d) each shown a diagram showing a process in which a toner dot appears in the image forming apparatus shown in FIG. 9;

FIGS. 18(a) to 18(p) each shown a diagram showing a modification of the density pattern for use in the image forming apparatus shown in FIG. 9;

FIG. 22 shows the relationship among the size of a pixel, the size of a dot and the size of a dot when the area ratio is the maximum;

FIG. 23 shows distribution of densities of a dot;

FIGS. 39A to 39I show dither matrices for use in a multivalue dither processing device;

FIG. 40 is a view of explanatory of enlargement of a pixel;

FIG. 41 is a view of explanatory of enlargement of a dot;

FIG. 43 shows a dither matrix for use in a ninth embodiment;

FIG. 44 shows one block forming the dither matrix;

FIG. 45 shows nine blocks forming the dither matrix;

FIG. 46 shows nine blocks forming the dither matrix;

FIG. 47 shows nine blocks forming the dither matrix;

FIG. 48 shows one block forming the dither matrix;

FIG. 49 shows one block forming the dither matrix;

FIG. 50 shows an enlargement priority order in a block;

FIG. 51 shows an enlargement priority order in a block group;

FIG. 52 shows all gradations which can be expressed by a ninth embodiment;

DETAILED DESCRIPTION OF THE PREFERRED EMBODIMENTS

To cause the present invention to be understood easily, the first conventional example as described above will now be described with reference to the drawings.

Figure 1:
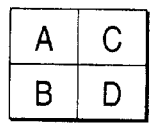
FIG. 1 is a diagram showing the priority order of pixels according to a first conventional example which are enlarged in a block having a plurality of pixels.
Figure 2:
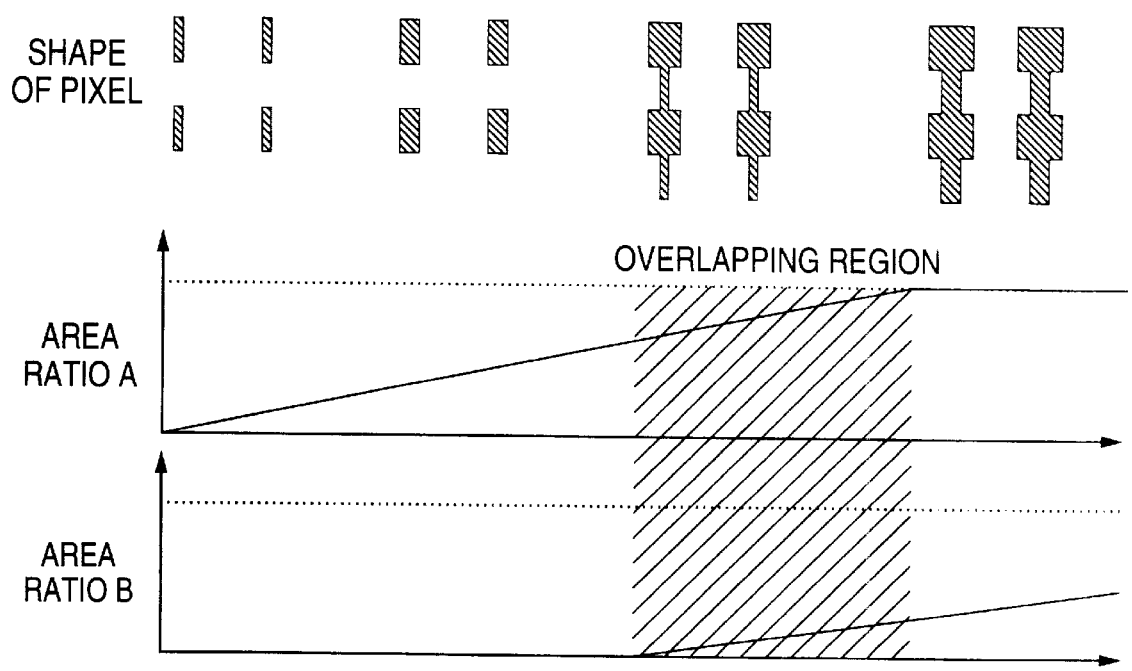
FIG. 2 is a diagram showing a process according to the first conventional example in which a pixel is enlarged.

With the conventional example, if the blocks each of which is composed of a plurality of pixel on image data are structured as shown in FIG. 1, the value of a pixel, for example, pixel A, having the highest priority is first enlarged as input data is gradually enlarged, as shown in FIG. 2. When the value of the pixel A approaches the upper limit, the value of a pixel having a next priority, for example, pixel B, is enlarged. By overlapping the enlarging process for the pixel A and the pixel B, it has been said that the expression of the gradation can be improved.

Figure 3:
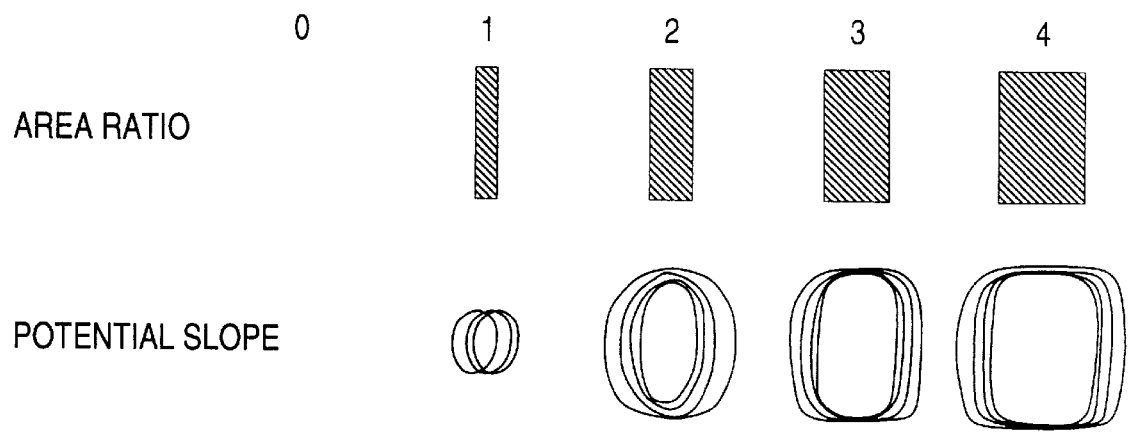
FIG. 3 is view of explanatory showing the shape of a potential slope according to the first conventional example.

Although each pixel has a rectangular shape, the potential slope formed on the photosensitive member attributable to exposure is not always in the form of the rectangle in the case of the LBP. FIG. 3 shows the form of the potential slope on the photosensitive member with respect to the area ratio of pixels.

Figure 4:
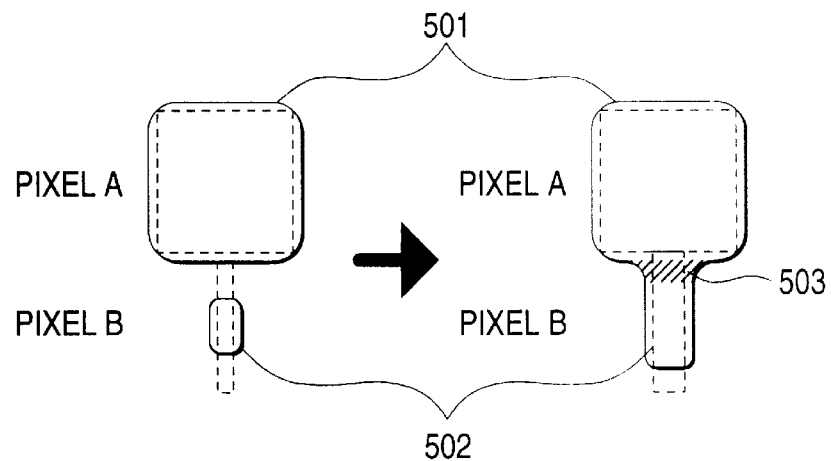
FIG. 4 is a diagram showing the connection of dots established according to the first conventional example.

The outline of a dot which is formed in the case where the enlargement with the above-mentioned area ratio by using the above-mentioned potential slope is, as shown in FIG. 4, formed into a connected shape attributable to an influence with the potential slope realized by a pixel A501 at a position at which a pixel B502 has been enlarged to certain size, as shown in FIG. 4. At this time, an excess area 503 is created, causing the density to rapidly be raised.

Figure 5:
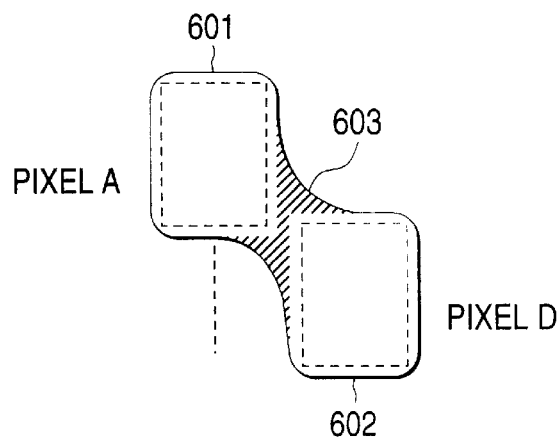
FIG. 5 is a diagram showing the connection of dots established according to the first conventional example.
Figure 6:
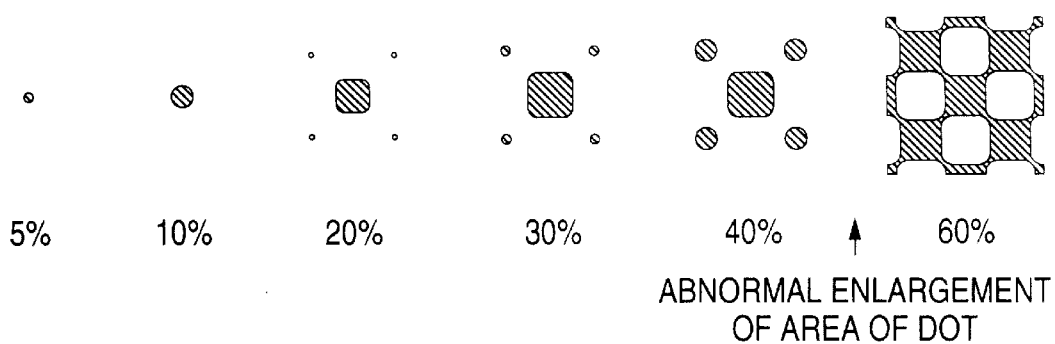
FIG. 6 is a diagram showing abnormal enlargement of the dot area occurring according to the first conventional example.

The foregoing phenomenon is applied to a case where the pixel having a second priority order is a pixel D. The outline of a dot formed when the value of the pixel D has been enlarged to a certain size is formed into a connected shape as shown in FIG. 5 because the potential slope realized by a pixel A601 and that realized by a pixel D602 affect each other. Also the area of the dot formed on the medium at this time includes an excess area 603. Therefore, the total area of the pixels A and D is enlarged at an excessively high ratio at a moment at which the two pixels are connected as compared with the ratio before the pixels are connected, as shown in FIG. 6.

Figure 7:
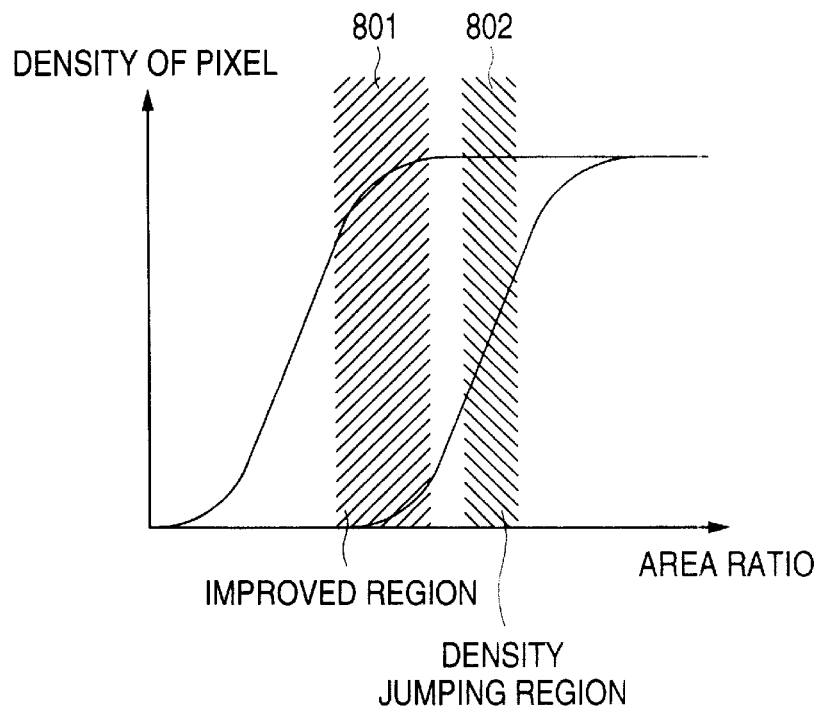
FIG. 7 is a diagram showing a region in which jumping of the density takes place according to the first conventional example.

The foregoing fact enables the gradation expressing characteristic in an improved region 801 shown in FIG. 7 to be improved, as described above. However, jumping of density takes place in, for example, a density jumping region 802 in which pixels A and D are affected mutually and thus dots are connected to each other.

The excessive enlargement of the area of the dots cannot be prevented for the system using the electrophotographic method to raise/lower the area ratio and no effective solving means is known. If dots of a type having the area ratio which is changed considerably is used to express an image, jumping of density takes place. If the worst comes to the worst, a pseudo outline is generated, causing the quality of the image to deteriorate.

Figure 8:
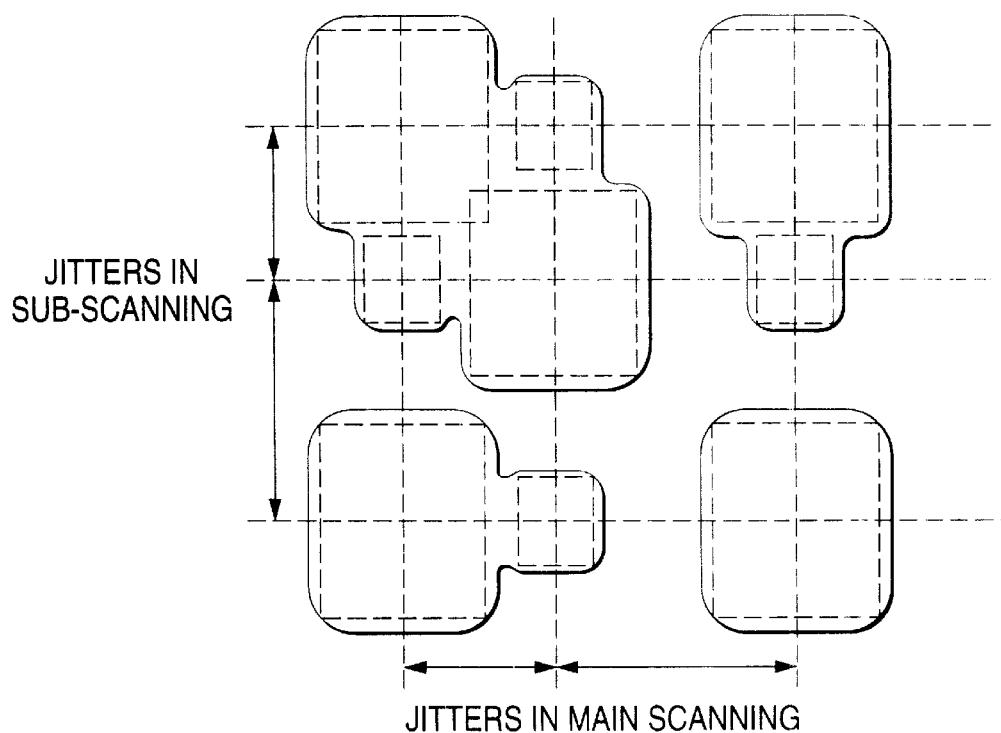
FIG. 8 shows density irregularity occurring due to jitters according to the first conventional example.

An outline of a dot which is formed when jitters in the main scanning direction or the sub-scanning direction of the exposure light beam take place in a state where the potential slopes interfere with each other is shown in FIG. 8.

As can be understood from FIG. 8, the area of the dot becomes instable., causing nonuniformity of the density of the image to occur. Thus, there arises a problem in that the quality of the image deteriorates.

As described above, the laser beam printer (LBP) easily encounters various nonuniformity of densities, such as linear nonuniformity in the main and sub scanning directions attributable to jumping of the density and jitters occurring during the exposure and the operation of the photosensitive member. Since the linear nonuniformity extending in the main scanning direction causes color irregularity to take place when colors are superimposed in the color LBP, the quality of the formed image deteriorates excessively.

The second and third conventional examples cannot satisfactorily solve the above-mentioned problem as described at the outset of this specification.

As described above, various nonuniformity of density undesirably takes place because of the potential gradient when the dots for forming a half tone image are positioned closely to each other.

To solve the above-mentioned problem, the present inventors of the present invention contrived a variety of a control device capable of optimizing the distance among dots which are formed to correspond to a plurality of adjacent pixels in the basic cell and which are enlarged to correspond to change in the density of an image (and optimizing an influence of potential gradient caused from the distance).

Referring to FIGS. 9 to 59, embodiments of the present invention will now be described.

Figure 9:
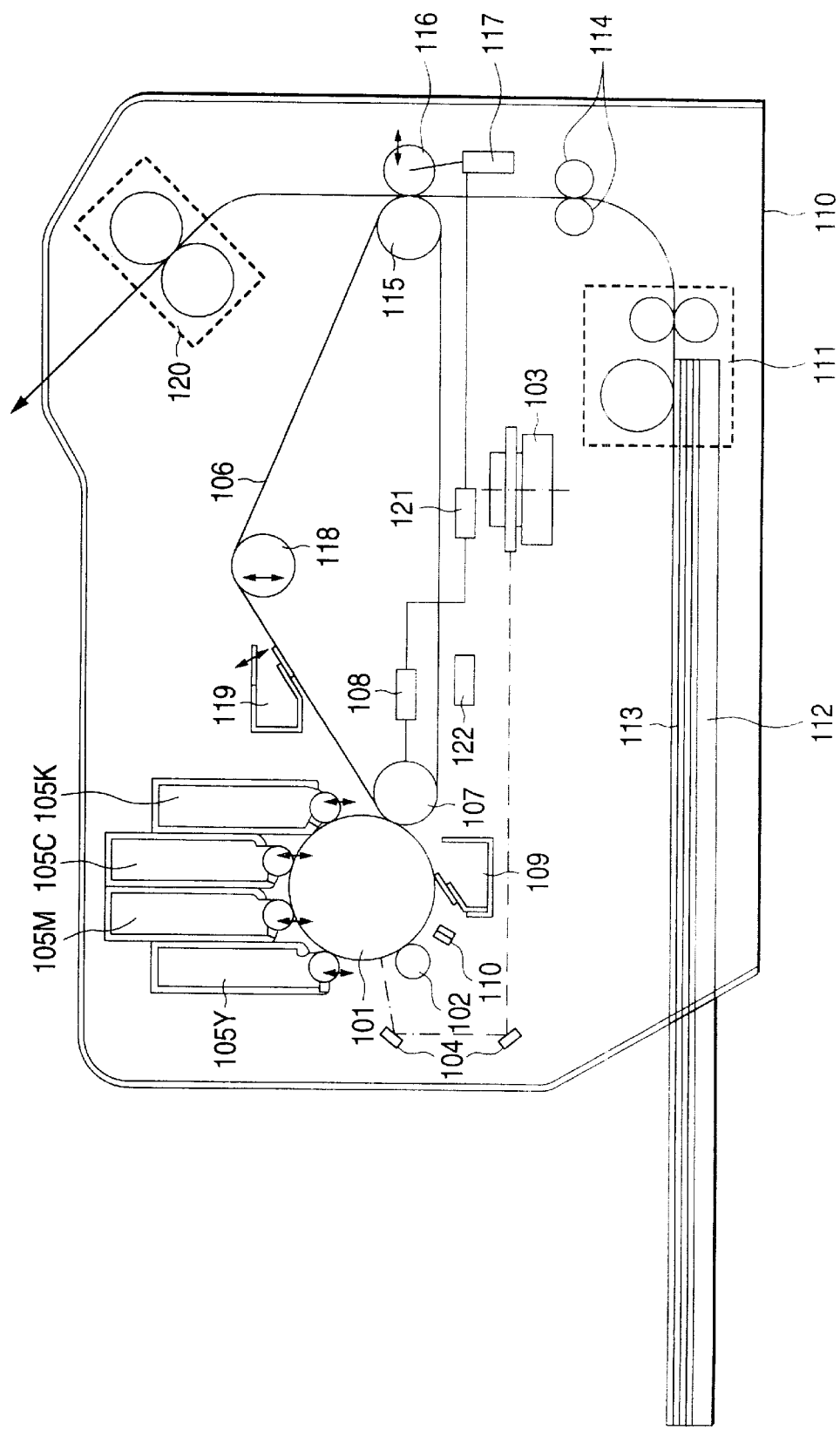
FIG. 9 is a diagram showing the overall structure of an image forming apparatus according to a first embodiment of the present invention.

Referring to FIGS. 9, the whole construction of an image forming apparatus according to the embodiments of the present invention will now be described.

FIG. 9 shows an example of the image forming apparatus according to the present invention and is a cross sectional view showing the image forming apparatus using the electrophotographic method. The image forming apparatus includes an electrophotographic processing portion 100 and a control unit 200. Referring to FIG. 9, the structure of the electrophotographic processing portion 100 and the operation of the same which is performed when an image is formed will now be described.

A charging roller 102 electrostatically charges the photosensitive member 101 uniformly to, for example, −700 V. The laser beam formed by the laser scanner 103, and having a resolution of 600 dpi (dot per inch) is guided by a return mirror 104 to the surface of a photosensitive member 101 so that the electrostatic latent image is formed. The laser beam formed in the apparatus according to this embodiment has a beam diameter of 60 μm in the main scanning direction and 70 μm in the sub-scanning direction at a position at which the intensity is $1/e^2$. The main scanning direction is a direction in which the laser beam is scanned by the laser scanner 103. The sub-scanning direction is a direction perpendicular to the main scanning direction, the direction being a direction in which the photosensitive member 101 and an intermediate transfer member 106 are rotated and that in which a recording medium 113 is moved.

Developing units 105Y, 105M, 105C and 105K which are developing devices and which are one-component contact type developing units are able to be brought into contact and separated in directions indicated by arrows shown in the drawing. Initially, the yellow (Y) developing unit 105Y of the foregoing developing units is brought into contact, while the other developing units are separated. Moreover, negative-electrostatically charged yellow toner is, due to an action of a power source (not shown), inversely developed so as to be formed into a visual image on the photosensitive member 101. The visualized yellow toner is transferred to the surface of the intermediate transfer member 106 allowed to have a proper resistance level by dispersing carbon in ETFE (ethylenetetrafluoroethylene copolymer) attributable to an effect of an electric field generated when bias having polarity opposite to that of the toner is applied to a primary transfer roller 107 by the primary transfer power source 108. Toner left from the transferring operation and existing on the photosensitive member 101 is recovered by a photosensitive-member cleaner 109 having a contact type cleaning blade. Then, the potential of the photosensitive member 101 is reset by a destaticizing lamp 110.

A similar operation is performed for the magenta (M) developing unit 105M, cyan (C) developing unit 105C and the black (K) developing unit 105K by synchronizing the position of the intermediate transfer member 106 and the light emission timing for the laser scanner 103 so that toners in the respective colors are superimposed on the intermediate transfer member 106. Thus, a full color image is formed. In the above-mentioned period, a second transfer roller 116 and are intermediate-transfer-member cleaner 119 are brought to a separated state.

On the other hand, the recording medium 113, such as paper or an OHP sheet, is fed from a paper feeding cassette 112 to a pair of resist rollers 114 by a paper feeding device 111, and then, in synchronization with the full color image on the intermediate transfer member 106, conveyed to the secondary transferring portion formed by a drive roller 115 and a second transfer roller 116 arranged to be moved in a direction indicated by an arrow shown in the drawing. In the secondary transferring portion, the second transfer roller 116 is brought into contact with the intermediate transfer member 106 in synchronization with the recording medium 113 so that the pressing nipping portion is formed. Moreover, voltage determined by a calculating device 121 for calculating voltage obtained from the primary transfer power source 108 is controlled to a predetermined level by a second transfer power source 117. An effect of the electric field of the voltage causes a full color toner image to be formed on the recording medium 113. Then, the recording medium 113 is fixed by a fixing device 120, and then discharged to the outside of the apparatus.

The electrophotographic processing portion is further provided with a patch sensor 122 serving as a density measuring device and being disposed downstream from the primary transfer roller, the patch sensor 122 being disposed opposite to the surface of the intermediate transfer member 106. The patch sensor 122 is a sensor formed by combining a LED and a photosensor and arranged to A/D-convert the read value and supply the obtained value to a control system. The patch formed on the surface of the intermediate transfer member 106 is read by the patch sensor 122 because the intermediate transfer member 106 is conveyed.

Figure 10:
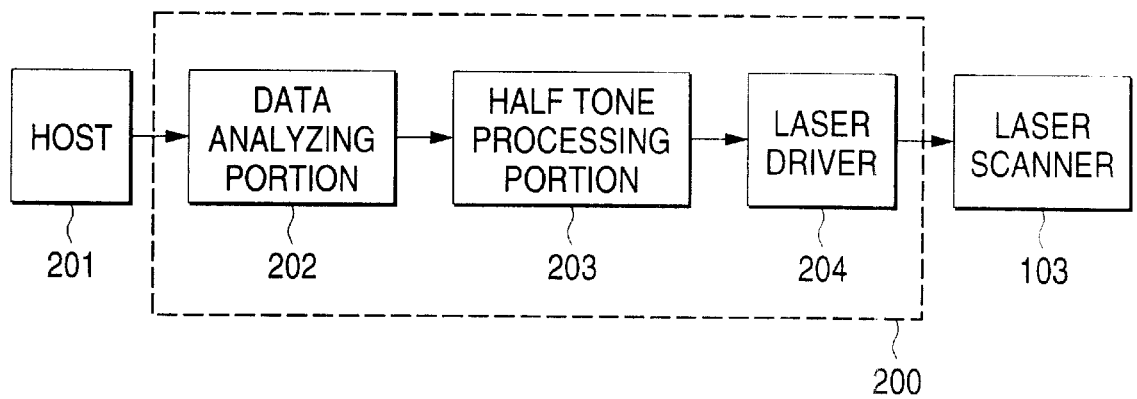
FIG. 10 is a block diagram showing the structure of a control unit of the image forming apparatus shown in FIG. 9.

FIG. 10 is a block diagram showing the structure of the control unit 200 of the apparatus according to this embodiment. Data supplied from a host 201, such as a personal computer, is separated into a control command and image data in a data analyzing portion 202 so that image data is supplied to a half tone processing portion 203. The half tone processing portion 203 quantizes image data to a predetermined number of levels for each "pixel" of 600 dpi which is the resolution of the printer. In accordance with quantized data supplied from the half tone processing portion 203, the laser driver 204 transmits a signal for turning a laser beam on/off to the laser scanner 103.

First Embodiment

A first embodiment of the present invention will now be described with reference to the drawings.

Figure 11:
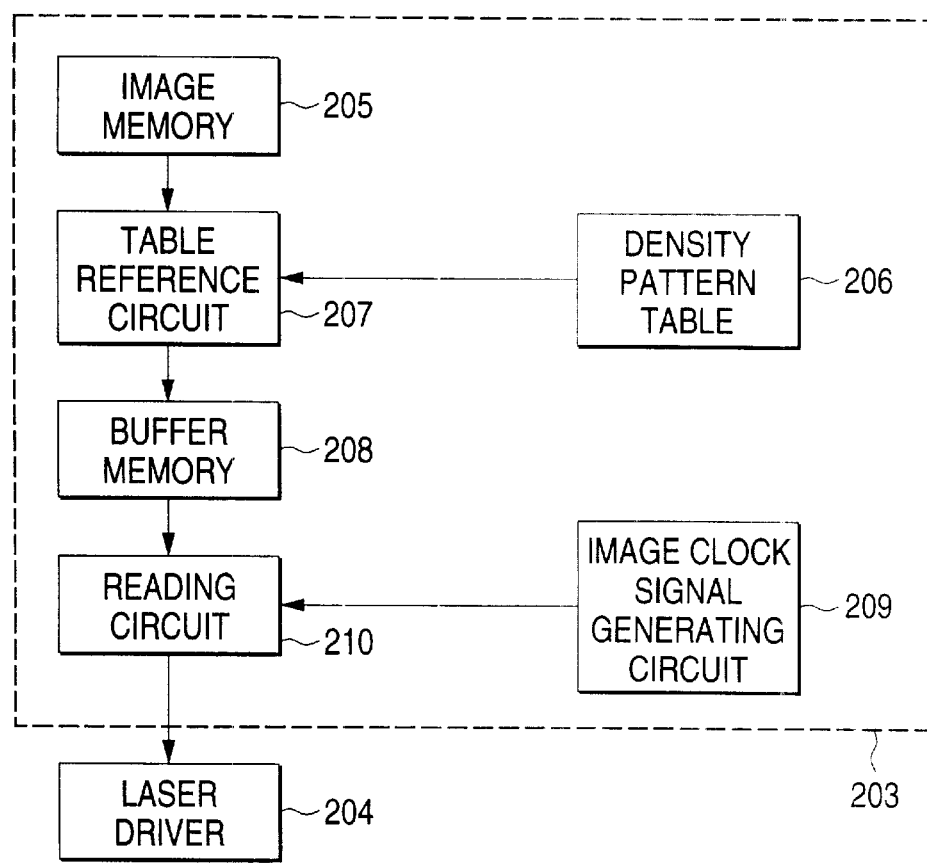
FIG. 11 is a block diagram showing the structure of the half tone processing portion shown in FIG. 10.
Figure 12:
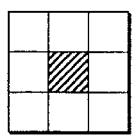
FIGS. 12(a) to 12(i) each show a diagram showing a density pattern cell for use in the half tone processing portion shown in FIG. 10.
Figure 12:
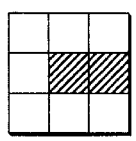
Figure 12:
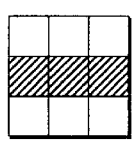
Figure 12:
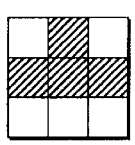
Figure 12:
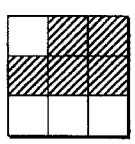
Figure 12:
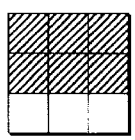
Figure 12:
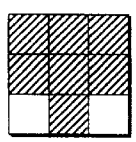
Figure 12:
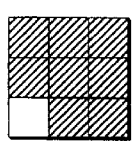
Figure 12:
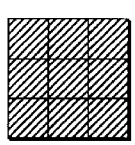

FIG. 11 is a block diagram showing the structure of the half tone processing portion 203 according to this embodiment. Reference numeral 205 represents an image memory for storing 200 dpi and 8-bit image data for each color, that is, image data having a value of 0 to 255. Reference numeral 206 represents a density pattern table having density patterns, 207 represents a table reference circuit for receiving multivalue image data and outputting a density pattern corresponding to the multivalue image data, and 208 represents a buffer memory for storing high resolution binary data subjected to the density pattern process. Reference numeral 209 represents an image clock signal generating circuit for generating an image clock signal serving as timing at which data is read when an image is formed in the electrophotographic processing portion 100. Reference numeral 210 represents a reading circuit for reading data stored in the buffer memory 208 to supply read data to the laser driver in synchronization with the image clock signal.

FIGS. 12(a)–(i) show a density pattern cell composed of 3 pixels×3 pixels. Referring to FIGS. 12(a)–(i), symbol OD represents the density expressed by each pattern, and image id represents the index number of each density pattern. Pixels provided with hatching are pixels for turning a laser beam on (dot on), while the other pixels are those for turning a laser beam off (dot off).

Referring to FIG. 11, the operation of this embodiment will now be described.

Prior to forming an image, 200 dpi and 8-bit image data is sequentially read from the image memory 205, and then supplied to the table reference circuit 207. In the table reference circuit 207, a reference to the density pattern table 206 is made such that the value of supplied image data is used as an index so as to output a 3 pixel×3 pixel binary pattern corresponding to image data to the buffer memory 208. If image data is 214, pattern indicated as id=214 in FIG. 12(e) is output. Thus, supplied 200 dpi multivalue image data is converted into 600 dpi binary image data.

When an image forming operation is started in the electrophotographic processing portion 100, converted data indicating dot on or dot off obtained from the buffer memory 208 is supplied to the laser driver 204 so that the laser scanner 103 is operated.

If a resolution obtained by multiplying the number of vertical and horizontal pixels in the density pattern cell and the output resolution of the printer and the resolution of supplied image data do not coincide with each other, the resolution of the supplied image is required to be converted by interpolating calculation when the image is stored in the image memory 205. If the density pattern cell is composed of pixels by the number which is the same as a ratio (3 in both vertical and horizontal directions) of the resolution (200 dpi) of supplied image data and resolution (600 dpi) of output, the interpolation calculation can be omitted, and thus the processing speed can be improved. Moreover, discontinuity of texture and gradation occurring due to an error of the interpolation calculation can be prevented so that an output having a satisfactory image quality is output.

The density pattern according to this embodiment will more specifically be described with reference to FIGS. 12(a)–(i). The density pattern cell has a size of three pixels in the main scanning direction and three pixels in the sub-scanning direction. Since the foregoing printer has a resolution of 600 dpi, the size of one pixel is 42 µm. Therefore, the density pattern cell has size of 126 µm in both main scanning direction and sub-scanning direction.

As the half tone density ranged from 0.15, which is the lowest density which can be output from the apparatus according to this embodiment to 0.6 or lower and including the density of the skin color, the patterns shown in FIGS. 12(a)–(c) are selected. Thus, only the elements on the second line in the sub-scanning direction are made to be dot-on. As a result, if the same patterns are arranged in the sub-scanning direction, the interval of the dots in the sub-scanning direction is made to be 126 µm. By setting the density pattern as described above, the interval of dots in the sub-scanning direction in the half tone region is made to be 1.5 times or more 70 µm, which is the size of the exposure light beam spot of the apparatus in the sub-scanning direction.

Figure 13:
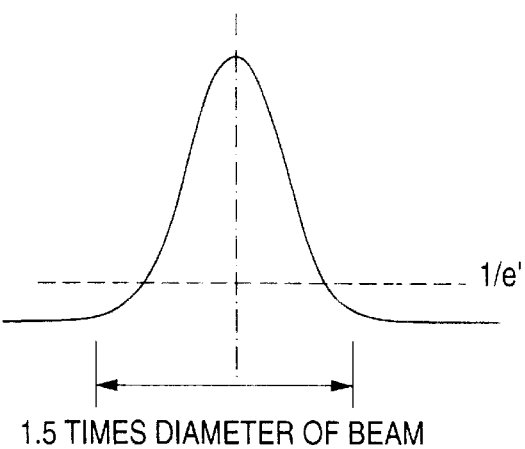
FIG. 13 is a graph showing light quantity distribution of a laser beam in the image forming apparatus shown in FIG. 9.

The laser beam has a light quantity distribution as shown in FIG. 13. That is, the light quantity is reduced in the direction toward the base of the light quantity distribution, and also the quantity of change of the light quantity is reduced. If the adjacent dots are disposed at intervals which are 1.5 times or more the diameter of the laser beam spot, the influence of the light quantity of the adjacent dots can substantially be eliminated even in a case where the position of the adjacent dots is changed by about one pixel attributable to, for example, irregularity in feeding. Thus, change of the density of the dot forming the screen can be prevented even if irregularity in feeding takes place. As a result, linear nonuniformity can be prevented.

An apparatus structured to have a larger spot diameter, for example, 100 µm, in the sub-scanning direction is required to use a cell composed of four pixels in the sub-scanning direction if the resolution is 600 dpi to prevent interference between dots. If the size of the cell in the main scanning direction is made to be smaller than four pixels, deterioration in the resolution can be prevented. If the spot diameter in the main scanning direction is made to be 1/1.5 or less of the spot diameter in the sub-scanning direction, interference with the adjacent dots in the main scanning direction can be prevented and thus higher resolution can be obtained. If the structure having a smaller spot diameter in the main scanning direction as compared with that in the sub-scanning direction is combined with a laser driver for modulating the pulse width to be described later, the modulated pulse width and the size of the formed dot satisfactorily correspond to each other and thus an excellent result can be realized.

If an apparatus having a smaller spot diameter, for example, 50 µm, in the sub-scanning direction, is arranged to be used with a density pattern cell having a size of two pixels in the sub-scanning direction, interference between dots can be prevented. Since the size of the cell is very small for the apparatus of the foregoing type, the resolution can satisfactorily be raised. Since nonuniformity can be prevented in a density region in which a gap of one pixel is maintained in the sub-scanning direction, an advantage can be realized in which nonuniformity can be prevented in a density region that is wider, as compared with the foregoing example. If this structure is combined with the foregoing density pattern, nonuniformity can be prevented in the overall half tone density region except for a shadow region having a density higher than 1.1 shown in FIG. 12(f).

As shown in FIGS. 12(a)–(d), although a dot is connected to an adjacent dot in the main scanning direction in a case of FIG. 12(c), enlargement of the dot in the sub-scanning direction is prevented before the case of FIG. 12(c). Thus, the first and third rows of the pattern cell are retained to be dot off. Thus, the density region, in which the interference between dots can be prevented, can be widened. In particular, interference between dots can be prevented in a low density region, which is an important region for improving the quality of the image. Thus, generations of stripes due to irregularity in feeding, density nonuniformity and color nonuniformity can be prevented.

Even if the head alignment of the laser scanner in the main scanning direction is deviated, only a shift of the line in the main scanning direction takes place in the main scanning direction. Therefore, meandering of a screen line which is a problem for a usual line screen in the sub-scanning direction can be prevented. Thus, a smooth half tone image can be obtained.

When a density pattern cell is structured such that the size in the sub-scanning direction is enlarged to enlarge the interval between dots, interference between dots can be prevented to a high density region. If the size of the cell is enlarged excessively, the screen structure becomes conspicuous. Therefore, it is preferable that the size in the sub-scanning direction be made to be about three times or less the exposure spot size.

As described above, this embodiment is applied to an image forming apparatus of a type structured in such a way that the basic cell is formed by a predetermined area having a size larger than one or more pixels in the main scanning direction and two or more pixels in the sub-scanning direction and the dot size in the cell is enlarged to correspond to the density so as to output a halftone image. That is, dots are formed in the sub-scanning direction to be apart from one another for distances which are not smaller than 1.5 times the diameter of the exposing light beam spot. Moreover, the dot is enlarged in only the main scanning direction until the dot is connected to a dot in a cell adjacent in the main scanning direction. As a result, linear nonuniformity extending in the main scanning direction can be prevented even if the reflection mirror in the laser scanner tilts or irregularity occurs in feeding the.photosensitive member or in operating the intermediate transferring member. If the structure according to this embodiment is applied to, for example, a color image forming apparatus arranged to superimpose colors, color irregularity can be prevented. Moreover, nonuniformity occurring at indefinite period can be prevented as well as nonuniformity occurring at definite periods.

The structure is arranged in such a manner that the dot is enlarged in the sub-scanning direction after enlargement of the dot in the main scanning direction has been completed. Therefore, an effect can be obtained in that nonuniformity can be prevented in a wide density region.

Second Embodiment

Figure 14:
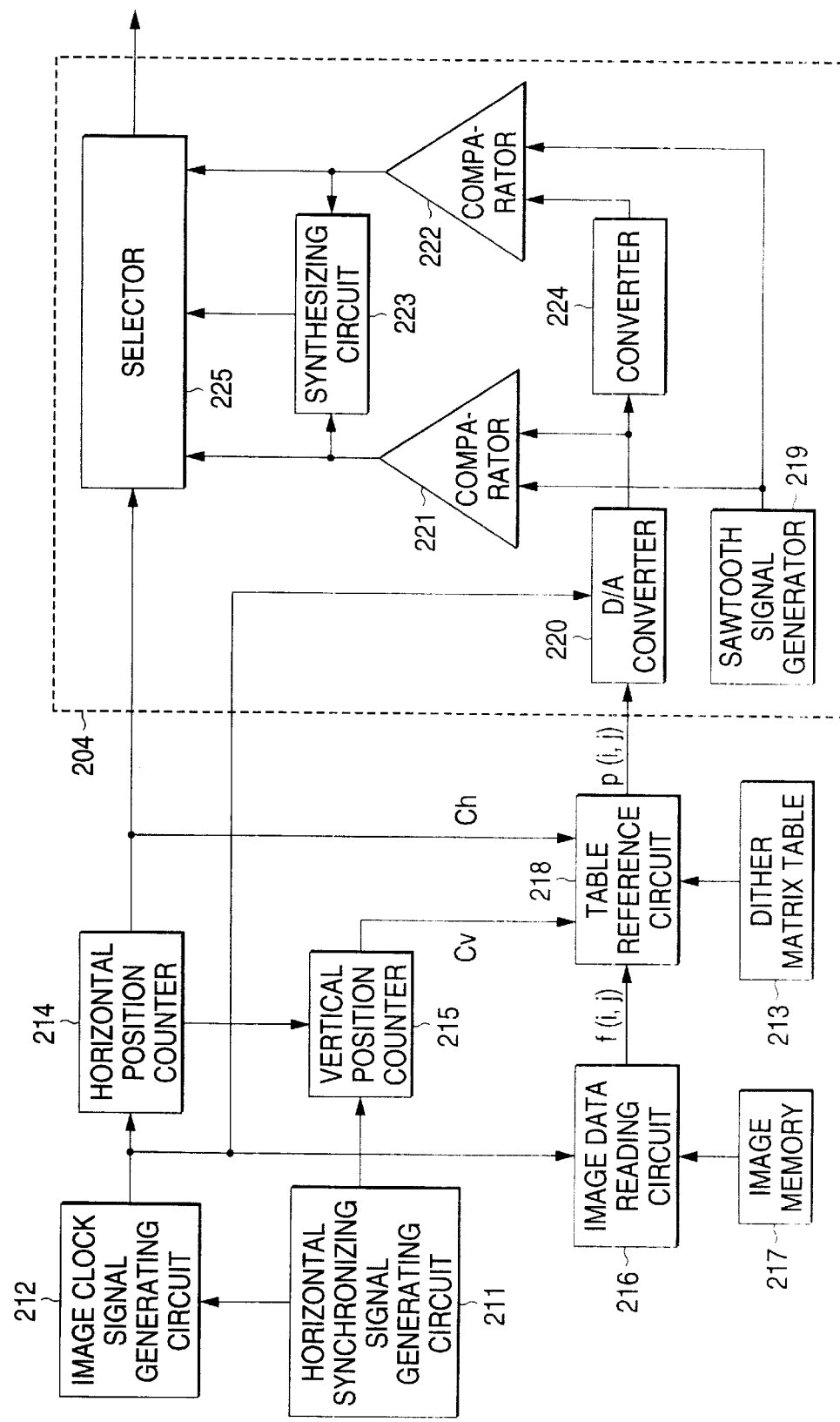
FIG. 14 is a block diagram showing another example of the half tone processing portion shown in FIG. 10.

FIG. 14 is a diagram showing the structure of a half tone processing portion 203 according to a second embodiment. Reference numeral 217 represents an image memory having 600 dpi and 8-bit multivalue image data for each color. Reference numeral 211 represents a horizontal synchronizing signal generating circuit for detecting horizontal synchronization of scanning and generating a signal at the timing of the horizontal synchronization. Reference numeral 212 represents a image clock signal generating circuit for generating an image clock signal having the same period as the period for which the laser beam scans the size of one pixel. Reference numeral 213 represents a dither matrix table having a dither matrix composed of cells each of which has size of 3 pixels×3 pixels.

Reference numeral 214 represents a horizontal position counter for receiving the image clock signal to output count Ch, the period of which is the size of the dither matrix in the main scanning direction. Reference numeral 215 represents a vertical position counter for receiving the horizontal synchronizing signal to output count Cv, the period of which is the size of the dither matrix in the sub-scanning direction. Since the size of the dither matrix is 3×3 in the apparatus according to this embodiment, both the horizontal position counter and the vertical position counter are counters set to three periods. Reference numeral 216 represents an image data reading circuit for receiving the image clock signal to read multivalue image data f (i, j) stored in the image memory 217. Note that symbols i and j respectively indicate the position of a pixel of image data in the sub-scanning direction and that in the main scanning direction.

Reference numeral 218 represents a table reference circuit for receiving the horizontal position count Ch, the vertical position count Cv and image data f (i, j) to make a comparison with corresponding data in the dither matrix table 213 so as to output pulse width data p (i, j) indicating the required level of the pulse width among 9 levels (including 0) for each pixel. Reference numeral 204 represents the laser driver comprising a sawtooth signal generator 219, a D/A converter 220, comparators 221 and 222, a synthesizing circuit 223, a converter 224 and a selector 225, the laser driver 204 being arranged to receive pulse width data p (i, j), the horizontal position count Ch and image clock to output a laser drive pulse modulated in 1/8 units of the width of one pixel.

Table 1 is a correspondence table showing the relationship between the pulse width data p (i, j) which is the input for the laser driver 204 and the width of the laser drive pulse.

TABLE 1

| p (i, j) | Width of Laser Drive Pulse |
|---|---|
| 0 | 0/8 |
| 31 | 1/8 |
| 63 | 2/8 |
| 95 | 3/8 |
| 127 | 4/8 |
| 159 | 5/8 |
| 191 | 6/8 |
| 223 | 7/8 |
| 255 | 8/8 |

FIGS. 15(a)–(h) show a dither matrix for use in this embodiment. The matrix is arranged such that eight matrices each having size of 3 pixels in the main scanning direction, which is the horizontal direction of FIGS. 15(a)–(h), and 3 pixels in the sub-scanning direction, which is the vertical direction. The matrices are structured to correspond to 8 levels of the pulse width of the output except for zero. Three thresholds appearing on the second row in the sub-scanning direction are 24, 3 and 16 in m1 shown in FIG. 15(a), and 40, 3 and 32 in m2 shown in FIG. 15(b). A maximum value of 144 appears on the second row and first column in m8 shown in FIG. 15(h). On the other hand, the minimum value of the threshold appearing on the first row and the third row is 148 appearing in m1. As described above, the maximum value of the threshold appearing on the second row is made to be smaller than the thresholds appearing on the other rows.

Since the structure is formed as described above, enlargement of a dot in the main scanning direction is given priority to that in the sub-scanning direction. In particular, enlargement in the main scanning direction is completed, and then enlargement in the sub-scanning direction starts.

The operation of the apparatus according to this embodiment will now be described with reference to FIG. 14.

When an operation for forming an image has been started, scanning with a laser beam emitted from the laser scanner 103 is started, and horizontal synchronizing signals are generated by the horizontal synchronizing signal generating circuit 211. The horizontal synchronizing signals are counted by a vertical position counter 215 so as to be converted into the count signal Cv having the period which is the size of the dither matrix in the vertical (the sub-scanning) direction. The image clock signal generating circuit 212 is turned on such that the horizontal synchronizing signal is used as a trigger. In synchronization with the image clock, multivalue data f (i, j) is read from the image memory 217 by the image data reading circuit 216 so as to be supplied to the table reference circuit 218.

At the time at which the multivalue image data f (i, j) is read, the value of the output Cv from the vertical position counter 215 is mod (i, 3) (where mod (x, y) indicates a remainder obtained by dividing x by y), while the value of output Ch from the horizontal position counter 214 is mod (j, 3).

The table reference circuit 218 initially reads threshold m1 (Cv, Ch) corresponding to the row Cv and column Ch in the dither matrix m1 with which a determination is made as to whether the pulse width 1/8 is output so as to be compared with image data f (i, j). If m1 (Cv, Ch) is larger than f (i, j), the output p (i, j) from the table reference circuit 218 is made to be 0. If m1 (Cv, Ch) is not more than f (i, j), threshold m2 (Cv, Ch) for the dither matrix m2 with which a determination is made as to whether the pulse width 2/8, which is a larger pulse width is output, is read so as to be compared with f (i, j). If m2 (Cv, Ch) is not more than f (i, j), it is similarly compared with threshold m3 (Cv, Ch) corresponding to a next pulse width. If m2 (Cv, Ch) is larger than f (i, j), further comparison is inhibited so that the output p (i, j) is, as shown in Table 1, made to be 31 corresponding to the pulse width 1/8.

As described above, thresholds are sequentially read from the dither matrices corresponding to the wider pulse widths until the threshold is made to be larger than image data so as to be compared with image data. The foregoing sequential process is completed within one period of the image clock.

The output p (i, j) from the table reference circuit 218 is supplied to the laser driver 204 at the period of the image-clock so as to be converted into voltage Vd in a range from 0 [V] to 5 [V] by the D/A converter 220. At the same period of the image clock, sawtooth voltage Vs in a range from 0 [V] to 5 [V] is generated by the sawtooth generator 219. The comparator 221 compares Vs and Vd with each other so that pulse signals are output from the comparator 221 in a period in which Vd is higher than Vs. Voltage Vd is converted into a voltage of 5−Vd [V] by the converter 224 so as to be compared with Vs by the comparator 222. The comparator 222 outputs pulse signals in a period in which 5−Vd is higher than Vs.

The outputs from the two comparators are synthesized in the synthesizing circuit 223 so as to calculate their logical, and then corrected to have the original pulse width so as to be output to the selector 225. In addition to the pulse signals output from the two comparators, horizontal count value Ch is supplied to the selector 225. The selector 225 selects and outputs the output from the comparator 221 when Ch is 0, selects and outputs the output from the synthesizing circuit 223 when Ch is 1 and selects and outputs the output from the comparator 222 when Ch is 2. In response to the output signal from the selector 225, the laser is operated. Thus, pulse signals generated to correspond to the respective pixels having Ch=0, 1 and 2 are collected for each cell so that appearance of the dot is stabilized.

Also this embodiment is able to prevent enlargement of the dots in the sub-scanning direction until the dot is connected to adjacent dots in the main scanning direction. Therefore, interference between dots in the low density region, which is important for improving the quality of the image, can be prevented. Thus, stripes occurring due to irregularity in feeding, density nonuniformity and color nonuniformity can be prevented.

Since this embodiment has the structure such that the pulse width is modulated in the main scanning direction by the laser driver 204 shown in FIG. 14, the width of the latent image in the main scanning direction can be changed without considerable change of the width of the latent image in the sub-scanning direction. Therefore, the number of gradation steps can be increased such that easy occurrence of interference of the latent image attributable to the irregularity in feeding in the sub-scanning direction is prevented.

Moreover, the excellent reproducibility of the original characteristic for the dither matrix against rapid density change at an edge or the like can be maintained.

As described above, the image forming apparatus according to this embodiment has the structure that the pulse width for turning the exposing light beam spot on is modulated to enlarge the dot in the main scanning direction in one pixel. Therefore, a smooth gradation expressing characteristic can be obtained.

Moreover, a halftone image is output by using the dither matrix having pixels by the same numbers in the row and columnar directions as the numbers of pixels in the above-mentioned cell. Therefore, an image having an excellent resolution can be obtained.

Third Embodiment

FIGS. 16(a)–(h) show a modification of the dither matrix for use in an apparatus similar to that according to the second embodiment. The matrix is different from the dither matrix according to the second embodiment in that the enlargement of the first column starts before the second column is completely enlarged.

FIGS. 17(a)–(d) show a process in which toner dots appear when image data of a half tone density is output from the apparatus according to this embodiment. FIGS. 17(a)–(d) show a range of about nine pixels in the vertical and horizontal directions such that dots provided with hatching are toner dots. Referring to FIGS. 17(a)–(d) and 16(a)–(h), a process in which dots are enlarged in this embodiment will now be described.

FIGS. 17(a), (b), (c) and (d) show appearances of toner dots when image data is 50, 120, 140 and 150. The greater the value of image data, the more the dots are enlarged (FIG. 17(a)→FIG. 17(b)) in the main scanning direction (in the horizontal direction shown in the drawing), and then connected to adjacent dots in the main scanning direction, and then enlarged in the sub-scanning direction (FIG. 17(c)→FIG. 17(d)).

When image data is 140, the pixel having Cv=1 and Ch is 0 and 2 does not output the pulse width of 8/8 because the threshold in the matrix m8' shown in FIG. 16(h) is 255. That is, enlargement of the dot in the main scanning direction is not completed. However, the dots of the output image are connected in the main scanning direction as shown in FIG. 17(c). That is, dots are connected before enlargement of the dot in the main scanning direction is completed.

When image data is 150, the pixel having Cv of 1 and Ch of 1, that is, the pixel to be compared with the second row and the second column of the dither matrix outputs a pulse width of 8/8. On the other hand, the pixel having Cv of 1 and Ch of 0 and 2, that is, the pixel to be compared with the second row and first column and the third column of the dither matrix outputs the pulse width of 7/8. These dots have not been completely enlarged in the main scanning direction. The pixel having Cv of 0 and Ch of 1, that is, the pixel to be compared with the element on the first row and the second column of the dither matrix outputs the pulse width of 1/8 because the threshold of m1' is 148. That is, enlargement of the dot in the sub-scanning direction starts before enlargement of the dot in the main scanning direction is completed. Thus, dots as shown in FIG. 17(d) are formed.

As a result, an effect of preventing nonuniformity and color irregularity substantially similar to that obtainable from the foregoing embodiments can be obtained. Since the dot is not enlarged until the highest density is instructed, the reproducibility of gradation can be moderated so that a smooth half tone image is output. Since the maximum pulse widths for a plurality of pixels are output when the highest density has been instructed, an image exhibiting high degree of saturation can be output.

The foregoing characteristic is a preferred characteristic when an image formed such that characters are superimposed on a natural image is output. That is, the natural image portion in an image of the foregoing type has substantially no portion which is instructed to have the highest density. On the other hand, a character portion is usually instructed to have the highest density. Therefore, the image forming apparatus according to this embodiment enables a smooth halftone image output as the natural image portion and a clear image output exhibiting a high degree of saturation as the character portion, without separating the natural image portion and a character portion which has been performed by a complicated structure by the conventional apparatus. As a result, a high quality output image can be obtained.

As described above, the image forming apparatus according to this embodiment has the structure that a dot is enlarged in the sub-scanning direction before enlargement of the dot in the main scanning direction is completed. Therefore, any special region separation is not required to obtain an output having a satisfactorily high degree of saturation in the character portions and a smooth gradation expressing characteristic in natural image portions.

Fourth Embodiment

FIGS. 18(a)–(p) show a modification of a density pattern for use in an apparatus formed similarly to that according to the first embodiment. The apparatus according to the fourth embodiment is different from that according to the first embodiment in that the resolution of image data supplied from the host is 150 dpi.

The density pattern according to this embodiment is structured such that enlargement of a dot formed when the lowest density is expressed in the sub-scanning direction is prevented until it is connected to a dot in a cell adjacent in the main scanning direction, as shown in FIGS. 18(a)–(h). Moreover, only the third row in the sub-scanning direction is enlarged. As a result, an interval not less than 1.5 times the spot diameter in the sub-scanning direction can be maintained from the cell adjacent in the sub-scanning direction. Although the screen structure can easily be recognized with the apparatus according to this embodiment as compared with the above-mentioned embodiments, stripes in a density region which substantially shares the half tone portion and which has a density of 1.0 or lower can be prevented. Since the screen structure is not conspicuous if the size of the output image is enlarged and the observing distance is elongated, the structure according to this embodiment can preferably be employed in an apparatus capable of outputting an image having a size of A3 or larger.

Also combination of the above-mentioned embodiments enables a satisfactory apparatus to be obtained. For example, a combination of the apparatus using the density pattern method according to the first embodiment and the laser driver according to the second embodiment enables an apparatus to be realized which is able to express 8 or more levels for each pixel. Also the foregoing apparatus enables a density pattern which is the same as that realized in the first embodiment to appear when the pulse width is the same as the size of the pixel. Therefore, generation of stripes occurring due to irregularity in feeding and color irregularity can be prevented in a density range similar to that of the first embodiment. Moreover, the foregoing apparatus is able to express smoother gradation.

The above-mentioned embodiments relate to the control device capable of maintaining at least a predetermined distance between dots in the basic cells adjacent in the sub-scanning direction. Moreover, the embodiments relate to the control device capable of optimizing the direction in which the dot is enlarged to correspond to the density of the image.

On the other hand, the following embodiments are arranged to provide a means capable of controlling the distance between dots in the adjacent basic cells and a means capable of optimizing the direction in which the dot is enlarged from a viewpoint of the area ratio of pixels.

Fifth Embodiment

Figure 19:
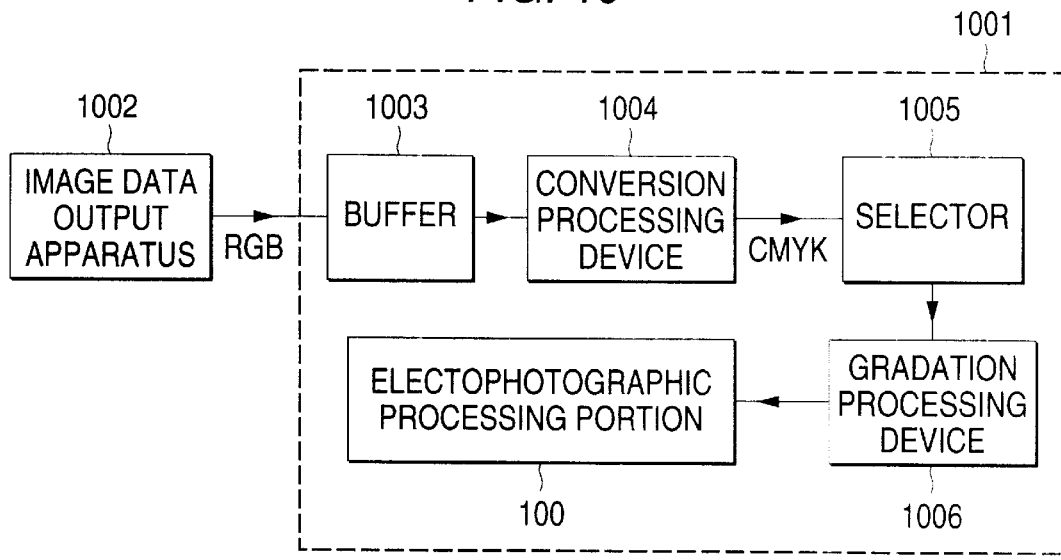
FIG. 19 is a block diagram showing the structure of an image forming apparatus according to an embodiment of the present invention.

FIG. 19 is a block diagram showing the structure of the image forming apparatus according to yet another embodiment of the present invention. Referring to FIG. 19, reference numeral 1001 represents a image forming apparatus which is an apparatus for forming image data output from an image data output apparatus 1002 onto a recording medium, such as paper, so as to output the formed image.

The image forming apparatus 1001 includes a buffer 1003 for storing image data output from the image data output apparatus 1002, a conversion process device 1004 for converting image data obtained from the buffer 1003 into data suitable to use in an image recording operation, a selector 1005 for selecting required data to be recorded, a gradation processing device 1006 according to the present invention and an electrophotographic processing portion 100 for recording an image on a recording medium. Note that the structure of the electrophotographic processing portion 100 is the same as that shown in FIG. 9.

The operation of the image forming apparatus will now be described.

Initially, image data required to be output from the image data output apparatus 1002 is transferred. In general, the image data output apparatus 1002 is a personal computer or a work station for outputting an image or a document produced in the foregoing apparatus. Therefore, data transferred from the image data output apparatus 1002 is generally RGB data which is displayed on a CRT.

Although the image forming apparatus according to the present invention is effective to output a monochromic image, the description will be performed about an image forming apparatus for outputting a color image.

Image data output from the image data output apparatus 1002 is supplied to the image forming apparatus 1001 so as to be initially stored in the buffer 1003. In general, since the speed of image data output from the image data output apparatus 1002 and the speed of image data to be processed by the electrophotographic processing portion 100 are considerably different from each other, the difference is absorbed by the buffer 1003. Since image data to be transferred is data of a color image, it is considered that the data size is very large. Therefore, a structure may be employed in which compressed image data is transferred to the buffer 1003. In this case, expansion process is performed in the buffer 1003 before image data is supplied to the following process, and then image data is supplied to the next conversion process device 1004.

Since image data to be supplied to the conversion process device 1004 is image data which can be displayed on the CRT of the image data output apparatus 1002, it is RGB data. To record RGB image data on an output medium, such as paper, RGB data must be converted into C (cyan), M (magenta) and Y (yellow) data which are three primary colors required to perform printing. In general, four colors including K (black) added to the three primary colors CMY in order to improve the color reproducibility are used to perform a printing operation. Therefore, the conversion process device 1004 converts RGB data to CMYK data.

After data has been converted into CMYK data by the conversion process device 1004, only one required color must be selected from CMYK as described later when the electrophotographic processing portion 100 forms an image such that forming of a monochromic image for one page is repeated by the number of the required colors. Therefore, effective monochromic data is selected from data for four colors by the selector 1005.

As a result, monochromic image data of each of CMYK is generated from RGB data. At this time, obtained image data is converted from RGB data into CMYK data to be adaptable to the gradation characteristic of the electrophotographic processing portion 100, the CMYK data having the number of gradations similar to that of RGB data.

However, the number of gradations of the electrophotographic processing portion 100 is, in general, very small as the number of gradations of the CRT. Therefore, a plurality of pixels are used to express the gradation to increase the number of gradations or the input gradation is rounded or approximation is performed so as to be converted into image data which can be expressed by the electrophotographic processing portion 100. The foregoing process is performed by a gradation processing device 1006.

Since the operation of the electrophotographic processing portion 100 is similar to that of the electrophotographic processing portion 100 shown in FIG. 9, the description of the structure is omitted.

The gradation processing device 1006, which is an essential portion of this embodiment, will now be described. The gradation processing device 1006 according to this embodiment is structured to determine the area ratio of each pixel in image data to dispose pixels corresponding to the second pixels.

In general, image data usually has 256 gradations for each of RGB. Therefore, data converted from RGB to CMYK is usually converted as 256 gradations for each color. However, the number of gradations allowed to each pixel for the resolution of the image forming apparatus is usually smaller than 256 although it is called the multivalue device.

Figure 20:
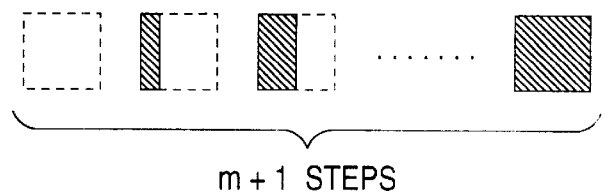
FIG. 20 is a diagram showing a process in which a pixel is enlarged.

Accordingly, as shown in FIG. 20, an image forming apparatus will now be described, and the system of which is structured such that the area in a pixel is enlarged/reduced in accordance with the value of each pixel and in which enlargement of the pixel starts at the left end to express m+1 gradations from 0 to m will now be described.

Figure 21:
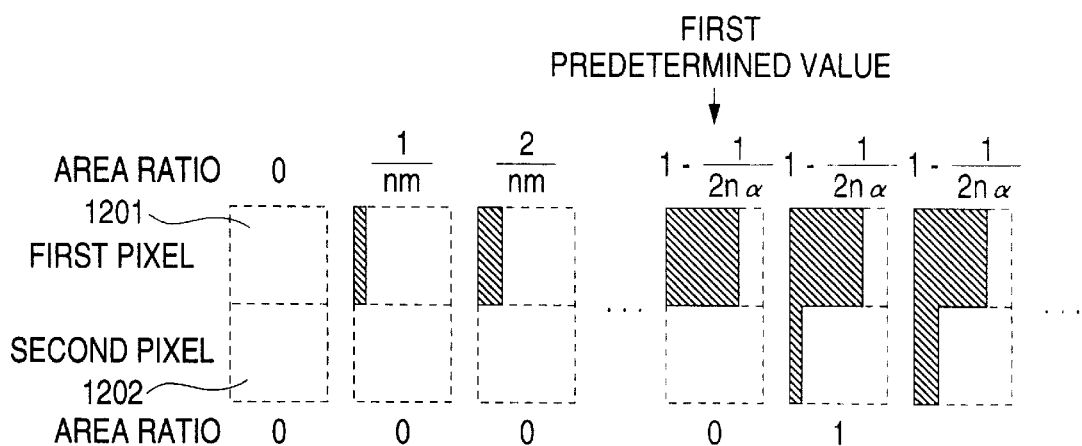
FIG. 21 is a view of explanatory of enlargement of a pixel in a fifth embodiment.

A state of enlargement of the pixel with respect to the input image data is shown in FIG. 21. In the enlarging process shown in FIG. 21, when the area ratio of a first pixel 1201 reaches a first predetermined value which is 1−1/2na, the size of the first pixel 1201 has a constant size. As an alternative to this, a second pixel 1202 positioned right below the first pixel 1201 is enlarged.

The first predetermined value 1−1/2na is a ratio when the maximum value of the area ratio is made to be 1. Symbol a indicates the ratio of the size of one pixel with respect to the diameter of a dot which is formed by a dot writing device of the foregoing image forming apparatus, and n indicates the ratio of a pixel having the maximum area ratio with respect to the size of one pixel.

When the maximum value of the area ratio of one pixel is 5 m, n is made to be 5 so that each pixel is able to have size corresponding to five pixels. The relationship between the magnitudes of a and n is shown in FIG. 22.

In general, a dot which is formed by the dot writing device has a distribution in which the density of the central portion of the dot is higher than that of the peripheral portion, as shown in FIG. 23. That is, the outline of the dot is obscure in the peripheral portion. Therefore, if two dots are positioned adjacently, the density distribution between the dots is changed in accordance with the distance between the dots.

Figure 24:
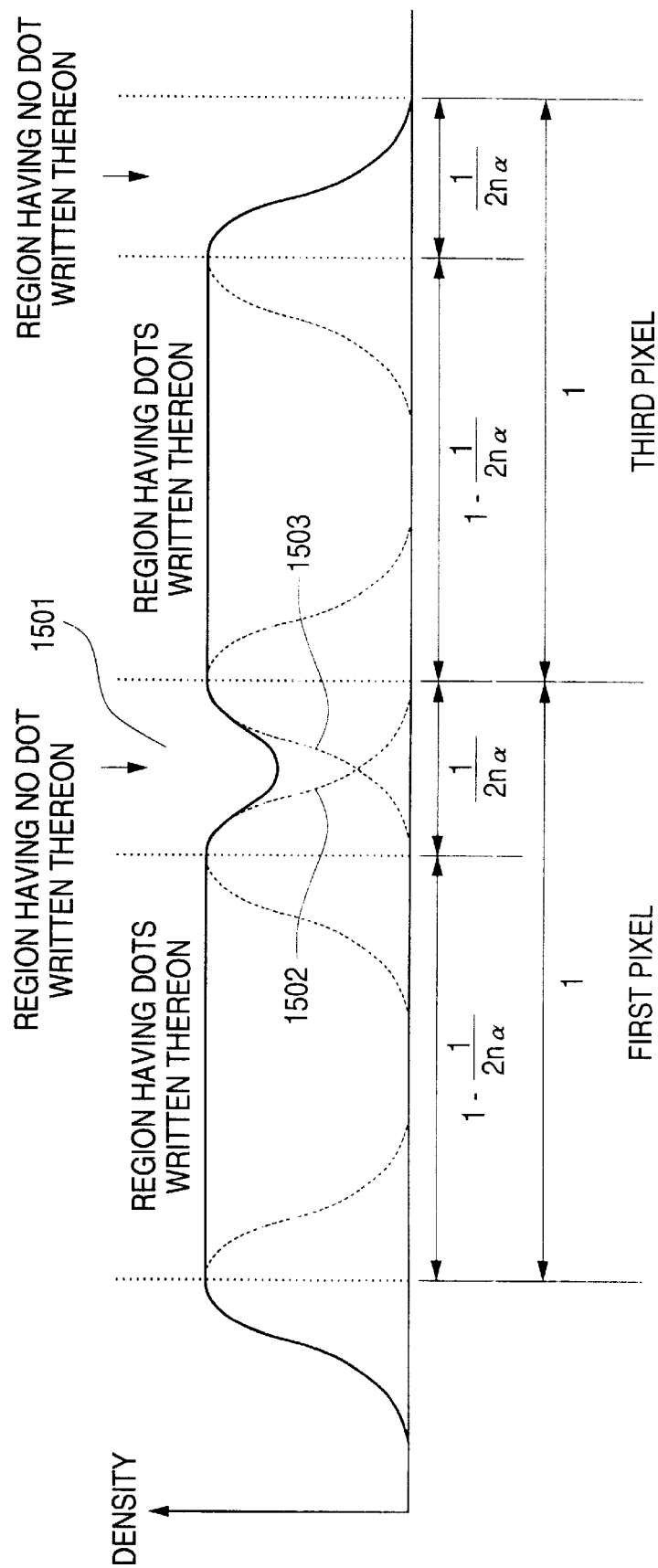
FIG. 24 shows distribution of densities when a first predetermined value is employed.

A density distribution which is realized when both of the first pixel and a third pixel adjacent in a direction in which the first pixel is enlarged have the first predetermined value which is 1−1/2na is shown in FIG. 24. Since the first predetermined value is the ratio with respect to the maximum area ratio, the size of a region 1501 in which no dot has been written is 1/2na. The value 1/2na corresponding to 1/2 of the diameter of the dot with respect to the maximum area ratio. Thus, a dot 1502 and a dot 1503 overlap by 1/2 of the diameter of the dot.

Therefore, the overlapped portion is further enlarged, the density in the region 1501 having no dot written thereon is raised sufficiently. That is, the dot formed by the first pixel and the dot formed by the third pixel are connected to each other so that they are formed into one dot.

Accordingly, enlargement of the first pixel is inhibited when the first predetermined value 1−1/2na is realized, and then the second pixel is enlarged to maintain the gradation characteristic.

Since the first predetermined value is the ratio with respect to the maximum area ratio, its maximum value is 1. Since the dots 1502 and 1503 are completely superimposed when the value is 1, 1 is not suitable as the first predetermined value, and therefore the first predetermined value must be smaller than 1.

It is preferable that the first predetermined value be included in a range not smaller than 0.3 and smaller than 1 in terms of a pulse width when the pulse width required to expose the overall area of the first pixel is made to be 1 in a case of an image forming apparatus comprising an image exposing device capable of modulating the pulse width as the dot writing device.

It is preferable that the image forming apparatus described with reference to FIG. 9 be provided with the laser scanner 103 using a laser beam and capable of modulating the pulse width. In a case where dots are written with the laser beams, the diameter of the dot is the same as the diameter of the laser beam spot and the dot is in the form of a circular or an ellipse shape.

Figure 25:
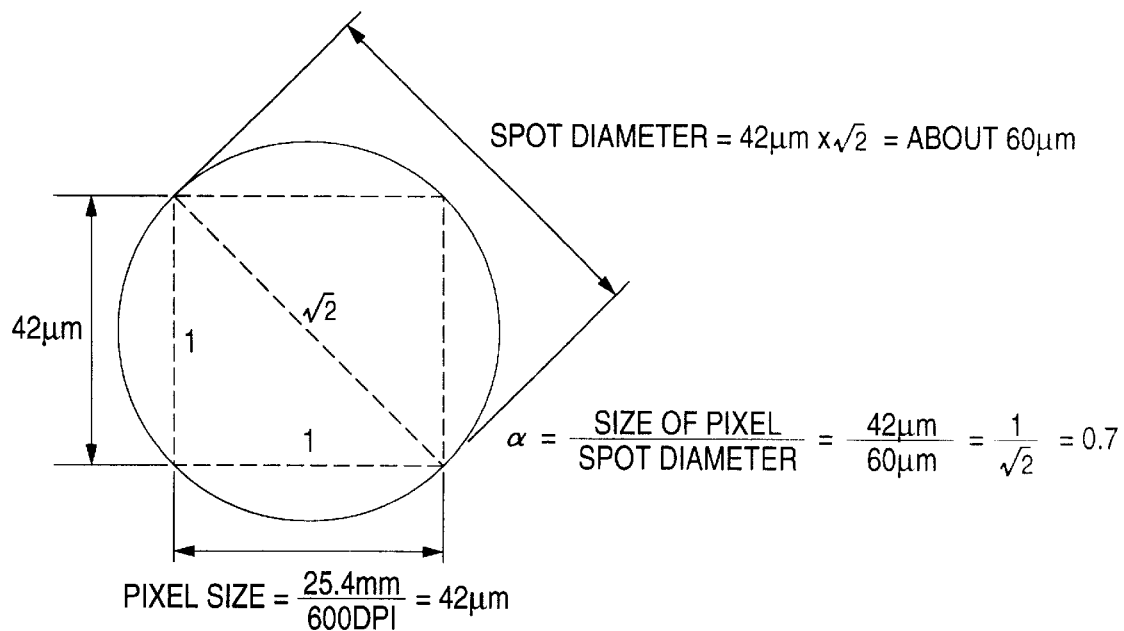
FIG. 25 shows the relationship between the diameter of a beam spot and the size of a pixel.

On the other hand, the pixel is formed into a rectangular shape having one side which is a unit length obtainable from a value, such as "dpi" which is the unit of the resolution of the image forming apparatus. Therefore, the structure is generally formed such that the relation is at least satisfied as shown in FIG. 25 to make the diameter of the beam for writing the overall pixel to be larger than the size of the pixel as is employed by the image forming apparatus having the resolution of 600 dpi described with reference to FIG. 9.

Therefore, since the ratio of the size of one pixel with respect to the spot diameter and expressed by a is 0.7 because a=/1√2, the first predetermined value is made to be 1−1/2na=0.3 in terms of the pulse width when the pulse width required to expose the overall area of the first pixel is made to be 1. That is, the pulse width required to expose one pixel is made to be 1 in the case where an image is expressed with the area ratio for pixel unit in which n=1.

Figure 26:
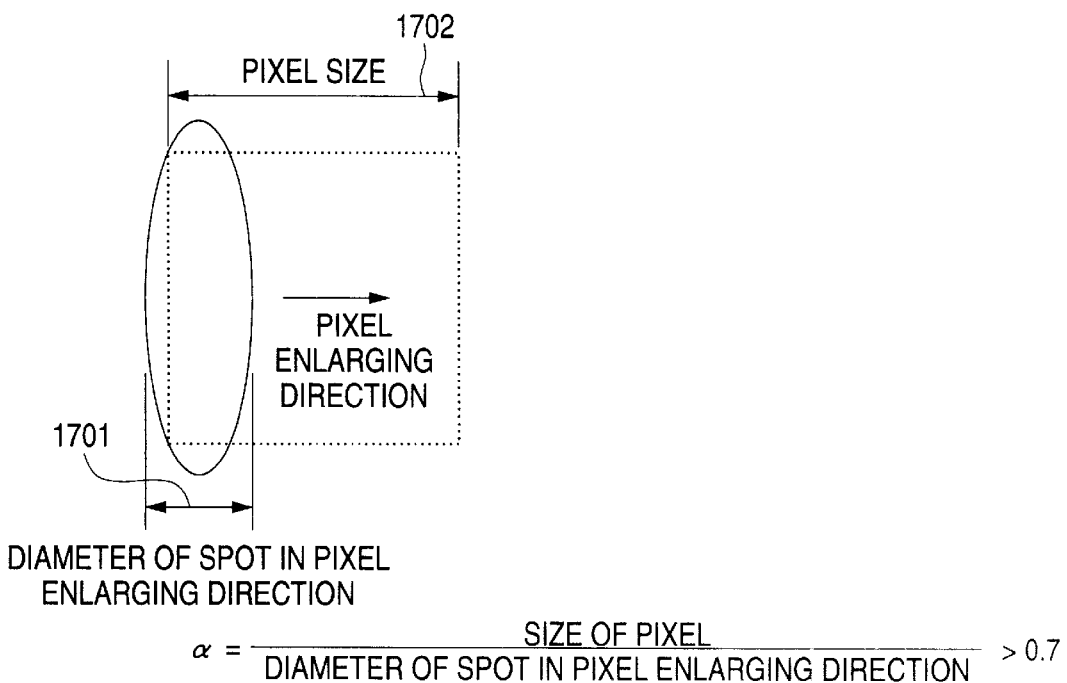
FIG. 26 shows another relationship between the diameter of a beam spot and the size of a pixel.

It is preferable that an image forming apparatus designed such that the diameter of a spot diameter 1701 in the enlarging direction for the pixel is smaller than a pixel size 1702 as shown in FIG. 26 in order to improve the gradation characteristic in one pixel, that is, a is made to be large value has a value included in a range from not smaller than 0.3 and smaller than 1.

Sixth Embodiment

This embodiment is structured to use an image forming apparatus shown in FIG. 9 and having resolution of 600 dpi such that a dot has size of two pixels or more when each pixel has a maximum area ratio in order to maintain a further improved gradation characteristic.

The fifth embodiment is structured to express density of m+1 gradations by providing values 0 to m for each pixel. However, since m is difficult to be enlarged to 255 in general, the size of the pixel can be enlarged to express the gradation in order to express further many gradations to improve the image quality.

Figures 27, 28:
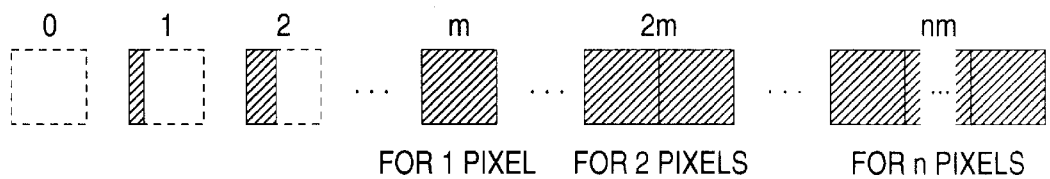
FIG. 27 is a view of explanatory of enlargement of a pixel.
FIG. 28 shows the relationship between the resolution and the first predetermined value.

That is, if the structure is formed such that the enlargement of the pixel is permitted to the size larger than one pixel and corresponding to n pixels, as shown in FIG. 27, m+1 gradations from 0 to m can be expressed in one pixel. Therefore, each pixel has a value of 0 to nm so that nm+1 gradations are expressed.

However, enlargement of the value of n to increase the number of gradations means enlargement of the size of each pixel. Therefore, the resolution deteriorates in this case. Thus, a range for n exists for simultaneously satisfying the number of gradations and the resolution.

FIG. 28 shows the resolution, the number of gradations and the first predetermined value when n is 1 to 10. Similarly to the foregoing embodiment, the first predetermined value is a value expressed as $1-1/2na$ in terms of the pulse width when the pulse width required to expose the overall area of the first pixel, that is, the pulse width required to expose all of n pixels, is made to be 1. In this case, a is 42 $\mu$m/60 $\mu$m=0.7. Although omitted from description performed with reference to FIG. 9, the number m+1 of gradations which can be expressed in one pixel is 33, that is, m=32.

If n is made to be 8 or more as shown in FIG. 28, 257 or more gradations can be expressed. Thus, even if input image data has 256 gradations, it can sufficiently be expressed. However, the resolution is unsatisfactorily lowered to be 74 dpi or lower. In a case where an image, such as a photograph, having gradations, is expressed, a resolution of 100 dpi or higher is required.

Therefore, in order to satisfactorily maintain the resolution and the gradation characteristic, it is preferable that the first predetermined value be made to be 0.75 to 0.9 in terms of the pulse width.

Seventh Embodiment

A seventh embodiment of the present invention will now be described. The seventh embodiment is structured to employ a density pattern method which is a general method when a plurality of pixels are included in one block and the gradation is expressed in accordance with the area ratio in the block.

Figure 29:
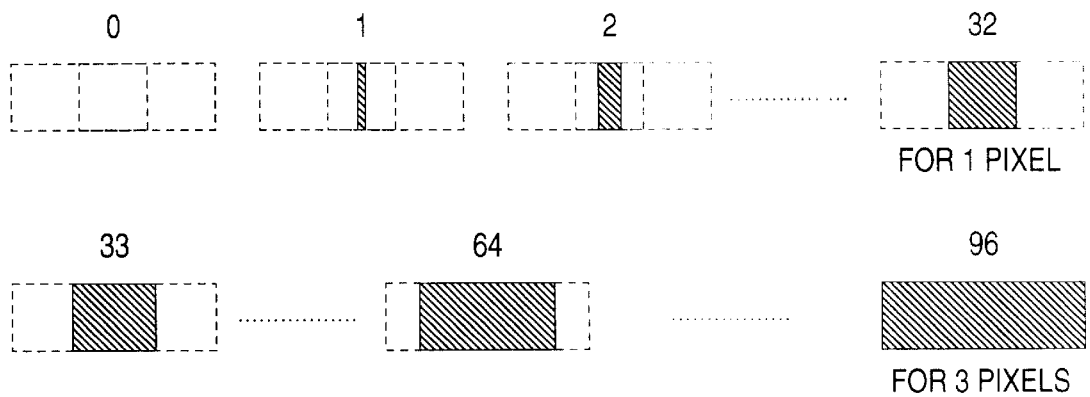
FIG. 29 is a view of explanatory of enlargement of a pixel.

In this embodiment, for example as shown in FIG. 29, an image forming apparatus in which the area in the pixel(pixel block) is enlarged/reduced in accordance with the value of each pixel; the enlargement of the pixel starts at the central portion; each pixel block is able to have 97 gradations from 0 to 96; the pixel block having the area for one pixel is realized when the gradation is 32; and the pixel block having area for three pixels is realized when the gradation is 96 which is the maximum level.

Note that "enlargement of a pixel" has the same meaning as that of the enlargement of the dot and that of the density pattern. Since the method of the gradation process which is performed by the gradation processing device 1006 is arranged in this embodiment, the expression as the "enlargement of the pixel" is employed. That is, the "enlargement of the pixel" has a meaning, in the gradation expressing process in which each pixel is turned on/off, that the pixel is turned on in such a manner that the density pattern is enlarged.

In order to cause the image forming apparatus to have a satisfactory gradation characteristic, 3×3=9 pixels is set as one basic cell so that the gradation is expressed by the area ratio in the basic cell. Since each pixel is able to have 33 steps (0 to 32) of area ratios, an area ratio of 289 steps (32×9+1) is permitted to the overall basic cell.

Figure 30:
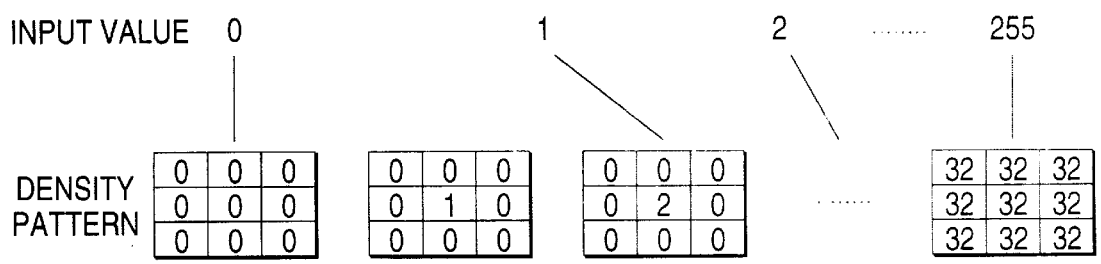
FIG. 30 shows the relationship between input values and block patterns.

Thus, the density pattern method is employed to perform the process such that any one of density patterns of the 289 gradations is caused to correspond to each of the supplied 256 steps of values, as shown in FIG. 30. Therefore, an arbitrary gradation curve can be obtained from the relationship of the output density with respect to the input by changing the correspondence relationship shown in FIG. 30.

Figure 31:
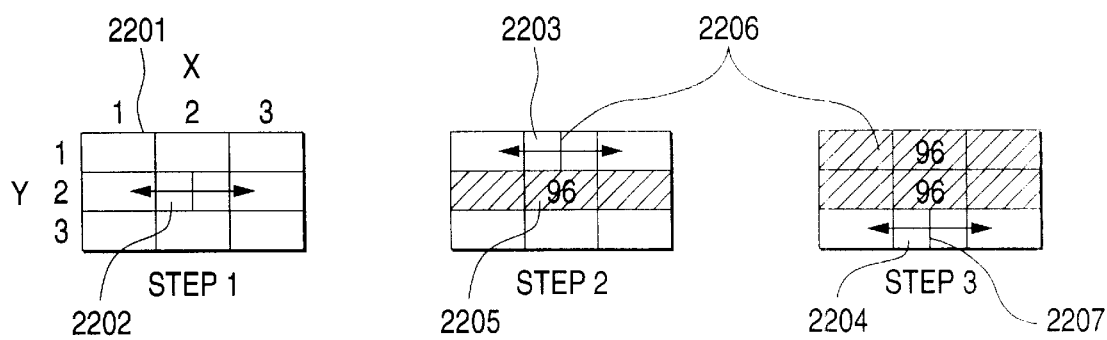
FIG. 31 shows rise of an area ratio of a block.

The process of rise of the area ratio of the pixel block is shown in FIG. 31.

A block 2201 indicating density 0 starts in a state where all of the pixels in the block are 0, and then a pixel 2202 at the center (X-position: 2, Y-position: 2) in the block 2201 is enlarged in step 1. When the maximum value 96 is realized, the pixel is enlarged to a dot 2205 having a size corresponding to three horizontal pixels.

In step 2 a pixel 2203 positioned right above (X-position: 2, Y-position: 1) the pixel 2202 which has been enlarged to the maximum value is enlarged so as to be a dot 2206.

When the dot 2206 has been enlarged to the size corresponding to the three horizontal pixels, a pixel 2204 positioned right below (X-position 2, Y-position 3) the dot 2202 is enlarged so as to be a dot 2207. When the dot 2207 has been enlarged to have the size corresponding to three horizontal pixels, all of the pixels in the block 2201 are plugged so that the highest density is realized (step 3). An input value at this time is 255.

Figure 32:
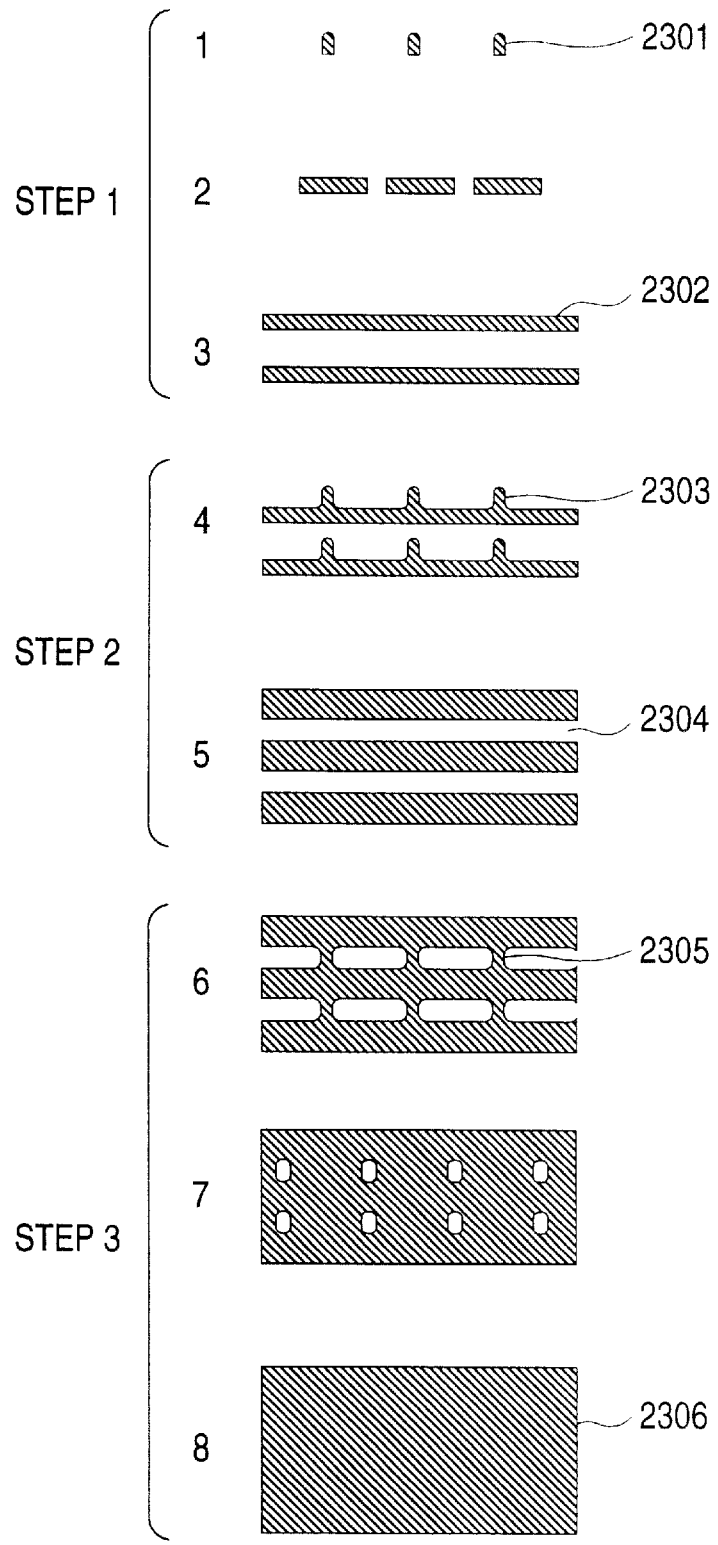
FIG. 32 shows the shape of a formed dot.

When the foregoing enlargement of the pixels is observed in a macroscopic viewpoint, points 2301 are located apart from one another as shown in FIG. 32 when the density is low. As the density is raised, each point is enlarged into the horizontal direction. When each point has been somewhat enlarged into the horizontal direction, the adjacent points are connected in certain portions so that one horizontal-line 2302 is formed. The above-mentioned process corresponds to step 1.

When the density has been furthermore raised, projecting points 2303 are generated on the upper portion of the horizontal line 2302 at positions apart from one another, and then enlarged into the horizontal direction. When the points 2303 have been somewhat enlarged into the horizontal direction, the adjacent points 2303 are, similarly to step 1, connected to each other in a certain portion so that a horizontal line is formed. Since two horizontal lines continued in the direction Y are formed at this time, a state is realized which is the same as a state in which a white line 2304 exists in a solid image in a macroscopic viewpoint. The foregoing process corresponds to step 2.

In the final step 3 points 2305 are generated to plug the white line 2304 left in step 2, and then enlarged in the horizontal direction. Finally, all of the white lines are plugged so that a solid image 2306 is formed.

Figure 33:
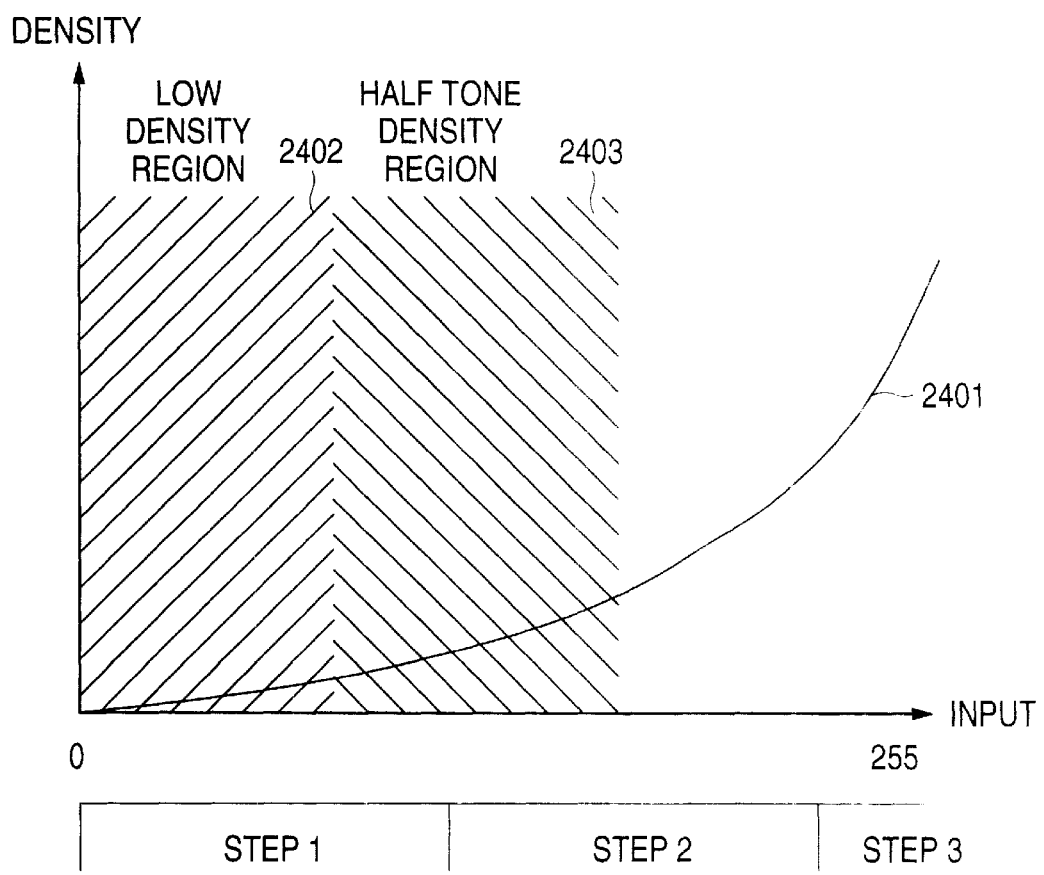
FIG. 33 shows a gradation curve with respect to input values.

FIG. 33 shows a gradation curve 2401 indicating output densities with respect to input values. The gradation curve 2401 shows results obtained by making the foregoing density patterns to correspond to the respective input values such that the density patterns are made to correspond in such a manner that the density patterns are made to correspond to the input values in such a manner that the density is in proportion to the brightness.

When an image is actually processed, the gradation of a highlight portion (a low density portion) considerably affects the image quality. Therefore, the gradation characteristic of a low-density region 2402 shown in FIG. 33 must satisfactorily be maintained. Moreover, the skin color which is conspicuous for the eyes of a human being cannot satisfactorily be expressed only when the gradation characteristic is maintained sufficiently. Since the input value of the magenta component for the skin color is substantially middle portions, also an intermediate-density region 2403 shown in FIG. 33 must have a satisfactory gradation characteristic.

When the above-mentioned gradation expression method is employed, switching from step 1 to step 2 is included in the intermediate-density region 2403 in a case where the step described with reference to FIG. 31 is made to correspond to the gradation curve 2401.

The switch from step 1 to step 2 means a moment at which the adjacent points are connected to form the horizontal line. As can be understood from the foregoing description, the phenomenon in which the potions are connected to each other usually takes place before switching to step 2 is performed that is, during step 1 as compared with the moment at which step 1 is switched to step 2.

Figure 34:
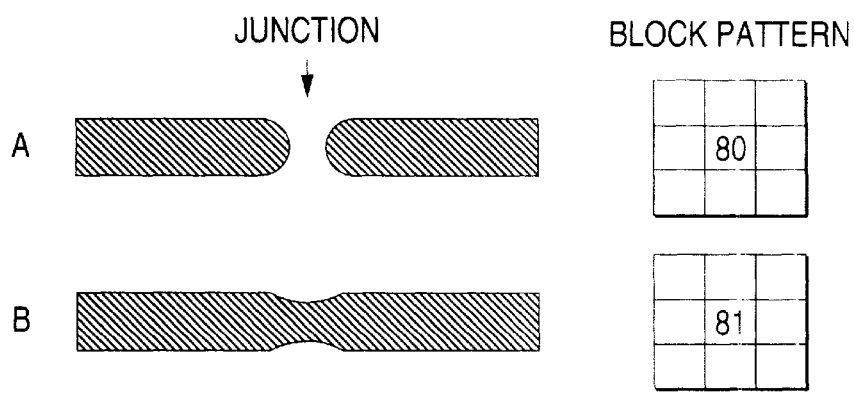
FIG. 34 shows states before and after the connection of adjacent points.

As for state A immediately before adjacent points are connected to each other in step 1 and state B after the two points have been connected to each other, an enlarged view of a junction of the two points and density patterns in the two states are shown in FIG. 34. As can be understood from FIG. 34, when the value of a pixel in the central portion of the block is made to be 81, connection to the adjacent point is performed so that a horizontal line is formed.

As for data, it is ideal that the horizontal is formed when the value of the pixel in the central portion of the block has been made to be 96. Thus, enlargement of the point has been completed contrary to the expectation. The foregoing fact means jumping of the density between the density indicated by the density pattern in which the value of the pixel in the central portion of the block is 80 and the density indicated by the density pattern in which the value of the central portion of the block is 81.

Figure 35:
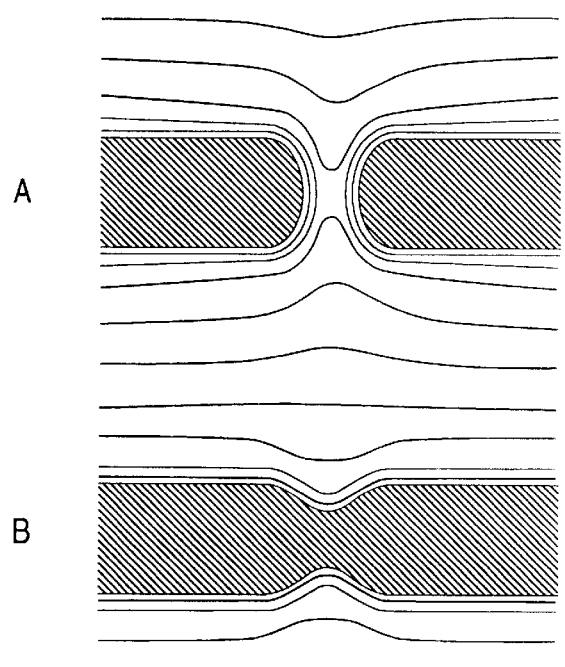
FIG. 35 shows the potential slopes changed due to the connection of adjacent points.

The foregoing phenomenon takes place when the potential slope for forming each point on the photosensitive member excessively approach each other and mutually affect to be connected into one point. Potential slopes respectively corresponding to A and B shown in FIG. 34 is shown in FIG. 35.

Figure 36:
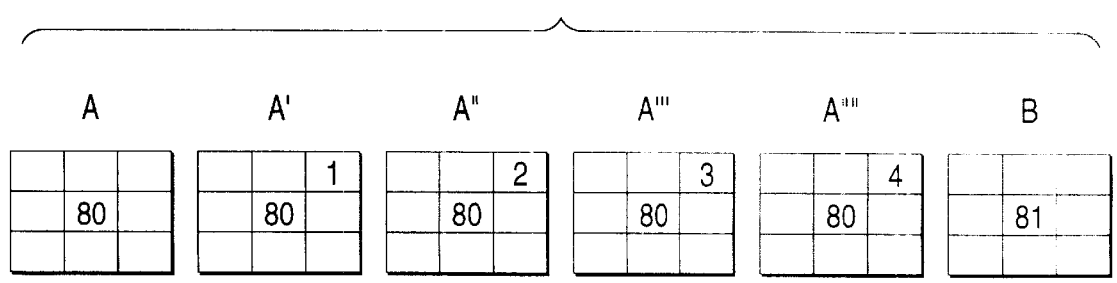
FIG. 36 shows a block pattern in which a second pixel is disposed.

Accordingly, as shown in FIG. 36, a density pattern indicated as A', A", A'" and A"" is inserted between the density pattern in which the value of the pixel in the central portion of the block is 80 and the density pattern in which the value of the pixel in the central portion of the block is 81.

The inserted density pattern is a pattern with which a very small value corresponding to a second pixel is added and increased at the upper right portion (X-position: 3, Y-position 1) in the density pattern in which the value of the pixel in the central portion of the block corresponding to the first pixel is 80 and in which points are not connected to each other.

When a method is employed to express the density gradation by making the 293 steps (289+4) steps of density patterns including the four density patterns A', A", A'" and A"" shown in FIG. 36 to correspond to the 256 input values, a constant value is realized after the first pixel has reached 80 which corresponds to a predetermined value so that the value of the second pixel is enlarged.

The first predetermined value of 80 corresponds to 0.83 when the pulse width in a case where the maximum value of the pixel is 96 is 1 because the maximum value for the pixel is 96. The value being set to be included in a range from 0.75 to 0.9. That is, the value is determined in such a manner that the dot formed by the first pixel and the dot formed by the third pixel adjacent to the first pixel in the enlarging direction for the first pixel approach or connected to each other.

Figure 37:
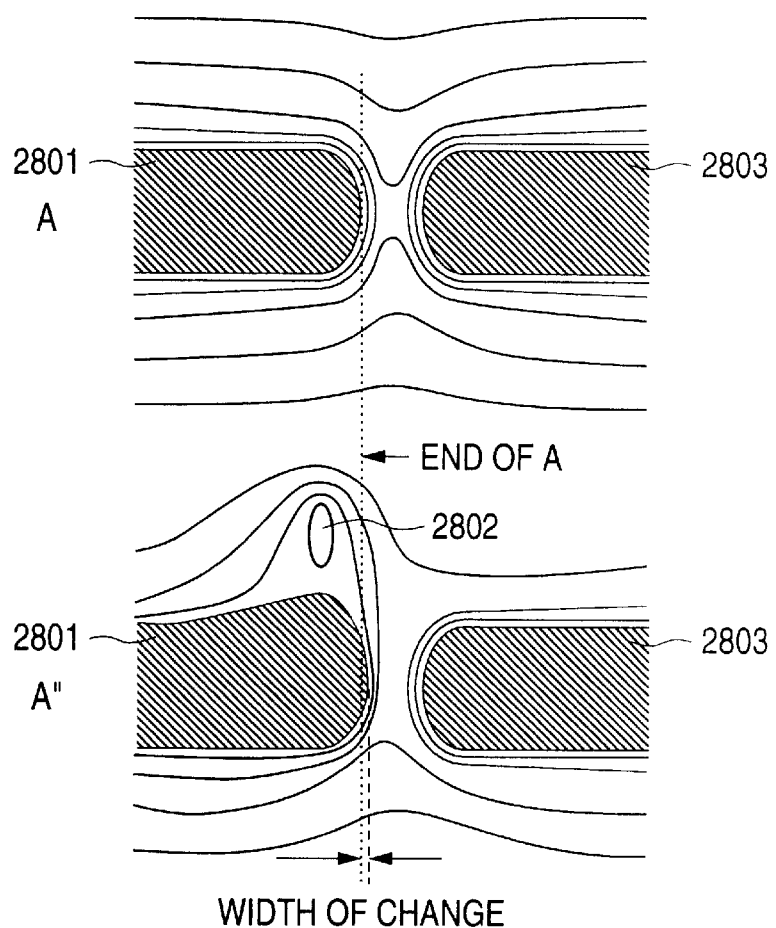
FIG. 37 shows change of the distance between dots owning to the second pixel.

Therefore, the potential slope formed by the first pixel 2801 and the potential slope formed by the second pixel 2802 affect each other so that the distance between dots formed by the first pixel 2801 and the third pixel 2803 is finely changed, as shown in FIG. 37. Thus, the density between the densities of the patterns expressed by A and B shown in FIG. 34 can be expressed so that jumping of the density is prevented.

If the second pixel is positioned in a direction different from the enlarging direction for the first pixel, the effect to control the potential slope of the first pixel can be expected regardless of the position is right below the first pixel or right above the same. However, dots can easily be connected in the vertical direction and texture will easily take place. Therefore, to prevent unnecessary texture and to obtain a further satisfactory control effect, it is preferable that the first and second pixels are disposed to have the diagonal positional relationship as is employed in this embodiment. Although the second pixel is positioned at the upper right position, it may, of course, be positioned at the lower right position, upper left position or lower left position.

After the second pixel has reached the second predetermined value and the dots formed by the first and second pixels have been smoothly connected to each other, the fact that the first pixel is again enlarged to exceed the first predetermined value enables a higher density gradation to be expressed. At this time, it is preferable that the second pixel, which has achieved the object of controlling the potential slopes formed by the adjacent first pixel and the third pixel, be reduced to be a value smaller than the second predetermined value.

To prevent an adverse influence of the second pixel, which has been needless, on the image, it is preferable that the second pixel has an area ratio of 0 after the second pixel has reached the second predetermined value as is employed in this embodiment in which the second pixel is reduced to o after it has reached 6.

Although the description has been performed about the block having size of 3×3, the present invention is not limited to the foregoing size. A similar effect can be obtained if the size of the block is except for 3×3.

Eighth Embodiment

An eighth embodiment of the present invention will now be described. The eighth embodiment has a structure which employs a multivalue dither method.

Figure 38:
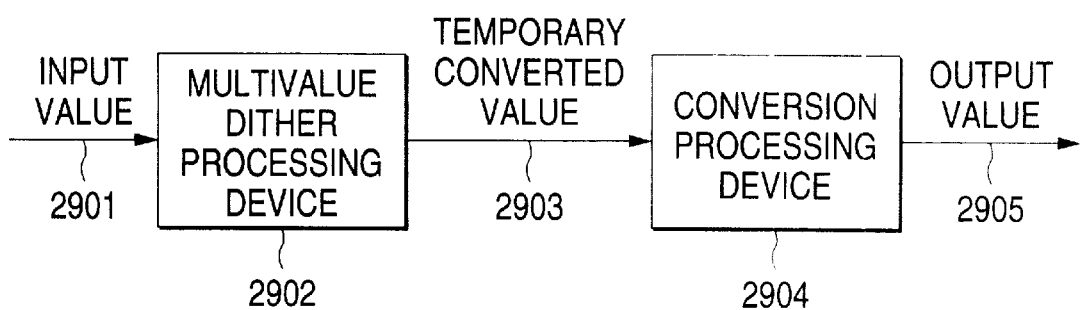
FIG. 38 shows a flow of a process according to the eighth embodiment.

FIG. 38 shows the flow of a process according to the eighth embodiment.

Referring to FIG. 38, the number of gradations of an input value 2901 is 256 which is the number of gradations for general image data, the number being then, by a multivalue dither processing device 2902, converted into a temporary converted value 2903 which is a multivalue. The number of gradations of the temporary converted value 2903 is larger than the number of the output value 2905 which is a multivalue, the number being, by a conversion processing device 2904, converted into an output value 2905.

The number of gradations of the output value 2905 is 97, while the number of gradations of the temporary converted value 2903 is 227. In order to convert the value of the temporary converted value 2903 exceeding 96 into a value smaller than 96, the conversion processing device 2904 performs a conversion in such a manner that a remainder obtained by dividing the temporary converted value 2903 by 96 is made to be the output value 2905.

A dither matrix for use by the multivalue dither processing device 2902 when the structure according to the seventh embodiment is performed by the structure according to this embodiment is shown in FIGS. 39A to 39I.

The multivalue dither processing device 2902 has 226 dither matrices to convert the 256 values of input into 227 values. Each matrix has the size of 3×3 pixels. The 226 dither matrices correspond to the values obtained after the multivalue dither process has been performed. The values in each matrix correspond to the input values.

That is, when the input value is larger than the value in the matrix, the value of the matrix is output as the output of the pixel at this position.

In a case where the input values are, in a plurality of matrices, larger than the values in the matrices, a larger value in the matrix is made to be effective.

That is, in a case of the lower right pixel in the matrix shown in FIGS. 39A to 39I, when the input is 139, the value is larger than the value at the lower right position of the matrix 1. Therefore, the output from the pixel is made to be 1. When the input is 140, the value is larger than the value of the matrix 2. Therefore, the output is made to be 2.

When the input is 150, the value is larger than a value of 141 of the matrix 97. Therefore, 97 is output.

When the input is 254, the value of the matrix 129 and that of the matrix 226 are 253 or more, the result of the matrix corresponding to a larger value is made to be effective. Thus, 226 is output.

Since values of all of the other matrices are 255, they are effective only when the input value is 255. When 255 is input, also the value of the matrix 226 is made to be effective. A largest value of 226 is output.

Therefore, the lower right pixel in the matrix is able to have any one of four outputs 1, 2, 97 and 226 with respect to input values 0 to 255.

In FIG. 39A, values in [ ] are added on the side of temporary converted values exceeding 96 of each dither matrix. The added values indicate output values allowed to pass through the conversion processing device 2904 so as to be output, that is, values 0 to 96.

Therefore, the values converted by the multivalue dither processing device 2902 are reset three times during enlargement to 0 to 226. Therefore, if the temporary converted value is 97 or 194, 0 is finally output. When value has been converted to the maximum value of 226, the final output value is 32.

A fact that the process using the dither matrix shown in FIGS. 39A to 39I is the same as the contents of the seventh embodiment will now be confirmed.

The process described in the seventh embodiment such that the value of the pixel in the central portion of the block corresponding to the first pixel is changed from gradation 80 to gradation 81 is shown on the dither matrices shown in FIGS. 39A to 39I.

The gradation with which the value of the first pixel is 80 when the input value is 91 or more as shown in FIG. 39C. The gradation with which the value of the first pixel is 81 when the input value is 100 or more.

As shown in FIG. 39A, the value of the upper right pixel corresponding to the second pixel is made to be 1 when the input value is 94. It is made to be 2 when the input value is 95, 3 when the input value is 96, 4 when the input value is 97, 5 when the input value is 98 and 6 when the input value is 99.

The value 97 of the second pixel when the input value is 100 or more is made to be a final output value of 0 after it has passed through the conversion processing device 2904. At this time, the first pixel is made to be 81. Thus, a process similar to that according to the seventh embodiment can be realized.

As described above, when the multivalue image data dither processing device and the conversion processing device converting the output from the multivalue dither device into a value smaller than the output are provided; and the number of the dither matrices for use in the multivalue dither process is made to be the number exceeding the number of gradations of the output value, a process which is the same as the gradation process realized by the density pattern method can be realized. Moreover, a process capable of realizing a further improved resolution can be realized.

Ninth Embodiment

A ninth embodiment will now be described. The ninth embodiment is able to be applied to a case where a fine area ratio cannot easily be expressed owning to the characteristic of the engine or the potential slope is instable attributable to change of the environment.

The characteristic of an image forming device for use in the following description will now be described.

The image forming device has the gradation which is limited to seven values (0, 1, 2, 3, 4, 5 and 6) per pixel in order to stably express dots. Thus, dots are formed as shown in FIG. 40 such that the area of the dot formed by the pixel is enlarged in proportion to the value of each pixel (by an area corresponding to one pixel or smaller).

Note that the process of enlargement of the rectangular dot shown in FIG. 40 is a logically illustrated. In actual, a latent image formed on the photosensitive member and the shape of the dot formed by the latent image are formed into rounded shape as shown in FIG. 41 due to influences of the beam spot diameter scanned by an exposing unit, the sensitivity of the photosensitive member and the like.

Figure 42:
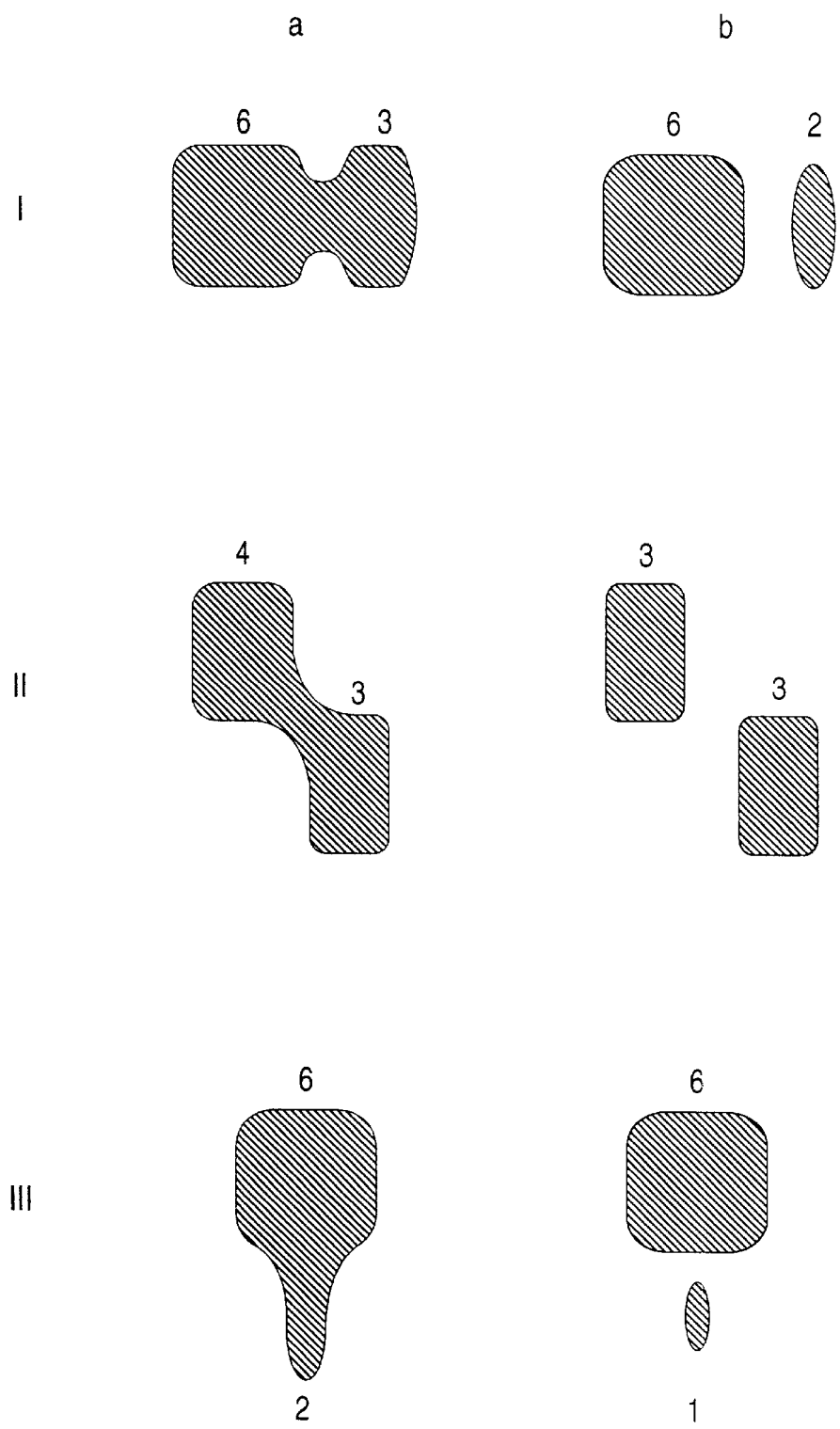
FIG. 42 shows the connection of dots.
Figure 53:
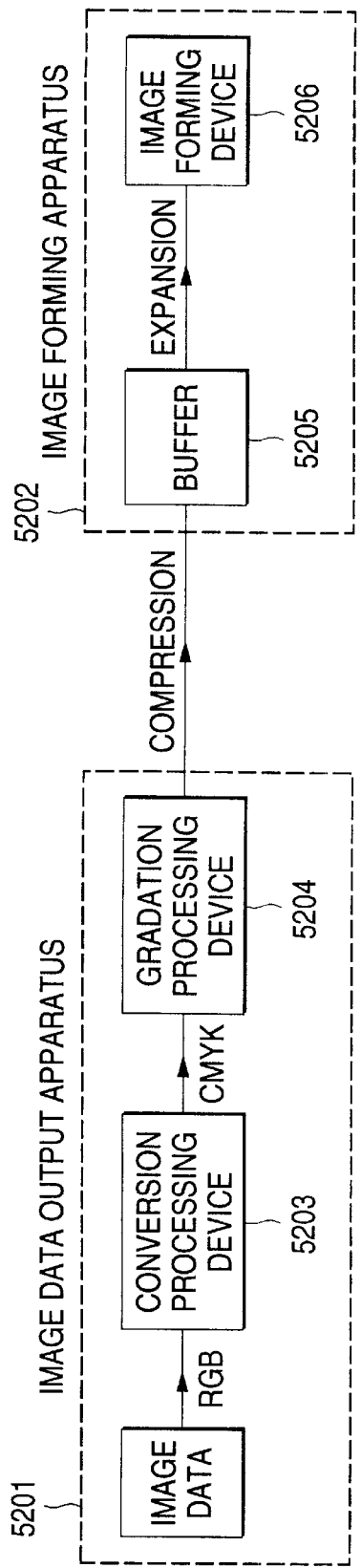
FIG. 53 shows another image forming apparatus.

A process in which a dot is formed when pixel data exists adjacently is shown in FIG. 42. Portion I of FIG. 42 shows a case where pixel data horizontally exists in parallel, II shows a case where pixel data exist diagonally and III shows a case where pixel data exist vertically.

In a case of I in which a pixel having pixel data of 6 and that having pixel data of 3 are disposed in parallel, dots formed by these pixels are connected into one dot as indicated by symbol a. If a pixel having data of 6 and a pixel having data of 2 are disposed in parallel, dots are formed into independent dots as indicated by symbol b.

In the state of II, if a pixel having pixel data of 4 and that having pixel data of 3 are disposed in parallel, the formed dots are connected into one dot as shown in a. If a pixel having data of 3 and that having data of 3 are disposed in parallel, independent dots are formed.

In the se of III, if a pixel having pixel data of 6 and that having pixel data of 2 are disposed in parallel, one dot is formed as shown in a. If a pixel having data of 6 and that having data of 1 are disposed in parallel, independent dots are formed.

Since dots are sometimes connected to each other or connection does not take place in accordance with the value of pixel data as described above, there is a possibility that jumping of the density takes place.

Accordingly, a dither matrix according to this embodiment shown in FIG. 43 is employed to form an image.

The dither matrix shown in FIG. 43 is composed of six matrices each having size of 8 pixels×8 pixels, the six matrices corresponding to pixel data of 1, 2, 3, 4, 5 and 6.

That is, as for a pixel 4201 shown in FIG. 43, when the input value to a pixel 4201 is 5, the value is larger than 4 of the matrix 1. Therefore, the output from the pixel 4201 is made to be 1.

When the input value is 12, it is larger than of the matrix 2. Therefore, the output value is made to be 2.

When the input value is 15 which exceeds 13 of the matrix 3, the output value is made to be 3. When the input value is 40 which exceeds 31 of the matrix 4, the output value is made to be 4. When the input value is 70 which exceeds 67 of the matrix 5, the output value is made to be 5. When the input value is 255 which exceeds 72 of the matrix 6, the output value is made to be 6, that is, the pixel is a solid pixel.

As for the structure of each matrix shown in FIG. 43, the matrix 1 is a block group formed by repeating dither matrices each of which is composed of a block having size of 2 pixel×2 pixels shown in FIG. 44. Each of the matrices 2, 3 and 4 is a block group formed by nine types of blocks having size of 2 pixels×2 pixels shown in FIGS. 45, 46 and 47.

Each of matrix 5 and matrix 6 is formed into a block group formed by repeating one type of a block shown in FIGS. 48 and 49.

The foregoing matrices are structured such that each pixel in the block composed of 2 pixels×2 pixels has a priority order, as shown in FIG. 50 so as to be enlarged in accordance with the order.

Also the block group each of which is composed of 4 blocks×4 blocks is structured such that each block has a priority order so as to be enlarged in accordance with the priority order, as shown in FIG. 51.

A process in which dots are enlarged in a case where the matrix shown in FIG. 43 is applied will now be described. A case will be considered in which image data formed by pixels having a uniform value is processed. Note that a block having size of 2 pixels×2 pixels is called a "block" and a block group composed of 4 blocks×4 blocks is called a "block group".

In a case where the value of the pixel is 0 to smaller than 4, the output values from all of the pixels are 0. When the value is 4 or larger, the output value of the pixel at a position indicated such that X-position is 1 and Y-position is 1 and given the highest priority in the block is made to be 1. That is, output values from pixels (X, Y)=(1, 1), (3, 1), (5, 1), (7, 1), (1, 3), (3, 3), (5, 3), (7, 3), (1, 5), (3, 5), (5, 5), (7, 5), (1, 7), (3, 7), (5, 7) and (7, 7) in the block group is made to be 1.

When the input value is then made to be 9 or larger, the output values from the foregoing pixels are made to be 2.

When the input value is made to be 13 or larger, the output value is made to be 3. Moreover, the output from the pixel at a position indicated such that X-position is 2 and Y-position is 2 and given the second priority in the block is made to be 1.

Then, the output value from the pixel having the first priority order is retained to be 3, the same from the pixel having the second priority is made to be 2 when the input value is 18 or larger and made to be 3 when the input value is 22 or larger.

Thus, each pixel forms an individual dot to the foregoing step.

When the input value is made to be 27 or larger, the output value from the pixel having the first priority is made to be 4. As described above, if the pixel having the first priority and the pixels 4 and 3 each having the second priority are combined, dots formed by the pixels are unintentionally connected to one another.

When the dither matrix shown in FIG. 43 is employed, the outputs from pixels having the first priority order in the block having the first priority order and at a position indicated such that X-position is 1 and Y-position is 1 are made to be 4 in accordance with the priority order of the block in the block group. The other blocks are retained to be the previous state, that is, both of the pixel having the first priority order and the pixel having the second priority order are retained to be 3.

Then, pixels each having the first priority order in each block are sequentially enlarged to four in accordance with the priority order in the block group.

A table collectively showing the enlargement of the dots until the input value is made to be 255 is shown in FIG. 52.

The gradations portion shown in table indicate the orders of the gradations which can be expressed by the dither matrix shown in FIG. 43. The input values are values to output the respective gradations. When the input value is larger than the indicated value, a corresponding gradation is output. The disposition portion indicates the disposition of the block formed by the value of the pixel shown in the following portion in the block group. Symbol [A] indicates that all of blocks in the block group are filled with the blocks having the pixel values shown in the following portion. Numerals indicate that the block in the block group and having the corresponding priority order is filled with the pixel value shown in the following portion and that the other blocks are retained to be the pixel values filled with the previous gradations.

As can be understood from FIG. 52, the dither matrix shown in FIG. 43 is able to express 57 gradations from 0 to 56.

The gradations each of which is surrounded by a thick frame shown in FIG. 52 are combinations of pixel values with which the dots formed by the corresponding pixels are unintentionally connected. At this time, the pixel values are used to fill the blocks in a portion in the block group.

That is, even if the density jumps attributable to the connection of dots, the jump is a local phenomenon. Since the density is not jumped in a macroscopic viewpoint, an image having excellent gradation characteristic can be formed.

Although the image forming apparatus shown in FIG. 19 is employed in the foregoing description, the structure of the apparatus is varied to satisfy each object. Therefore, the structure is not limited to that shown in FIG. 19.

An image forming apparatus 5202 arranged such that RGB data is converted into CMYK data by a conversion processing device 5203 in an image data output apparatus 5201, and then a gradation processing device 5204 performs a gradation process, and then image data is compressed, and then the same is output to the image forming apparatus 5202 has a structure such that a buffer 5205 performs an expansion process to, as it is, transfer data to an image forming device 5206 so as to print data.

Figure 54:
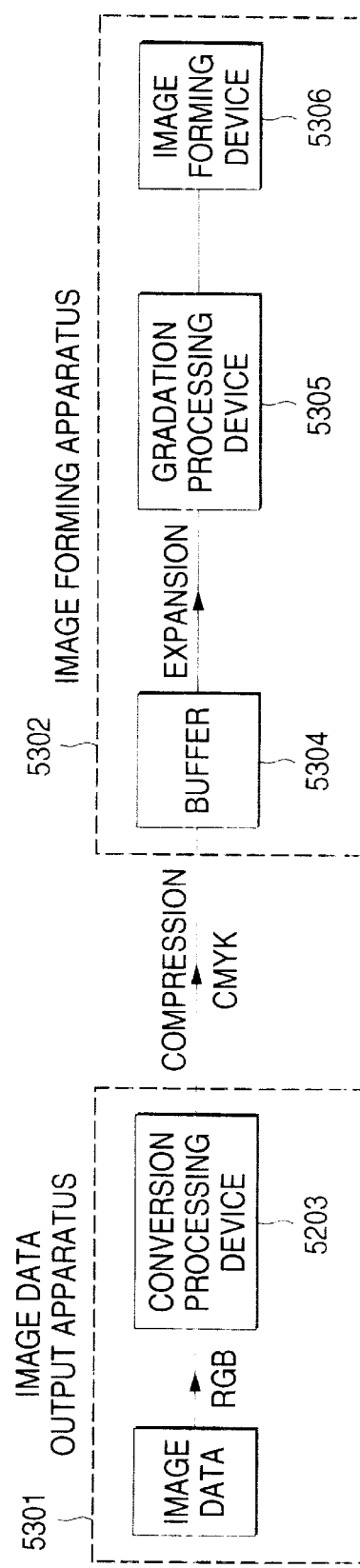
FIG. 54 shows another image forming apparatus.

FIG. 54 shows a structure in which the conversion processing device in the image data output apparatus 5301 performs only conversion of RGB into CMYK, and the gradation processing device 5305 in the image forming apparatus 5302 subjects data supplied from the buffer 5304 to a gradation process so as to be output by the image forming device 5306.

The present invention can be realized by the foregoing different structures. That is, the process shown in FIG. 53 can be realized by a conversion process using software in the image data output apparatus 5201. The structure shown in FIG. 54 can be realized by hardware similarly to the structure shown in FIG. 19.

Although this embodiment has been described about the printer using the electrophotographic method, the present invention may be employed to any image forming apparatus of a type in which the shape of dots to be formed are different with respect to the area ratio of the pixel to be output, in particular, which is affected by adjacent pixels. For example, the present invention may, of course, be applied to an ink jet printer.

As described in the fifth to ninth embodiments, the image forming apparatus according to the present invention is structured such that the area ratio of the first pixel is made to be constant after the area ratio of the first pixel has reached a first predetermined value and the area ratio of the second pixel adjacent to the first pixel in a direction different from the enlarging direction for the first pixel is raised. Therefore, an effect can be obtained in that density jump occurring due to continuous enlargement of the first pixel is prevented and the image quality is improved.

Moreover, the first predetermined value is set to be the value with which a dot to be formed at the first pixel position and a dot to be formed at a third pixel position adjacent to the first pixel in the enlarging direction of the first pixel approach or connected to each other. Thus, the second pixel is used to finely control the distance between dots from a state where dots formed by the first and third pixels are not connected to a state where they are connected. Therefore, an effect can be obtained in that jumping of the density occurring when the connection is performed can be prevented.

In a case where the image forming device is provided with the dot writing device for forming a dot in accordance with the area ratio of each pixel, the first predetermined value is made to be not smaller than 1−1/2na and smaller than 1 when the ratio of the size of one pixel with respect to the diameter of a minimum dot by the dot writing device is a, the ratio of the size of the pixel formed by the pixel having the highest area ratio with respect to the size of one pixel is n and the highest area ratio is 1. Thus, a second pixel can be enlarged to prevent connection of dots formed by the first and third pixels. Since the distance between dots can be controlled, an effect can be obtained in that jumping of the density is prevented.

Even in a case where the image forming apparatus is composed of an image exposing device capable of modifying the pulse width and an image carrier on which an image corresponding to image exposing light transmitted from an image exposing device, the first predetermined value is set to be a value which is 0.3 or more and smaller than 1 in terms of the pulse width assuming that the pulse width required for the image exposing device to expose the overall area of the first pixel. Thus, the connection with a dot formed by the third pixel adjacent in the enlarging direction can be prevented so that jumping of the density is prevented.

Since the first predetermined value is set to be 0.75 to 0.9 in terms of the pulse width, the resolution and gradation characteristic can be maintained without occurrence of jumping of the density.

Since the center of a second pixel is diagonally disposed with respect to the center of the first pixel, the efficiency to control the first pixel by the second pixel can be improved. Thus, an effect can be obtained in that jumping of the density can easily be prevented and generation of unnecessary texture can easily be prevented.

After the area ratio of the second pixel has reached the second predetermined value, the area ratio of the second pixel is made to be lower than the second predetermined value and the area ratio of the first pixel is raised to exceed the first predetermined value. Therefore, a further high density can be expressed without occurrence of jumping of the density.

After the area ratio of the second pixel has reached the second predetermined value, the area ratio of the second pixel is made to be zero. Therefore, deterioration of an image attributable to an unnecessary dot can be prevented.

The gradation processing device for performing the multivalue dither process comprises the storage device storing a plurality of dither matrices corresponding to the respective area ratios of the pixels; the multivalue dither processing device for reading the highest area ratio among area ratios corresponding to the dither matrices in which the image density of each pixel in accordance with image information is higher than the threshold of the input density stored in the dither matrix; and the conversion device for converting the obtained area ratio into a value smaller than the number of gradations of the multivalue dither processing device. Therefore, a process capable of realizing a further improved gradation characteristic can be performed without jumping of the density.

Since the number of the stored dither matrices stored in the storage device is larger than the number of gradations for each pixel, dots temporarily generated in a low density portion can be deleted in a high density portion. Thus, deterioration occurring due to unnecessary dots can be prevented.

Since the area of a dot formed on a medium is not unintentionally enlarged attributable to a short distance between pixels and influence of the potential slopes on the photosensitive member, an effect can be obtained in that an image forming apparatus exhibiting an excellent gradation characteristic can be structured.

According to the fifth to ninth embodiment, there are provided the means capable of controlling the distance between dots in the adjacent basic cells and the means capable of optimizing the direction in which the dot is enlarged from a viewpoint of the area ratio of pixels and that of the pixel block.

On the other hand, this embodiment has an image dust zone having a predetermined width as the means capable of controlling the distance between dots in the adjacent basic cells in order to achieve the objects of the present invention.

Image forming apparatuses according to tenth to thirteenth embodiment of the present invention will now be described with reference to FIGS. 55 to 59.

To enable the embodiments to easily be understood, factors to generate image dust will now be described with reference back to the electrophotographic processing portion 100 shown in FIG. 9.

Referring to FIG. 9, the charging roller 102 electrostatically charges a photosensitive member 101 uniformly. A laser beam formed by a laser scanner 103 in accordance with supplied image data is, by the return mirror 104, introduced to the surface of the photosensitive member 101 so that an electrostatic latent image is formed. The yellow developing unit 105Y of one-component contact type developing units 105Y, 105M, 105C and 105K capable of approaching/separating in a direction indicated by arrows shown in the drawing is brought into contact, while the other developing units are separated. Moreover, an electric field of a power source (not shown) causes the negative-electrostatically charged yellow toner to be moved, and inversely developed so as to be visible on the photosensitive member 101. The visible yellow toner is transferred and moved to the surface of the intermediate transfer member 106 as a result of a primary transfer electric field generated when a bias having polarity inverse to that of toner is applied to the primary transfer roller 107 by the primary transfer power source 108. The intermediate transfer member 106 is adjusted to be applied a proper tension from a tension roller 118.

Toner remaining from the transferring operation is recovered by the photosensitive-member cleaner 109 having the cleaning blade arranged to be brought into contact. Then, the potential of the photosensitive member is reset by the destaticizing lamp 110. A similar operation is repeated for the magenta developing unit 105M, the cyan developing unit 105C and the black developing unit 105K by synchronizing the position of the intermediate transfer member 106 and the light emission timing for the laser scanner 103 so that toners in the respective colors are superimposed on the intermediate transfer member 106. Thus, a full color image is formed.

The second transfer roller 116 and the intermediate-transfer-member cleaner 119 are brought to a separated state. On the other hand, the recording medium 113 is conveyed from the paper feeding cassette 112 to the pair of resist rollers 114 by the paper feeding device 111, and then, in synchronization with the full color image on the intermediate transfer member 106, conveyed to a secondary transferring portion formed by the drive roller 115 and the second transfer roller 116 capable of approaching/separating with respect to the drive roller 115 in directions indicated by arrows shown in the drawing. In the secondary transferring portion, the second transfer roller 116 is brought into contact with the intermediate transfer member 106 in synchronization with the recording medium 113 so that a pressing nipping portion is formed. Moreover, voltage determined by the calculating device 121 for calculating voltage obtained from the primary transfer power source 108 is controlled to a predetermined level by the second transfer power source 117. An effect of the electric field of the voltage causes a full color toner image to be formed on the recording medium 113. Then, the recording medium 113 is fixed by the fixing device 120, and then discharged to the outside of the apparatus.

The toner is moved plural times until a final image is obtained. During this, the characteristics of the toner, such as the fluidity of the toner, the quantity of electrostatic charge, the shape of particles and particle size, the effect of the electric field and the mechanical operation result in that supplied image data encounters dust of an image on the recording medium 113.

In the image forming apparatus shown in FIG. 9, the characteristics of the toner, such as the particle size, the quantity of electrostatic charge and the fluidity and the conditions for performing the processes including the electrostatic charge, exposure, development, transfer and fixing processes are properly selected and adjusted so that a quantity of dust of an image larger than a predetermined value is output as a final image on the recording medium 113. In the transfer process, movement of the toner can easily be controlled, and thus adjustment of the transferring electric field enables the state of the dust of an image to be changed. The image forming apparatus shown in FIG. 9 is arranged to have a transferring electric field in the primary transference in which toner is moved from the surface of the photosensitive member 101 to the intermediate transfer member 106 is determined such that the determined constant current level is about 5 $\mu$A to about 20 $\mu$A and the determined constant current level in a secondary transference in which toner is moved from the surface of the intermediate transfer member 106 to the recording medium 113 is 10 $\mu$A to 30 $\mu$A. The higher the determined constant current level, the more dust of an image can easily be generated. The lower the determined constant current level, the more difficult to generate the dust of an image.

As an alternative to the adjustment of the transferring electric field, use of toner having different fluidity enables the dust of an image to easily be controlled. Toner is classified into a type manufactured by polymerization and that manufactured by pulverization. The fluidity of each toner can freely be changed by properly selecting the type and/or the quantity of a fluidity modifier to be added to the toner. The lesser the fluidity of the toner, the more the dust of an image can easily be generated.

By combining the transferring electric field and the fluidity of the toner as described above, the size of the dust of an image can freely be controlled.

Figure 55:
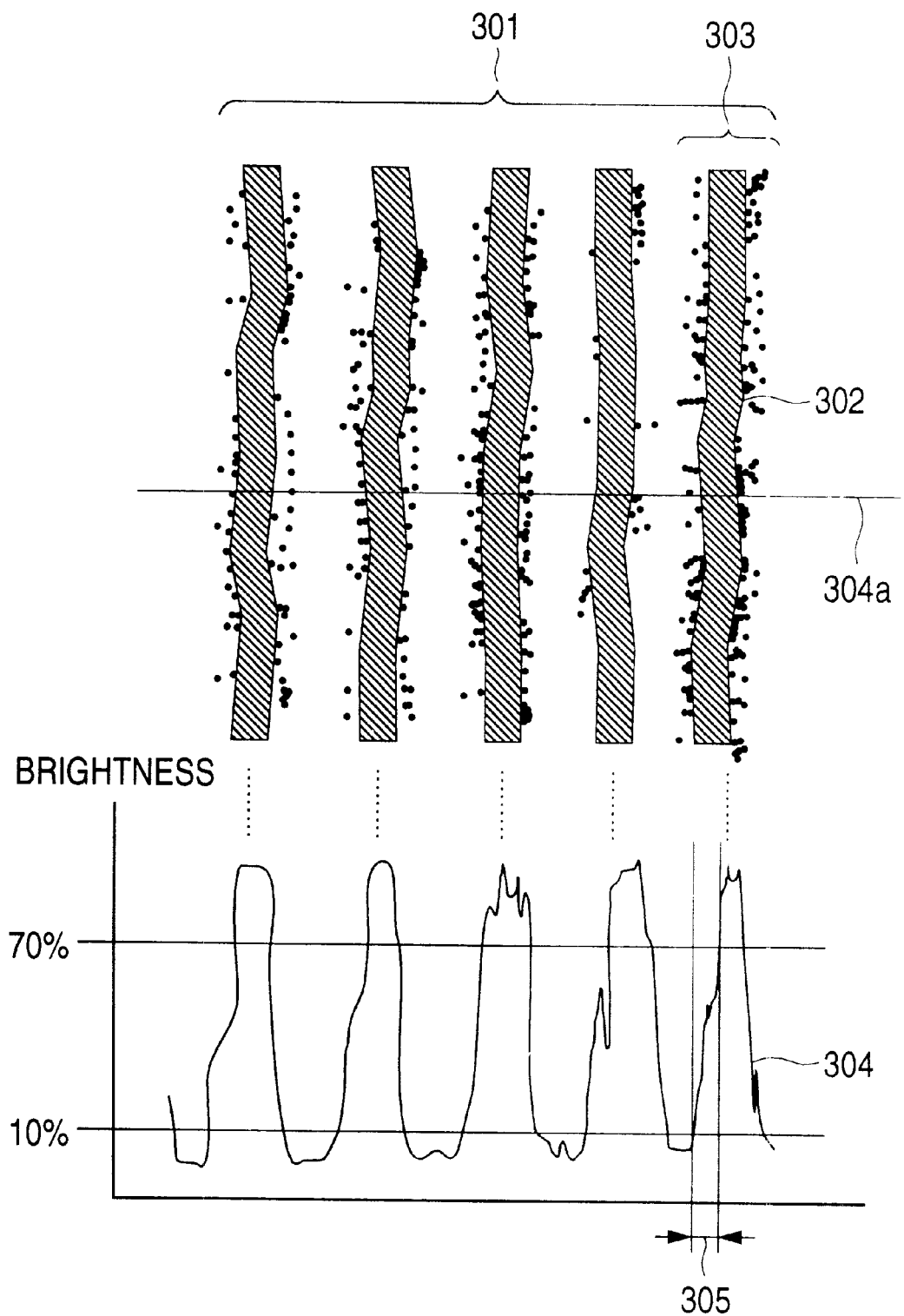
FIG. 55 is a diagram showing a quantity of image dust for use in the image forming apparatus according to tenth to thirteenth embodiments of the present invention.

The quantity of image dust which is defined in the following embodiments will now be described with reference to FIG. 55. FIG. 55 is a diagram showing the quantity of image dust for use in the image forming apparatus according to the present invention. An enlarged image 301 for use to measure the quantity of image dust is formed such that, for example, a plurality of hair lines 302 are gathered at intervals. Around the hair lines 302, there is spread image dust 303. The enlarged image 301 is fetched by a CCD camera so that a brightness profile 304 of a image dust measuring line 304a perpendicular to a direction in which the hair lines 302 are aligned is obtained. Assuming that the peak value (low brightness) of the image portion of the hair lines 302 of the brightness profile 304 is brightness of 100% and the peak value (high brightness) of non-image portion which is a gap between the arranged hair lines 302 is brightness of 0%, a plurality of points of distance 305 between 70% point and 10% point in the brightness profile 304 are measured to obtain their average value which is employed as the quantity of image dust. Note that it is preferable that an image to be used for the measurement be a set of hair lines or dots formed at intervals of 80 $\mu$m to 2 mm. An image obtained by forming the foregoing print pattern or lines or dots forming a screen of an image may be employed as it is.

Tenth Embodiment

When the image forming apparatus according to the present invention performs exposure, development, transfer and fixing processes in the line sequential manner as shown in FIG. 9, jitters can easily take place in each process. The jitters take place if the laser scanner 103 is vibrated by the influence of the operation of the photosensitive member 101 or the intermediate transfer member 106 or change of the processing speed or vibrations occurring in each of the development, transfer and fixing processes. To prevent the jitters, a countermeasure is taken by, for example, applying grease to the gears. However, complete prevention of the jitters from the drive transmission system is difficult.

Accordingly, the image forming apparatus according to this embodiment is structured such that a constant current level for the primary transference is set to be 15 µA, and the constant current level for the secondary transference is set to be a level between 10 µA and 30 µA. As the toner, toner of a type having a volume average particle size of 7 µm and obtained by pulverizing method and toner of a type having a volume average particle size of 7 µm and obtained by polymerizing method were used. The fluidity of the toner can be adjusted by controlling the quantity and the type of the fluidity modifier to be added to the toner particles so that toner having required fluidity is obtained. By combining the obtained toner with the transferring electric field, samples of required quantity of image dust can be obtained, the samples being samples A, B, C and D. The fluidity of the toner is expressed with loose apparent density (g/cc). The higher the value, the more easily the toner flows.

A monochromic solid image print pattern is formed on woodfree copy paper. Moreover, one of gears in a gear system for transmitting power to the photosensitive member 101 is formed such that a portion of teeth is removed in order to periodically and intentionally generate known jitters.

By using the above-mentioned samples, formed images are evaluated to examine the influence of the quantity of image dust on the jitters.

The image evaluation was performed visually by a plurality of test examiners. Each examiner individually determines whether or not the jitters are not conspicuous and a satisfactory image is formed. The respective evaluation results were gathered and the result evaluated by the largest number of the examiners is employed as the final evaluation.

Table 2 shows the relationship between the quantity of image dust measured by the foregoing definition and results of evaluation of the image quality. Note that the fluidity of the toner and the quantity of image dust obtained by adjusting the secondary transferring electric current shown in Table 2 are peculiar to the image forming apparatus according to this embodiment. The values are not limited to the other image forming apparatuses.

TABLE 2

| Samples of Images | Fluidity of Toner (g/cc) | Secondary Transferring Electric Current (µA) | Quantity of image dust (µm) | Evaluation of of Image Determination of Jitters |
|---|---|---|---|---|
| Sample A | 0.34 | 23 | 28 | ⊙ |
| Sample B | 0.42 | 25 | 18 | ○ |
| Sample C | 0.34 | 20 | 15 | ○ |
| Sample D | 0.42 | 15 | 13 | X |

Evaluation of jitters:
⊙: excellent,
○: good and
X: unsatisfactory.

In the evaluation in Table 2, symbol ⊙ indicates excellent samples without conspicuous jitters and free from deterioration in the image quality attributable to the jitters, ○ indicates good samples with somewhat conspicuous jitters if observed carefully and free from deterioration in the image quality and x indicates unsatisfactory samples having conspicuous jitters and deterioration in the image quality.

As can be understood from Table 2, the greater the quantity of image dust, the lesser the conspicuous jitters and an excellent image can be observed in the sequential order as sample D, sample C, sample B and sample A. The reason for this is that the change in the density occurring due to the jitters can appropriately be shaded off due to the existence of the image dust and thus the change cannot easily be observed by the eyes of a human being.

Since the image dust zone having a predetermined width, that is, a width of 15 µm or larger, exists, the jitters are not conspicuous and an excellent image can be obtained.

Eleventh Embodiment

The image forming apparatus according to this embodiment may be used to form an image having a screen structure. Since a full color image is frequently used to obtain a pictorial image, such as a photograph or an illustration and a various gradation expression is required at this time, the operation for forming an image is frequently performed such that a certain screen structure is provided. A case where an image is formed by the image forming apparatus according to this embodiment with a screen structure is provided will now be described.

The screen structure includes, a halftone dot (dot) screen, a multiline screen, a cross line screen, a concentric circle screen, a grain screen, and a hybrid screen having the foregoing screen structures. In general, the dot screen, the multiline screen or the hybrid screen of the two foregoing types are generally employed in the electrophotographic operation. All of the foregoing screen structures are required to reproduce a multi-gradation pictorial image, such as a photograph and an illustration. In particular, the screen structure changes the gradation expression characteristic and the color reproducibility for a half tone image portion. Therefore, the screen structure is an important factor for determining the image quality of the final image.

Figure 56:
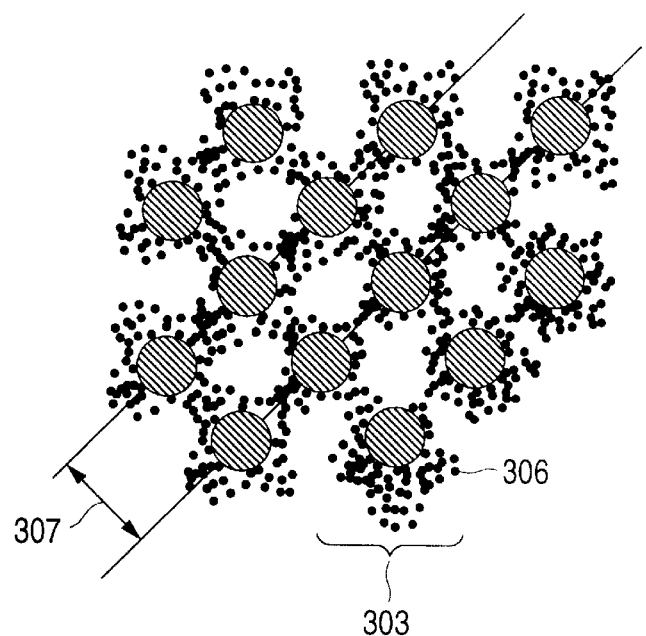
FIG. 56 is an enlarged view of a final image sample formed by a dot screen.

In the eleventh embodiment of the present invention, an image having the dot screen structure is employed. The dot screen will now be described with reference to FIG. 56. FIG. 56 is an enlarged view of a sample of a final image formed by a dot screen adapted to the image forming apparatus according to this embodiment. Dots 306 for forming the image are regularly arranged with image dust 303 positioned around the dots 306. The distance between centers of the dots in a direction in which the dots 306 are arranged is a screen pitch 307 of the dot screen. The image forming apparatus according to the present invention employs a dot screen having a screen pitch of 127 µm corresponding to resolution of 200 dpi. However, the screen pitch may be varied to be adaptable to the image density and the type of the print sample. The image density is determined in accordance with the size of the dot so that gradation is expressed. In a case where dots in multiplicity of colors are superimposed to print a full color image, a screen angle is sometimes provided for the dot screen so as to prevent moire which is generated due to the superimposition of color dots.

In this embodiment, the screen pitch was made to be 127 µm corresponding to resolution of 200 dpi, 170 µm corresponding to that of 150 dpi and 254 µm corresponding to that of 100 dpi. Similarly to the fifth embodiment, the transferring electric field and the fluidity of the toner were changed to form samples having different quantities of image dust to evaluate the image quality.

To periodically and intentionally generate known jitters in order to evaluate the influence of the image dust upon the jitters, one of the gears in a gear system for transmitting power to the photosensitive member 101 is, similarly to the fifth embodiment, formed such that a portion of the teeth is removed. At this time, a print pattern was a uniform pattern formed by a dot screen and having a density of 50%.

A photographic image having wide gradation was evaluated such that an influence of the image dust upon the dot conspicuousness which is the degree of conspicuousness of the screen in a half tone image portion, in particular, in a highlight portion. In addition, an influence of enlargement of the quantity of image dust upon blur of the image and expression of a precise portion of a photograph image were evaluated.

The evaluation was performed by a method similar to the tenth embodiment such that a result determined by the largest number of examiners among a plurality of examiners was employed. Table 3 shows results of determination of images formed by the image forming apparatus according to the present invention provided with the dot screen such that the influences of the screen pitch and the quantity of image dust were examined.

TABLE 3

| Quantity of Image Dust (μm) | Determination of Jitters (Overall Pitch) | Dot Conspicuousness | | | Determination of Blur | | |
|---|---|---|---|---|---|---|---|
| | | 127 | 170 | 254 | 127 | 170 | 254 |
| 130 | | | | | | | X |
| 85 | | | | | X | X | |
| 65 | | | | ○ | ○ | ○ | |
| 40 | ⊙ | ⊙ | ○ | ○ | ○ | | |
| 28 | | | | | | ⊙ | |
| 18 | ⊙ | | | | | | |
| 15 | | ⊙ | Δ | | | | |
| 13 | X | | | | | | |

Determination of Jitters: ⊙: excellent, ○: good, X: unsatisfactory
Dot Conspicuousness: ⊙: excellent, ○: good, Δ: allowable
Determination of Blur: ⊙: excellent, ○: good, X: unsatisfactory In Table 3, evaluation of the jitters was performed similarly to the fifth embodiment such that symbol ⊙ indicates excellent samples without conspicuous jitters and free from deterioration in the image quality attributable to the jitters, ○ indicates good samples with somewhat conspicuous jitters if observed carefully and free from deterioration in the image quality and x indicates unsatisfactory samples having conspicuous jitters and deterioration in the image quality. A determination is performed such that the jitters are not conspicuous and excellent results are, regardless of the screen pitch, obtained when the quantity of image dust is large. Similarly to the fifth embodiment, if the image dust is small such that it is 13 μm, the unsatisfactory result is determined because the jitters are conspicuous and the image quality deteriorates. If the image dust is not smaller than 15 μm, a satisfactory result is determined because the image quality does not deteriorate although jitters are conspicuous if a careful observation is performed. Therefore, if image dust not smaller than 15 μm exists in the dot screen structure final image, an excellent image free from conspicuous jitters can be obtained even if the jitters exist. The reason for this is that a screen free from image dust results in that if jitters appear in a periodical screen which is recognized as signals, that is, in dots, the jitters are recognized as noise and the sensitivity of the eyes of a human being is raised and uncomfortable feeling occurs so that the image quality deteriorates. If a change of the density around each dot is appropriately faded due to existence of image dust, the change is indistinctly recognized as signals. If noise is generated in this case, it cannot easily be sensed by the eyes of a human being.

As for the determination of dot conspicuousness forming the screen evaluated in a photograph image and shown in Table 3, the determination of the dot conspicuousness is performed such that symbol ⊙ indicates excellent samples without dot conspicuousness, ○ indicates good samples with somewhat dot conspicuousness if observed carefully and Δ indicates allowable samples having dot conspicuousness but having no practical problem.

The dot conspicuousness, which is the degree of conspicuous of the dot screen, also depends upon the screen pitch. When the screen pitch is shortened, the dot conspicuousness is prevented satisfactorily. With any screen pitch, the dot conspicuousness can satisfactorily be prevented when the image dust is enlarged. A screen pitch of 127 μm (which corresponds to 200 dpi), which is the standard screen pitch for the image forming apparatus according to the present invention, results in an excellent sample being obtained even in a case where the quantity of image dust is a small value of 13 μm. The greater the quantity of image dust, the more the dot conspicuousness can be prevented. In addition to prevention of the dot conspicuousness, moire which is unintentionally generated even if the screen angle is provided and rossette pattern peculiar to the dot screen are not conspicuous and a satisfactory image can be obtained.

If the quantity of image dust is too large, the overall image becomes blurred and an obscure image is unintentionally formed. The foregoing phenomenon takes place apparently in a half tone image portion, in which the colors and shape of the image can easily be recognized as compared with a shadow portion which is a dark portion. The determination of blur shown in Table 3 is performed such that symbol ⊙ indicates a determination of a very clear result and a samples which are free from any blur and in which edges are very clearly expressed, ○ indicates a determination of a clear result and samples each having a somewhat blur and having clearly expressed edges and x indicates a determination of an indistinct result and samples having excessive blurs and edges expressed dimly. The relationship between the quantity of image dust and the clearness of the image also depend upon the screen pitch. If the screen pitch is long, an excellent image with non-conspicuous blur can be obtained even if the quantity of image dust is large. If the image dust is smaller than half of the screen pitch, excessive interference with the adjacent dot can be prevented even in the half tone image portion. Thus, a clear and excellent image can be obtained.

As described above, the dot screen structure image can be made to be free from conspicuous jitters and thus an excellent image can be obtained if the quantity of image dust is not smaller than a predetermined quantity, that is, 15 μm. Moreover, an excellent image free from conspicuous dots forming the screen can be obtained. If the quantity of image dust is included in a range which does not exceed 1/2 of the screen pitch, an excellent image free from blurs of the image can be obtained.

Twelfth Embodiment

Figure 57:
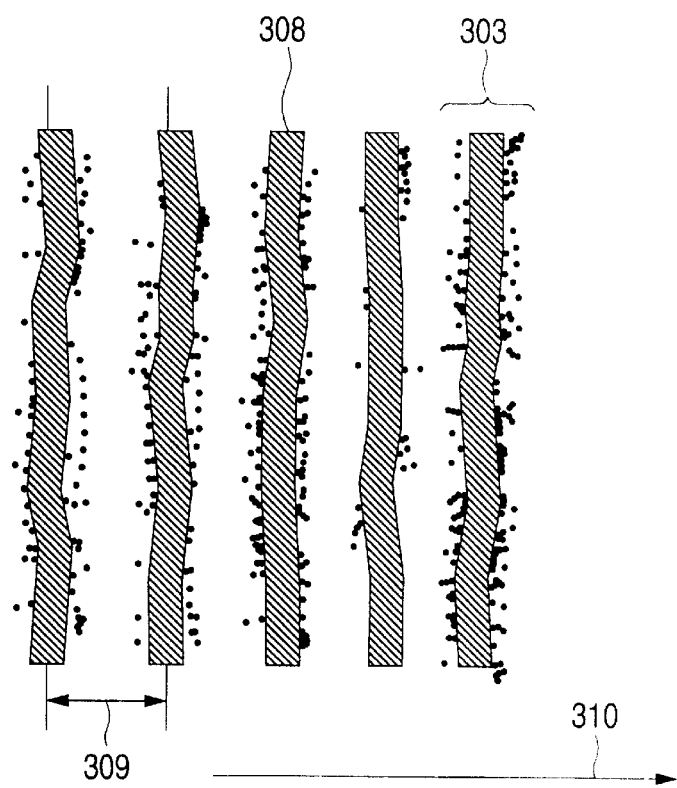
FIG. 57 is an enlarged view of a final image sample formed by a multiline screen.

A twelfth embodiment will now be described such that a final image having a multiline screen structure and formed by the image forming apparatus will now be described. Initially, the multiline screen will now be described with reference to FIG. 57. FIG. 57 is an enlarged view of a final image sample formed by the multiline screen of the image forming apparatus according to this embodiment. Lines 308 forming an image having image dust 303 formed around the lines 308 are regularly arranged in such a manner that one line perpendicular to the exposure main scanning direction 310 is sequentially formed. The distance between centers of the line is the screen pitch 309 of the multiline screen. The image forming apparatus according to the present invention comprises the multiline screen having a screen pitch of 127

μm corresponding to resolution of 200 lpi. The screen pitch may be varied in accordance with the density of the image and the type of the print sample. The density of the multiline screen is determined in accordance with the thickness of the line so that gradation is expressed.

When colors are superimposed by the multicolor multiline screen to print a full color image, the lines 308 are superimposed at the same position. Then, the fixing portion 120 performs thermal fusing operation to form colors by subtractive color mixture. However, if the position, at which the multiline screen is formed, is slightly deviated from an aimed position, the color recognition sometimes becomes different, that is, the stability in reproducing colors sometimes deteriorates. The foregoing deviation of the registration which sometimes takes place is attributable to the positional accuracy in the exposing process which is performed in the electrophotographic process portion shown in FIG. 9, vibrations generated by the drive systems for the photosensitive member 101 and the intermediate transfer member 106 and change in the speed occurring due to the accuracy error.

In this embodiment, the screen pitch was determined to be 127 μm corresponding to resolution of 200 lpi, 170 μm corresponding to 150 lpi and 254 μm corresponding to 100 lpi. Similarly to the tenth embodiment, the transferring electric field and the fluidity of the toner were changed to form samples having different quantities of image dust so as to evaluate the images.

To evaluate the influence of the image dust 303 on the deviation of the registration experienced with the multiline screen, print patterns in plural colors formed by intentionally deviating the registration in a usual color superimposition operation are prepared to evaluate the influences on the stability in reproducing colors. At this time, uniform patterns each having a density of 50% and formed by the multiline screen were employed. Patterns in which usual color lines 308 are superimposed at the same position in the form of a layer, and print patterns of images having deviated registrations such that one color of the superimposed colors is deviated (such that the one color is deviated into the concave portion of the screen) by a distance which is half of the screen pitch in the exposure main scanning direction 310 were employed. Moreover, line conspicuousness of the multiline screen structure in the highlight portion of a photograph image having wide gradation and influence of enlargement of the quantity of image dust on the blurs of the image were evaluated.

Similarly to the tenth embodiment, the images were evaluated by a plurality of examiners such that the result evaluated by the largest number of the examiners was employed as the evaluation.

Table 4 shows results of evaluation of images formed by the multiline screen of the image forming apparatus according to the present invention such that influences of the screen pitch and the quantity of image dust were evaluated.

TABLE 4

| Quantity Image Dust (μm) | Screen Pitch (μm) | | | | | | | | |
|---|---|---|---|---|---|---|---|---|---|
| | Color Reproducibility | | | Line Conspicuousness | | | Determination of Blurs | | |
| | 127 | 170 | 254 | 127 | 170 | 254 | 127 | 170 | 254 |
| 130 | | | | | | | | | X |
| 85 | ○ | | | | | | | X | X |
| 65 | | ○ | | ◎ | ○ | | | ○ | ○ |
| 40 | ○ | | | | | | ○ | | |
| 28 | | | | | | | | | |
| 18 | Δ | Δ | | | | | | ◎ | |
| 15 | | | | | ○ | Δ | | | |
| 13 | X | X | | | | | | | |

Stability in reproducing colors: ◎: excellent, ○good, Δ: allowable, X: unsatisfactory
Line conspicuousness: ◎: excellent, ○: good, Δ: allowable
Determination of blurs: ◎: very clear, ○: clear, X: indistinct In Table 4, determination of the stability in reproducing colors is performed such that symbol ◎ indicates very excellent samples having complete stability in reproducing colors, ○ indicates good samples having stability in reproducing colors, Δ indicates allowable samples having somewhat unsatisfactory stability in reproducing colors but free from any practical problem and x indicates unsatisfactory samples having insufficient stability in reproducing colors. The smaller the quantity of image dust, the colors are recognized differently, that is, the stability in reproducing colors deteriorates between image samples having deviated registrations and usual images when the quantity of image dust is reduced.

The reason for this is that the method of color mixture is different between the two types of samples. In the screen formed by superimposing colors at the usual same position, the subtraction color mixing method is performed to reproduce colors such that plural color layers are mixed by the fixing device 120 so that spectral reflectance for each toner layer is expressed by a curve substantially estimated for each wavelength. On the other hand, the screen having deviated registration is used to reproduce colors such that the screens are not superimposed but they are disposed in parallel to mix light beams reflected from the screens, that is, by parallel color mixture which is one of additive color mixture methods. Since the subtraction color mixture results in colors darker than the original colors and colors obtained by the parallel color mixture have brightness which is substantially middle of the original colors, colors are recognized differently, that is, the stability in reproducing colors deteriorates even if toner in the same quantity exists on a recording medium.

However, in an image having a large quantity of image dust, the subtraction color mixture and parallel color mixture exist mixedly in either the color superimposition at the same position or the color superimposition such that the registration is deviated so that the subtraction color mixture is performed if the fixing device 120 enlarges the toner while deforming the toner. Therefore, the stability in reproducing colors can always be maintained even if the color superimposition position is shifted.

The screen pitch of 127 μm corresponding to 200 lpi which is the standard screen pitch for the image forming apparatus according to the present invention enables practical stability in reproducing colors to be obtained if the quantity of image dust is not smaller than 15 μm. The greater the quantity of image dust, the more the stability in reproducing colors can be maintained satisfactorily. Also in a case where the screen pitch is long, a practically allowable stability in reproducing colors can be obtained if the quantity of image dust is not smaller than 15 μm. The smaller the screen pitch, the greater the stability in reproducing colors can be improved.

The above-mentioned phenomenon relating to the color superimposition is also applied to the dot screen. If a screen angle is provided for the dot screen, a state in which the parallel color mixture and the subtraction color mixture exist mixedly. Even if the registration is deviated in a sample having a small quantity of image dust, any critical difference in the color reproducibility, as is experienced with the multiline screen, does not take place.

As for the transferring characteristic realized when a plurality of toner layers are superimposed, if the image dust is small, toner in colors are formed into layers, thus resulting in the transferring performance becoming different in accordance with the distance from the transfer medium. As a result, the state of the image dust becomes considerably different and thus a zone free from image dust and a zone in which image dust spreads widely and which is transferred to the medium have different area ratio. Therefore, stability in reproducing colors cannot be maintained. When secondary transference is performed such that an image is transferred from the intermediate transfer member 106 to the recording medium 113, the toner layer near the recording medium 113 has a small quantity of image dust. On the other hand, the image dust spreads widely and is transferred to the medium in inverse proportion to the distance from the recording medium. As a result, only colors near the hue of the toner layer farthest from the recording medium are formed. On the other hand, if the quantity of image dust is large, the state of the image dust is not changed among the toner layers in the respective colors. Thus, the stability in reproducing colors can always be maintained.

As for the determination of the conspicuousness of lines forming the screen evaluated with the photograph image, the determination of the line conspicuousness shown in Table 4 is performed such that symbol ⊚ indicates very excellent samples free from any line conspicuousness, ○ indicates good samples having somewhat line conspicuousness when observed carefully and △ indicates allowable samples having somewhat line conspicuousness but free from any practical problem. The line conspicuousness, which is the degree of conspicuousness of the screen, similarly to the dot screen, considerably depend on the screen pitch. With each screen pitch, the line conspicuousness can be eliminated in inverse proportion to the image dust and thus an excellent sample can be obtained. The screen pitch 127 μm (corresponding to 200 dpi) which is a standard screen pitch for the image forming apparatus according to the present invention enables an excellent sample to be obtained even if the quantity of image dust is a small value of 13 μm. The line conspicuousness can be eliminated in inverse proportion to the quantity of image dust. In addition to the elimination of the line conspicuousness, hair lines extending diagonally with respect to the line for forming the screen and step-like notches formed in a portion in which the edge of a contrasted image exists diagonally, which are peculiar to the multiline screen, can be made to be inconspicuous. Thus, an excellent image can be obtained.

Similarly to the dot screen according to the eleventh embodiment, if the quantity of image dust is too large, the overall image becomes blurred and an indistinct image is sometimes formed. The determination of the blurs shown in Table 4 is performed such that symbol ⊚ indicates samples determined to be very clear and free from any blur and having edges expressed very clearly, ○ indicates samples determined to be clear and having somewhat blurs and edges expressed satisfactorily and x indicates samples determined to be indistinct having excessive blurs and edges expressed dimly. The relationship between the degree of the quantity of image dust and clearness of the image depend upon the screen pitch. If the screen pitch is long, no conspicuous blur is generated and an excellent image can be formed even in a case where the quantity of image dust is large. The image dust does not excessively interfere with the adjacent line even in a half tone image portion if the image dust does not exceed 1/2 of the screen pitch. Thus, a clear and satisfactory image can be obtained.

The influence of the image dust upon the jitters was evaluated similarly to the eleventh embodiment although omitted from illustration. As a result, if the quantity of image dust is not smaller than 15 μm, the jitters are not conspicuous similarly to the eleventh embodiment and thus an excellent image can be obtained. The excellent result can be maintained even if the screen pitch is changed.

As described above, the image having the multiline screen structure is able to always maintain the stability in reproducing colors if the quantity of image dust is not smaller than a predetermined quantity, that is, 15 μm. Also a highlight portion is able to obtain an excellent image free from conspicuous lines forming the screen. In a range in which the quantity of image dust does not exceed 1/2 of the screen pitch, an excellent image free from image blurs can be obtained.

Thirteenth Embodiment

Image dust which is generated in an image forming apparatus sometimes spreads, having directional properties as well as spreading isotropically, for example, as shown in the dot screen shown in FIG. 56. In a process for forming an image by a line sequential method, image dust is frequently given directional properties peculiar to each image forming apparatus due to influences of the drive of the photosensitive member 101 and the intermediate transfer member 106 or change in the processing speed or vibrations in each of the development, transfer and fixing processes. The image forming apparatus according to the present invention may be employed in a case where image dust has the directional properties.

Figure 58:
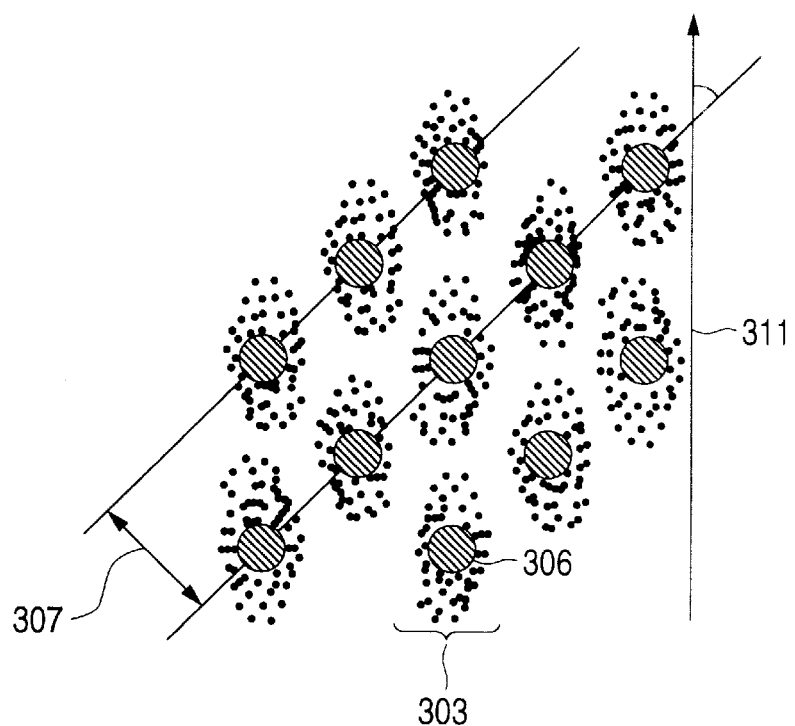
FIG. 58 is an enlarged view of an example of image dust having directional properties.

The directional properties of image dust in a case of the dot screen structure will now be described with reference to FIG. 58. FIG. 58 is an enlarged view of an example of image dust formed in the image forming apparatus according to this embodiment and having directional properties. Dots 306 are arranged to have an angle with respect to a feeding direction 311 for a recording medium at an interval of the screen pitch 307 with image dust 303 formed around the dots 306. Image dust 303 spread in parallel to the feeding direction 311 of the recording medium in the image forming apparatus. In general, an image forming apparatus easily encounters generation of dust in the feeding direction 311 for the recording medium. If the image dust spreads with the directional properties, a direction (a direction in which dots approaches one another) in which dots are arranged and a direction in which dots spread are different from each other and thus an angle is made in the case of the dot screen, for example, shown in FIG. 58. Therefore, the image dust 303 spreads to the non-printed portion.

Figure 59:
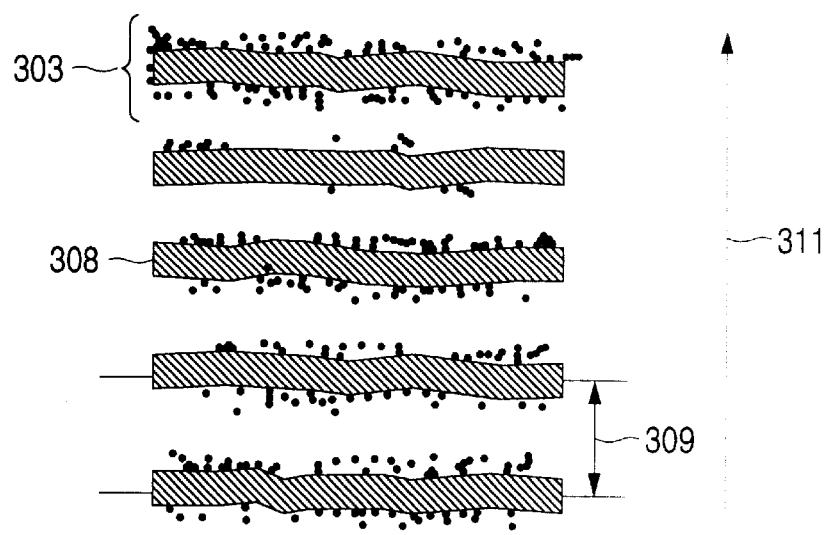
FIG. 59 is an enlarged view of a final image formed by a horizontal multiline screen.

Accordingly, the thirteenth embodiment of the present invention is structured such that the multiline screen as shown in FIG. 59 is formed into a horizontal multiline screen which is formed into one line 308 perpendicular to the feeding direction 311 for the recording medium. FIG. 59 is an enlarged view showing a final image formed by the horizontal multiline screen of the image forming apparatus according to this embodiment. When image dust 303 is spread in the feeding direction 311 for the recording medium in the horizontal multiline screen which is the screen pitch 309, the lines 308 for forming the image have image dust 303 which uniformly spread to gaps among the screen which are non-printed portions.

The image forming apparatus according to this embodiment has an arrangement such that image dust has peculiar directional properties. The direction of the image dust spread into an elongated shape in the feeding direction for the recording medium. When a complete round small dots are printed, an ellipse having a major axis which is the feeding direction for the recording medium is formed. Thus, the image dust is in the form having a ratio of the major axis and the minor axis which is substantially 1:0.7.

In this embodiment, the screen pitch is made to be 127 $\mu$m corresponding to resolution of 200 lpi, 170 $\mu$m corresponding to 150 dpi and 254 $\mu$m corresponding to 100 dpi. Similarly to the tenth embodiment, the transferring electric field and the fluidity of the toner were changed to form samples having different quantities of image dust so that the formed images were evaluated.

Samples of print patterns having different quantities of image dust were obtained by using the uniform pattern having a density of 50% formed with the dot screen by changing the transferring electric field and the fluidity of the toner similarly to the tenth embodiment. Note that if the quantity of image dust is changed, the directional properties of the image dust are not changed.

Similarly to the evaluation of the influence of the image dust on the jitters performed in the tenth embodiment and also similarly to the seventh embodiment, the influence of image dust on the deviation of the registration was evaluated by using print patterns each of which was set such that one color of superimposed colors is deviated into the base in the screen by half of the screen pitch.

The images were evaluated by a plurality of examiners by a method according to the tenth embodiment such that the result determined by the largest number of the examiners was employed. Table 5 shows results of the evaluation of the image formed by the horizontal multiline screen of the image forming apparatus according to the present invention such that the influences of the screen pitch and the quantity of image dust on each factor was evaluated.

TABLE 5

| Quantity of image dust ($\mu$m) | Determination of Jitters overall pitch | Stability in Reproducing Colors 127 | Line Conspicuousness 170 or more | Determination overall pitch | Determination of Blurs 127 | | 170 | 254 |
|---|---|---|---|---|---|---|---|---|
| 130 | | | | | | | | X |
| 85 | | | ○ | | X | X | | ○ |
| 65 | | ○ | ○ | | | | | |
| 40 | ○ | | | | | | | |

TABLE 5-continued

| Quantity of image dust ($\mu$m) | Determination of Jitters overall pitch | Stability in Reproducing Colors 127 | Line Conspicuousness 170 or more | Determination overall pitch | Determination of Blurs 127 | | 170 | 254 |
|---|---|---|---|---|---|---|---|---|
| 28 | | | | | | | | |
| 18 | | ○ | ○ | ○ | | ○ | | ○ |
| 15 | ○ | | | | | | | |
| 13 | X | | X | Δ | | | | |

Determination of jitters: ⊙: excellent, ○: good, X: unsatisfactory
Stability in reproducing colors: ⊙: excellent, ○: good, X: unsatisfactory
Line conspicuousness: ⊙: excellent, ○: good, Δ allowable
Determination of blurs: ⊙: very clear, ○: clear, X: indistinct The determination of jitters shown in Table 5 is performed similarly to the tenth embodiment such that symbol ⊙ indicates an excellent determination, ○ indicates a good determination and x indicates an unsatisfactory determination. If the quantity of image dust is large, the jitters becomes inconspicuous and an excellent image can be obtained regardless of the screen pitch. Similarly to the tenth embodiment, when the image dust is a small value of 13 $\mu$m, an unsatisfactory determination is made because jitters becomes excessive conspicuous and the image quality deteriorates. If the same is not smaller than 15 $\mu$m, an excellent image can be obtained having superior smoothness to that of the image obtained by the dot screen according to the sixth embodiment and the image obtained by the vertical multiline screen according to the seventh embodiment. Regardless of the size of the screen pitch, a wide range was determined to be excellent in making jitters inconspicuous. Therefore, if image dust not smaller than 15 $\mu$m exists in the final image of the horizontal multiline screen structure, an excellent image capable of making jitters to be inconspicuous can be obtained.

The determination of the color reproducibility is performed similarly to the twelfth embodiment such that symbol ⊙ indicates an excellent sample having complete stability in reproducing colors, ○ indicates a good sample having the stability in reproducing colors, Δ indicates an allowable sample having somewhat unsatisfactory stability in reproducing colors but no practical problem and x indicates an unsatisfactory sample having unsatisfactory stability in reproducing colors. As compared with the image obtained by the vertical multiline screen according to the twelfth embodiment, stable color reproducibility can be maintained with a wider range of the quantities of image dust. Moreover, the color reproducibility of the samples of the type having a wide screen pitch encountered instable color reproducibility with the vertical multiline screen was stabilized.

The determination of the line conspicuousness shown in Table 5 was performed similarly to the twelfth embodiment such that symbol ⊙ indicates an excellent determination, ○ indicates a good determination and Δ indicates an unsatisfactory determination. The line conspicuousness is realized by the horizontal multiline screen according to this embodiment regardless of the screen pitch. Since non-printed portions are selectively plugged by image dust and image dust does not excessively overlap in printed portions, the screen is not conspicuous even in a highlight portion. Thus, an excellent image was obtained. Moreover, the region of the quantity of image dust with which an excellent determination was performed was wider than that for the vertical multiline screen according to the twelfth embodiment.

Moreover, this embodiment improved prevention of blurs although the quantity of image dust is large. The determination of blurs was performed similarly to the eleventh and twelfth embodiments such that symbol ⊙ indicates a very clear result, ○ indicates a clear result and x indicates an indistinct result. Thus, the very clear image was obtained in a region of the quantity of image dust which is wider as compared with the foregoing embodiments. The reason for this is the fact that the image dust has the directional properties which cause the image dust to selectively spread to the non-printed portions between the screen so that interference between the multiline screen is prevented and the non-printed portions are plugged. As a result, detailed portions can be expressed and variety of gradation expressions can be performed. Since the non-printed portions are selectively plugged by the image dust and the image dust does not excessively overlap in the printed portions, the screen is not conspicuous even in the highlight portion and thus an excellent image can be obtained.

As a result, the horizontal multiline screen enables an excellent image, free from conspicuous jitters, to be obtained. Even if the registration is deviated, the stability in reproducing colors can always be maintained. An excellent image free from a conspicuous screen even in the highlight portions and capable of preventing blurs of the image even if the quantity of image dust is large can be obtained in a wide range of the quantities of image dust.

The foregoing multiline screen is not required to be the horizontal multiline screen. It may be formed to have an angle with respect to the feeding direction for the recording medium. In place of the multiline screen, a dot screen having an angle with respect to the feeding direction for the recording medium may be employed.

As a result of the foregoing embodiments, even if the quantity of image dust is enlarged, an excellent image can be obtained. Therefore, the conditions for the image forming apparatus, in particular, the conditions for the transferring process capable of easily controlling generation of image dust can freely be determined. Thus, the design of the image forming apparatus can be performed further freely.

Although the embodiments of the present invention have been described about the structure in which the image forming apparatus employs the electrophotography method using dry toner, an electrophotographic image forming apparatus structured to perform fluid development or an ink jet image forming apparatus for forming an image with ink droplets may be employed.

Since the image forming apparatus according to the tenth to thirteenth embodiments is arranged such that the image dust zone in the final image is determined to be not smaller than a predetermined width, that is, 15 $\mu$m, change in the density is appropriately faded due to the existence of the image dust. Therefore, even if noise is generated, it cannot easily be recognized by the eyes of a human being. Thus, an excellent image free from conspicuous jitters can be obtained.

Since the image forming apparatus according to the above embodiments has the dot screen structure for forming screens and arranged such that the quantity of image dust is not smaller than the predetermined value, that is, 15 $\mu$m which is not more than 1/2 of the screen pitch, jitters can be made inconspicuous and an excellent image can be obtained. Since the portion around the screen can appropriately be faded, moire and rosette pattern peculiar to the dot screen can be made inconspicuous. Thus, even in highlight portions, an excellent image free from conspicuousness of dots forming the screen can be obtained. Since excellent interference with adjacent dots can be prevented even in the highlight portion, blurs of the image can be prevented and thus an excellent image can be obtained.

Since the image forming apparatus according to the above embodiments has the multiline screen structure for forming screens and arranged such that the quantity of image dust is not smaller than the predetermined value, that is, 15 $\mu$m which is not more than 1/2 of the screen pitch, stability in reproducing colors can always be maintained even if the registration is deviated. Since the portion around the screen can appropriately be faded, an excellent image can be obtained free from conspicuous hair lines extending diagonally in the image and step-like ridges which are formed when a diagonal contrasted edge and the screen intersect. Even in a highlight portion, an excellent image free from conspicuousness of lines forming the screen can be obtained. Even in a highlight portion, excessive interference with adjacent lines can be prevented. Therefore, a clear and excellent image free from blurs of the image can be obtained.

When the multiline screen arranged to have the quantity of image dust which is not smaller than the predetermined quantity and not more than 1/2 of the screen pitch is formed into the horizontal multiline screen with respect to the feeding direction for the recording medium, an excellent image free from conspicuous jitters can be obtained. Even if the registration is deviated, the stability in reproducing colors can always be maintained. Since the portion around the screen can appropriately be faded, an excellent image can be obtained free from conspicuous hair lines extending diagonally in the image and step-like ridges which are formed when a diagonal contrasted edge and the screen intersect. Non-printed portions can selectively be plugged by the image dust and image dust do not excessively overlap the printed portions. Therefore, an excellent image free from conspicuousness of lines for forming the screen can be obtained even in the highlight portion. Since excessive interference with the adjacent line can be prevented, a clear and excellent image free from blurs of the image can be obtained.

Although the invention has been described in its preferred form with a certain degree of particularity, it is apparent for those skilled in the art that the present disclosure of the preferred form can be changed in the details of construction and in the combination and arrangement of parts.

The first to fourth embodiments, the fifth to ninth embodiments and the tenth to thirteenth embodiments have been described individually. To optimally control the distance between dots in the adjacent basic cells, the distance between dots in the basic cells adjacent in the sub-scanning direction may be 1.5 times or greater the diameter of the exposing light beam spot and the image dust zone having a width of 15 $\mu$m or larger may be provided between dots, as is employed in the first to fourth embodiments.

Similarly, the fifth to ninth embodiments and the tenth to thirteenth embodiments may be combined.

What is claimed is:

1. An image forming apparatus, comprising:
  first and second basic cells each containing a predetermined number of pixels and disposed adjacent to each other;

a gradation processing device arranged to perform a gradation expressing process for each basic cell in accordance with a density of a supplied image;

a dot forming device capable of forming dots on a recording medium to correspond to each pixel subjected to the gradation expressing process by said gradation processing device; and a device arranged to inhibit enlargement of the dot in a direction different from a first direction until the dots are enlarged in the first direction and the dots are substantially connected to each other.

2. An image forming apparatus, comprising:

a gradation processing device arranged to perform a gradation expressing process by determining an area ratio of pixels in accordance with a density of a supplied image; and a dot forming device capable of forming dots on a recording medium to correspond to the pixels subjected to the gradation expressing process by said gradation processing device, wherein, after an area ratio of a first pixel group is raised to a first predetermined value because of enlargement of the pixels in a first direction, said gradation processing device makes the area ratio of a pixel group in the first pixel group to be constant and raises an area ratio of a second pixel group adjacent in a direction different from the first direction.

3. An image forming apparatus according to claim 2, wherein the first predetermined value is determined to be a value with which the substantial connection is established between a dot which is formed by said dot forming device at a position on said recording medium corresponding to the first pixel group in accordance with the area ratio of the first pixel group and a dot which is formed by said dot forming device at a position on said recording medium corresponding to the third pixel group in accordance with the area ratio of the third pixel group adjacent in the first direction.

4. An image forming apparatus according to claim 2, wherein the first predetermined value is made to be 1−1/2na or larger and smaller than 1 on the assumption that the ratio of the size of one pixel with respect to the diameter of a smallest dot formed by said dot forming device is a, the ratio of the size of a pixel group having a largest area ratio with respect to the size of one pixel is n and the maximum area ratio is 1.

5. An image forming apparatus according to claim 2, wherein said dot forming device includes an exposing light beam scanning device arranged to scan the surface of the photosensitive member with an exposing light beam spot having a predetermined diameter to correspond to each pixel subjected to the gradation expressing process by said gradation processing device in such a manner that pulse width modulation is permitted and a dot writing device arranged to write a dot to correspond to each pixel by transferring, to the recording medium, an image formed on the surface of said photosensitive member attributable to a scanning operation performed by said exposing light beam scanning device, and the first predetermined value is made to be 0.3 or larger and smaller than 1 in terms of the pulse width on the assumption that the pulse width required for said exposing light beam scanning device to expose the overall area of the first pixel group is 1.

6. An image forming apparatus according to claim 5, wherein the first predetermined value is made to be 0.75 to 0.9 in terms of the pulse width.

7. An image forming apparatus according to claim 2, wherein the direction different from the first direction is a direction diagonally intersecting the first direction.

8. An image forming apparatus according to claim 2, wherein after the area ratio of the second pixel group is raised to the second predetermined value, said gradation processing device maintains or reduces the area ratio of the second pixel group to be not larger than a second predetermined value and raises the area ratio of the first pixel group to be larger than the first predetermined value.

9. An image forming apparatus according to claim 2, wherein said gradation processing device makes the area ratio of the second pixel group to be zero after the area ratio of the second pixel group is raised to a second predetermined value.

10. An image forming apparatus according to claim 2, wherein said gradation processing device is arranged to perform a multivalue dither process and provided with a storage portion arranged to store a plurality of dither matrices corresponding to area ratios of pixels, a multivalue dither processing portion arranged to read a largest area ratio among area ratios corresponding to dither matrices in each of which the density of each pixel is higher than a threshold value of a supplied density stored in the dither matrix and a conversion portion arranged to convert an obtained area ratio to be a value which is not larger than the number of gradations provided for said multivalue dither processing portion.

11. An image forming apparatus according to claim 10, wherein the number of the dither matrices which are stored in said storage portion is larger than the number of gradations permitted for each pixel.

* * * * *